United States Patent
Noh et al.

(10) Patent No.: US 11,246,124 B2
(45) Date of Patent: Feb. 8, 2022

(54) METHOD AND APPARATUS FOR DOWNLINK CONTROL INFORMATION DESIGN FOR NETWORK COORDINATION

(71) Applicant: Samsung Electronics Co., Ltd., Suwon-si (KR)

(72) Inventors: Hoondong Noh, Suwon-si (KR); Jinyoung Oh, Seoul (KR); Cheolkyu Shin, Suwon-si (KR); Youngwoo Kwak, Suwon-si (KR); Taehyoung Kim, Seoul (KR); Sungjin Park, Incheon (KR); Jeongho Yeo, Hwaseong-si (KR); Seunghoon Choi, Seongnam-si (KR); Younsun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 16/571,827

(22) Filed: Sep. 16, 2019

(65) Prior Publication Data

US 2020/0015208 A1    Jan. 9, 2020

Related U.S. Application Data

(63) Continuation of application No. 15/920,908, filed on Mar. 14, 2018, now Pat. No. 10,856,280.

(30) Foreign Application Priority Data

Mar. 15, 2017 (KR) .................. 10-2017-0032284
Jun. 22, 2017 (KR) .................. 10-2017-0079090
Oct. 10, 2017 (KR) .................. 10-2017-0129090

(51) Int. Cl.
*H04W 72/04* (2009.01)
*H04W 76/27* (2018.01)
(Continued)

(52) U.S. Cl.
CPC ......... *H04W 72/042* (2013.01); *H04L 1/1812* (2013.01); *H04L 27/261* (2013.01);
(Continued)

(58) Field of Classification Search
CPC . H04L 27/2613; H04L 27/26; H04L 27/2602; H04L 27/2642; H04L 27/2626;
(Continued)

(56) References Cited

U.S. PATENT DOCUMENTS

2013/0308555 A1    11/2013    Ho
2014/0192786 A1    7/2014    Skov et al.
(Continued)

FOREIGN PATENT DOCUMENTS

CN    102714527 A    10/2012
CN    104753575 A    7/2015
(Continued)

OTHER PUBLICATIONS

Samsung, 'DMRS Design Aspects for NR', R1-1612497, 3GPP TSG RAN WG1 Meeting #87, Reno, USA, Nov. 4, 2018.
(Continued)

*Primary Examiner* — Elton Williams
(74) *Attorney, Agent, or Firm* — Jefferson IP Law, LLP

(57) ABSTRACT

A method and apparatus for downlink control information (DCI) design for network coordination (coordinated multi-point transmission (CoMP)) are provided. In addition, a method and apparatus for configuration of demodulation reference signal (DMRS) and transmission and reception of DMRS, and a method and apparatus for transmitting and receiving uplink signal according to uplink transmission scheme are provided. The disclosure relates to a communication method and system for converging a 5th-generation (5G) communication system for supporting higher data rates beyond a 4th-generation (4G) system with a technology for
(Continued)

internet of things (IoT). The disclosure may be applied to intelligent services based on the 5G communication technology and the IoT-related technology, such as smart home, smart building, smart city, smart car, connected car, health care, digital education, smart retail, security and safety services.

16 Claims, 34 Drawing Sheets

(51) Int. Cl.
  *H04L 27/26* (2006.01)
  *H04L 1/18* (2006.01)
  *H04L 5/00* (2006.01)
  *H04W 88/02* (2009.01)
  *H04W 88/08* (2009.01)

(52) U.S. Cl.
  CPC ......... *H04L 27/2626* (2013.01); *H04W 76/27* (2018.02); *H04L 1/1864* (2013.01); *H04L 5/0048* (2013.01); *H04W 88/02* (2013.01); *H04W 88/08* (2013.01)

(58) Field of Classification Search
  CPC ... H04L 5/0055; H04L 1/0003; H04L 1/1864; H04W 72/14
  See application file for complete search history.

(56) References Cited

U.S. PATENT DOCUMENTS

| | | |
|---|---|---|
| 2015/0055581 A1 | 2/2015 | Janis et al. |
| 2015/0131586 A1 | 5/2015 | Noh et al. |
| 2015/0230211 A1 | 8/2015 | You et al. |
| 2015/0271814 A1 | 9/2015 | Park et al. |
| 2015/0319750 A1 | 11/2015 | Ko et al. |
| 2016/0105882 A1 | 4/2016 | Park et al. |
| 2017/0288817 A1* | 10/2017 | Cao ...................... H04L 1/1819 |
| 2018/0027575 A1* | 1/2018 | Shi ....................... H04W 72/048 370/336 |
| 2019/0182812 A1* | 6/2019 | Shimezawa .......... H04B 7/0697 |
| 2019/0260623 A1* | 8/2019 | Li ........................ H04L 27/2627 |

FOREIGN PATENT DOCUMENTS

| | | |
|---|---|---|
| WO | 2015/035876 A1 | 3/2015 |
| WO | 2017/025805 A1 | 2/2017 |

OTHER PUBLICATIONS

ZTE et al., 'Discussion on downlink DMRS design', R1-1701815, 3GPP TSG, RAN WG1 Meeting #88, Athens, Greece, Feb. 7, 2017.

CATT, 'Discussion on DMRS design for DL', R1-1702072, 3GPP TSG RAN WG1 Meeting #88, Athens, Greece, Feb. 7, 2017.

Extended European Search Report dated Jan. 17, 2020, issued in a counterpart European Application No. 18766654.0-1205 / 3583734.

Samsung: "DCI Formats and Contents for NR", 3GPP Draft; R1-1702975 DCI Formats and Contents for NR, 3RD Generation Partnership Project (3GPP), Mobile Competence Centre ; 650, Route Des-Lucioles ; F-06921 Sophia-Antipolis Cedex ; France, vol. RAN WG1, No. XP051210118; Feb. 12, 2017, Athens, Greece. Retrieved from the Internet: URL:http://www.3gpp.org/ftp/Meetings_3GPP_SYNC/RAN1/Docs/ [Retrieved on Feb. 12, 2017].

LG Electronics: "DL DMRS Design", 3GPP Draft; R1-1702461 LG DL DMRS, 3rd Generation Partnership Project (3GPP), Mobile Competence Centre; 650, Route Des Lucioles ; F-06921 Sophia-Antipolis Cedex ; France,vol. RAN WGI, No. XP051209615, Feb. 12, 2017, Athens, Greece. Retrieved from the Internet: URL:http://www.3gpp.org/ftp/Meetings_3GPP_SYNC/RAN1/Docs/ [retrieved on Feb. 12, 2017].

Chinese Office Action dated Nov. 11, 2021, issued in a counterpart Chinese Application No. 201880018631.2.

Huawei, HiSilicon; Design of DL DMRS for data transmission; 3GPP TSG RAN WG1 NR Ad-Hoc Meeting; R1-1700067; Jan. 9, 2017, Spokane, USA.

Sharp; Downlink DMRS enhancement for CoMP; 3GPP TSG RAN WG1 Meeting #67; R1-113822; Nov. 7, 2011, San Francisco, USA.

* cited by examiner

METHOD AND APPARATUS FOR DOWNLINK CONTROL INFORMATION DESIGN FOR NETWORK COORDINATION

CROSS-REFERENCE TO RELATED APPLICATION(S)

This application is a continuation application of prior application Ser. No. 15/920,908, filed on Mar. 14, 2018, and was based on and claimed priority under 35 U.S.C. § 119 of a Korean patent application number 10-2017-0032284, filed on Mar. 15, 2017, a Korean patent application number 10-2017-0079090, filed on Jun. 22, 2017, and a Korean patent application number 10-2017-0129090, filed on Oct. 10, 2017, in the Korean Intellectual Property Office, the disclosure of each of which is incorporated by reference herein in its entirety.

TECHNICAL FIELD

The disclosure relates to a wireless communication system. More particularly, the disclosure relates to a control information transmission method, a reference signal transmission method, and a hybrid automatic repeat request (HARQ) process control method and apparatus.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, coordinated communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

In recent years, with the development of long term evolution (LTE) and LTE-advanced (LTE-A), research into network coordination is actively conducted. In particular, there is a need for a method and an apparatus for a downlink control information (DCI) design for network coordination. In addition, there are a need for a method and an apparatus for configuring efficient demodulation reference signal (DMRS) for 5G communication systems. In addition, there are also a need for a method and an apparatus for simultaneously providing various services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for a downlink control information (DCI) design for efficiently performing network coordination. Another object of the disclosure is to provide an improved demodulation reference signal (DMRS) configuring and signaling method and apparatus for a 5th-generation (5G) communication system. Still another object of the disclosure is to provide a method and an apparatus for simultaneously providing various services in a 5G communication system, and in particular, a method and an apparatus for effectively performing a retransmission according to a hybrid automatic repeat request (HARQ) process.

Objects of the disclosure are not limited to the above-mentioned objects. That is, other objects that are not mentioned may be obviously understood by those skilled in the art to which the disclosure pertains from the following description.

In accordance with an aspect of the disclosure, a method for transmitting a DMRS of a base station in a communication system is provided. The method includes transmitting DMRS configuration information to a terminal, the DMRS configuration information including first information indicating a pattern used for a DMRS and second information associated with an extended DMRS, transmitting downlink control information (DCI) for downlink data, and transmitting the downlink data and the DMRS based on the DMRS configuration information.

The DCI may include 1-bit information indicating scrambling identity for the DMRS.

The DMRS configuration information may be transmitted by radio resource control (RRC) signaling.

The second information may indicate a number of an orthogonal frequency-division multiplexing (OFDM) symbol to which the extended DMRS is mapped.

In accordance with another aspect of the disclosure, a method for receiving a DMRS of a terminal in a communication system is provided. The method includes receiving DMRS configuration information from a base station, the DMRS configuration information including first information indicating a pattern used for a DMRS and second information associated with an extended DMRS, receiving downlink control information (DCI) for downlink data, and receiving the downlink data and the DMRS based on the DMRS configuration information.

In accordance with another aspect of the disclosure, a base station for transmitting a DMRS in a communication system is provided. The base station includes a transceiver and at least one processor coupled with the transceiver and configured to control the transceiver to transmit DMRS configuration information to a terminal, the DMRS configuration information including first information indicating a pattern used for a DMRS and second information associated with an extended DMRS, transmit downlink control information (DCI) for downlink data, and transmit the downlink data and the DMRS based on the DMRS configuration information.

In accordance with another aspect of the disclosure, a terminal for receiving a DMRS in a communication system is provided. The terminal includes a transceiver and at least one processor coupled with the transceiver and configured to control the transceiver to receive DMRS configuration information from a base station, the DMRS configuration information including first information indicating a pattern used for a DMRS and second information associated with an extended DMRS, receive downlink control information (DCI) for downlink data, and receive the downlink data and the DMRS based on the DMRS configuration information.

In accordance with another aspect of the disclosure, an uplink (UL) transmission scheme of a terminal is provided. The UL transmission scheme includes receiving configuration information configuring an uplink data transmission without grant from a base station; performing an uplink data transmission without grant based on the configuration information, receiving DCI configuring a retransmission for the uplink data transmission without grant, identifying a waveform used for the retransmission based on a format of the DCI, and performing the data retransmission based on the waveform.

The waveform used for the retransmission may be determined based on whether the format of the DCI is for fallback, the waveform information used for the uplink transmission without grant may be transmitted from the base station to the terminal by RRC signaling, and if the formation of the DCI is not for the fallback, the waveform used for the retransmission may be the same as the waveform used for the uplink transmission without grant.

In accordance with another aspect of the disclosure, an uplink data reception method of a base station is provided. The uplink data reception method includes transmitting configuration information configuring an uplink transmission without grant to a terminal; receiving an uplink data transmission without grant based on the configuration information, transmitting DCI configuring a retransmission for the uplink data transmission without grant if the uplink data transmission without grant fails to receive, and performing the data retransmission reception, wherein a waveform used for the retransmission is identified based on a format of the DCI.

Another aspect of the disclosure is to provide a DCI configuring and receiving method for joint transmission such as non-coherent joint transmission (NC-JT) in a wireless communication system, wherein the base station and the terminal are configured to efficiently transmit the NC-JT by adjusting the downlink (DL) DCI information amount and the physical downlink control channel (PDCCH) reception performance.

Another aspect of the disclosure is to provide the method and apparatus for configuring and signaling a DMRS, wherein the signaling associated with the antenna port multiplexing may be efficiently performed by the proposed method, the signaling overhead for the DMRS information may be performed, and the radio resources may be efficiently used.

Another aspect of the disclosure is to effectively transmit data using different type of services in the communication system. As a result, it is possible to satisfy the requirements for each service, reduce the delay of the transmission time, or effectively use at least one of the frequency-time, the space resource, and the transmission power.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
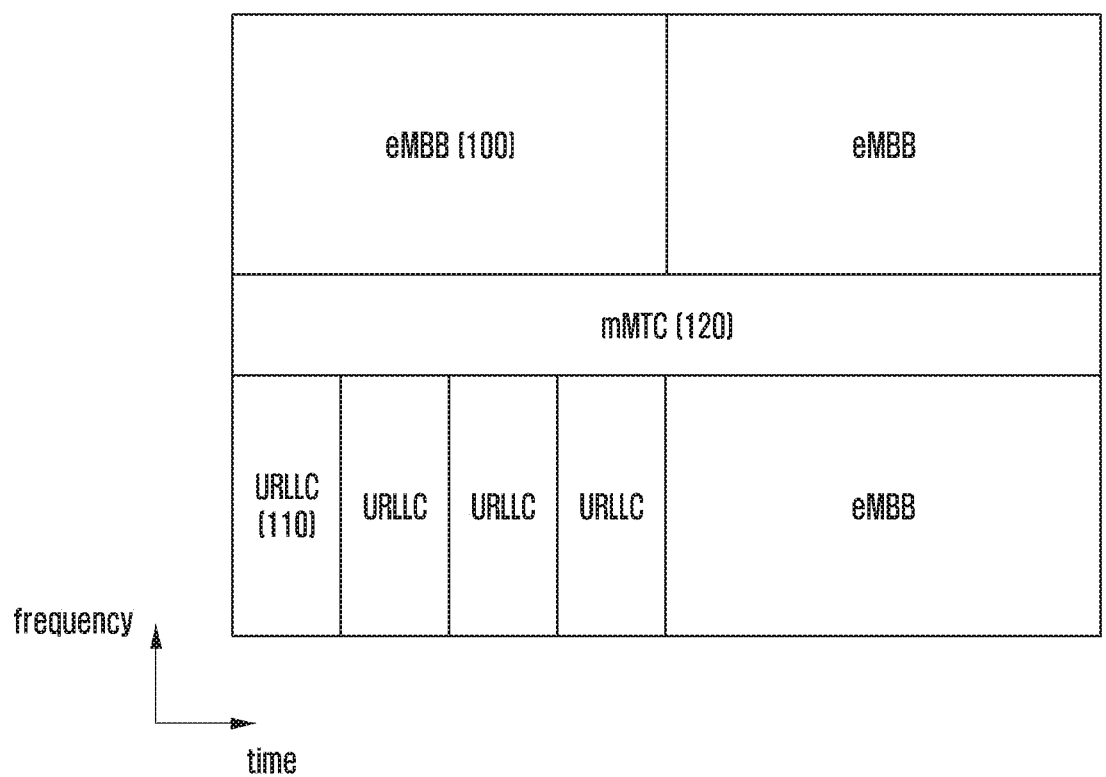
FIG. 1 is a diagram illustrating an example in which three services of the 5th-generation (5G) are multiplexed and transmitted according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various advantages and features of the disclosure and methods accomplishing the same will become apparent from the following detailed description of embodiments with reference to the accompanying drawings. However, the disclosure is not limited to the embodiments disclosed herein but will be implemented in various forms. The embodiments have made disclosure of the disclosure complete and are provided so that those skilled in the art may easily understand the scope of the disclosure. Therefore, the disclosure will be defined by the scope of the appended claims. Like throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in each block of the flow chart. Since the computer program instructions may also be mounted on the computer or the other programmable data processing apparatuses, the instructions performing a series of operations on the computer or the other programmable data processing apparatuses to create processes executed by the computer to thereby execute the computer or the other programmable data processing apparatuses may also provide operations for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present embodiment means software or hardware components such as field-programmable gate array (FPGA) and application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object-oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more central processing units (CPUs) within a device or a security multimedia card. Further, in an embodiment, '~unit' may include one or more processors.

First Embodiment

A wireless communication system has been developed from a wireless communication system providing a voice centered service in the early stage toward broadband wireless communication systems providing high-speed, high-quality packet data services, like communication standards of high speed packet access (HSPA), long term evolution (LTE), or evolved universal terrestrial radio access (E-UTRA) of the 3rd generation partnership project (3GPP), high rate packet data (HRPD) and ultra mobile broadband (UMB) of 3GPP2, institute of electrical and electronics engineers (IEEE) 802.16e or the like. In addition, the 5th-generation (5G) or new radio (NR) communication standard is being produced as the 5G wireless communication system.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a user equipment (UE) or a mobile station (MS) transmits data or a control signal to a base station (evolved node B (eNodeB) or base station (BS)) and the down link refers to a radio link through which a base station transmits data or a control signal to a terminal. The multiple access scheme as described above normally allocates and operates time-frequency resources on which data or control information is transmitted to prevent the time-frequency resources from overlapping with each other, that is, establish orthogonality, thereby dividing the data or the control information of each user.

As a future communication system since the LTE, that is, a 5G communication system has to be able to freely reflect various requirements such as a user and a service provider, a service satisfying various requirements needs to be supported at the same time. The services considered for the 5G communication system include enhanced mobile broadband (eMBB), massive machine type communication (mMTC), ultra reliability low latency communication (hereinafter, URLLC), etc.

The eMBB aims to provide a higher data transfer rate than a data rate supported by the existing LTE, LTE-advanced (LTE-A), or LTE-Pro. For example, in the 5G communication system, the eMBB should be able to provide a peak transmission rate of 20 Gbps in the downlink (DL) and a peak data rate of 10 Gbps in the uplink (UL) from the viewpoint of one base station. In addition, the 5G communication system should provide the increased user perceived data rate of the terminal simultaneously with providing the peak data rate. In order to satisfy such the requirements, improvement of various transmitting/receiving technologies including a further improved multi input multi output (MIMO) transmission technology is demanded. In addition, signals are transmitted using the transmission bandwidth of up to 20 MHz in the 2 GHz band used by the current LTE system, but the 5G communication system uses a bandwidth wider than 20 MHz in the frequency band of 3 to 6 GHz or more than 6 GHz, thereby satisfying the data transmission rate required in the 5G communication system.

At the same time, the mMTC is being considered to support application services such as internet of thing (IoT) in the 5G communication system. The mMTC is required for an access support of a large-scale terminal in a cell, coverage enhancement of a terminal, improved battery time, and cost reduction of a terminal in order to efficiently provide the IoTs. Since the IoT is attached to various sensors and various devices to provide a communication function, the internet of thing should be able to support a large number of terminals (for example, 1,000,000 terminals/km$^2$) in a cell. In addition, the terminal supporting the mMTC are more likely to be located in shaded areas not covered by a cell, such as an underground of building due to nature of services, thus the terminal requires a wider coverage than other services provided by the 5G communication system. The terminals that support the mMTC should be configured as inexpensive terminals and require very long battery life time, such as 10 to 15 years, because it is difficult to frequently replace the battery of the terminal.

Finally, the URLLC is a cellular-based wireless communication service used for mission-critical purposes. For example, services used for a remote control for a robot or machinery, industrial automation, unmanaged aerial vehicle, remote health care, emergency situation, or the like may be considered. Therefore, the communication provided by the URLLC should provide very low latency and very high reliability. For example, a service that supports URLLC should meet air interface latency of less than 0.5 milliseconds and at the same time have requirements of a packet error rate less than 10-5. Therefore, for the service that supports the URLLC, the 5G system should provide a transmit time interval (TTI) smaller than other services, and at the same time, design matters for allocating a wide resource in the frequency band in order to secure the reliability of the communication link are required.

FIG. 1 is a diagram illustrating an example in which three services of the 5G are multiplexed and transmitted according to an embodiment of the disclosure.

Referring to FIG. 1, an eMBB 100, an URLLC 110, and an mMTC 120 may be multiplexed and transmitted in one system. According to the example illustrated in FIG. 1, in the 5G communication system, different transmission/reception techniques and transmission/reception parameters can be used between services in order to satisfy different requirements of the respective services.

Hereinafter, the frame structure of the LTE and LTE-A systems will be described in more detail with reference to the drawings.

Figure 2:
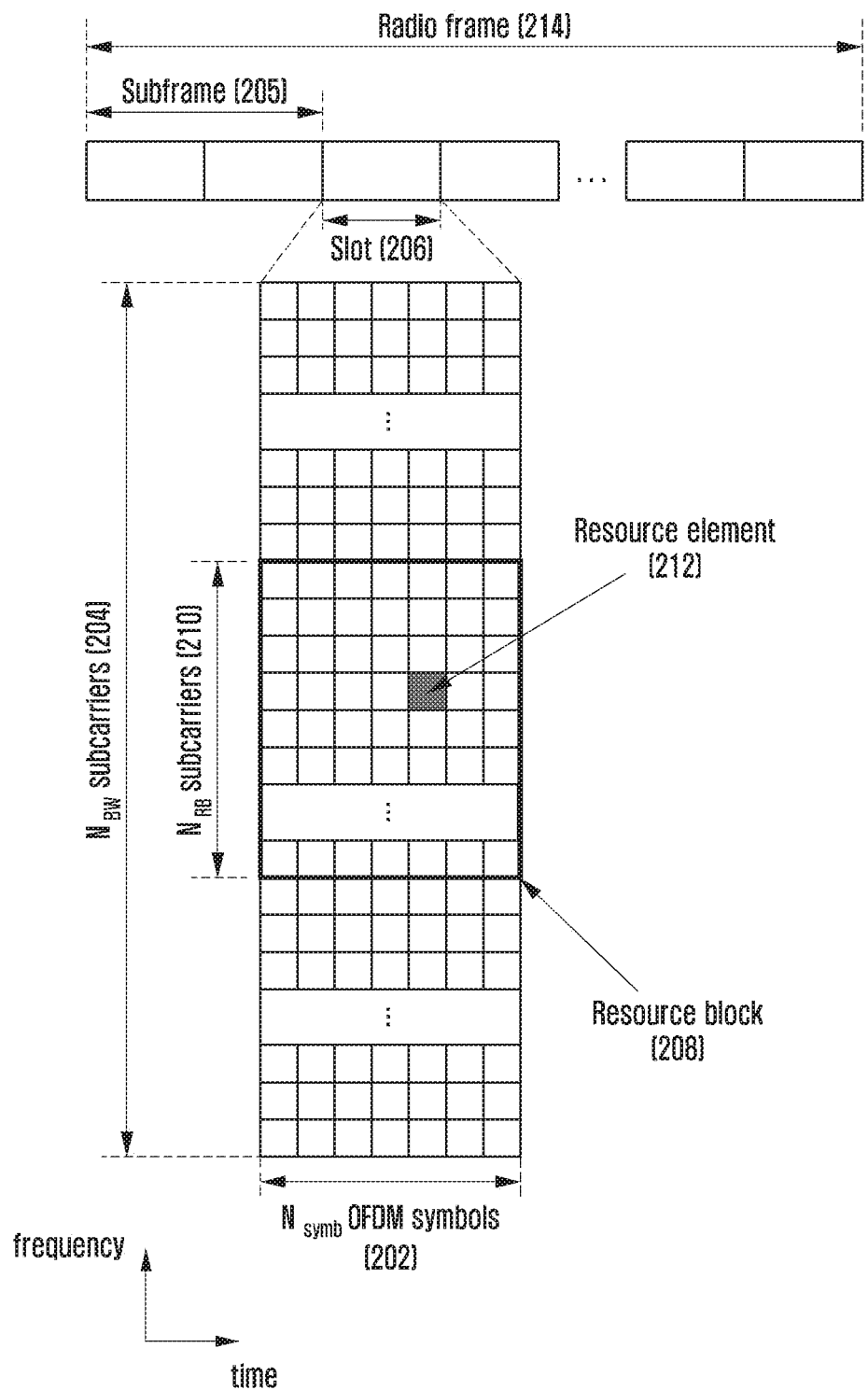
FIG. 2 is a diagram illustrating a structure of a time-frequency domain that is a radio resource area to which data or a control channel is transmitted in a downlink (DL) of a long-term evolution (LTE) system according to an embodiment of the disclosure.

FIG. 2 is a diagram illustrating a structure of a time-frequency domain that is a radio resource area to which data or a control channel is transmitted in a downlink of an LTE system according to an embodiment of the disclosure.

In FIG. 2, an abscissa represents a time domain and an ordinate represents a frequency domain. A minimum transmission unit in the time domain is an OFDM symbol, in which one slot 206 is configured by collecting $N_{symb}$ OFDM symbols 202 and one subframe 205 is configured by collecting two slots. A length of the slot is 0.5 ms and a length of the subframe is 1.0 ms. Further, a radio frame 214 is a time domain unit consisting of 10 subframes. A minimum transmission unit in the frequency domain is a sub-carrier, in which the whole system transmission bandwidth consists of a total of $N_{BW}$ sub-carriers 204. As shown in FIG. 2, the $N_{BW}$ sub-carriers 204 includes $N_{BW}$ sub-carriers 210.

A basic unit of resources in the time-frequency domain is a resource element (RE) 112 and may be represented by an OFDM symbol index and a sub-carrier index. A resource block (RB) or a physical resource block (PRB) 208 is defined by the $N_{symb}$ consecutive OFDM symbols 202 in the time domain and $N_{RB}$ consecutive sub-carriers 110 in the frequency domain. Therefore, one RB 208 consists of $N_{symb} \times N_{RB}$ REs 212. Generally, a minimum transmission unit of data is the RB unit. In the LTE system, generally, $N_{symb}=7$ and $N_{RB}=12$ and $N_{BW}$ is proportional to the system transmission bandwidth.

A data rate is increased in proportion to the number of RBs scheduled for the terminal. The LTE system is operated by defining six transmission bandwidths. In a frequency division duplex (FDD) system operated by dividing a downlink and an uplink based on a frequency, a downlink transmission bandwidth and an uplink transmission bandwidth may be different from each other. A channel bandwidth represents an RF bandwidth corresponding to the system transmission bandwidth. The following Table 1 shows a correspondence relationship between the system transmission bandwidth (NRB) and the channel bandwidth that are defined in the LTE system. For example, the LTE system having the channel bandwidth of 10 MHz is configured of a transmission bandwidth of 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The frame structure of the LTE and LTE-A systems as described above is designed considering normal voice and data communications, and has limitations in scalability to meet various services and requirements like the 5G system. Therefore, in 5G system, it is necessary to flexibly define and operate frame structure considering various services and requirements.

For example, each service may have different subcarrier spacings depending on the requirements. Currently, two schemes are considered to support a plurality of subcarriers in the 5G communication system. As a method for supporting a plurality of subcarriers in the 5G communication system, a set of subcarrier spacings that the 5G communication system can have may be determined using the following Equation 1.

$$\Delta f_m = f_0 2^m (m \text{ is a subcarrier spacing index}) \quad \text{Equation 1}$$

In the above Equation, $f_0$ represents a basic subcarrier spacing of the system and m represents a scaling factor of integer. For example, if $f_0$ is 15 kHz, the set of subcarrier spacings that the 5G communication system can have may include 7.5 KHz, 15 KHz, 30 KHz, 45 KHz, 60 KHz, 120 KHz, etc., and the system may be configured using all or some of the corresponding set.

According to the above-mentioned methods, the disclosure will be described on the assumption that $f_0$ is 15 kHz and a set of 15 KHz, 30 KHz, and 60 KHz subcarrier spacings is used in the 5G communication system. However, the technique proposed in the disclosure can apply even another set of subcarrier spacings (for example, $f_0$ is 17.5 KHz, and a set of subcarrier spacings is 17.5 KHz, 35 KHz, and 70 KHz) without any limitation. If the set of subcarrier spacings of 17.5 KHz, 35 KHz, and 70 KHz is considered in the disclosure, the technology described based on $f_0$ of 15 kHz may be applied as it is. Similarly, the disclosure may be described by mapping 35 kHz, 70 kHz, and 140 kHz to 30 kHz, 60 kHz, and 120 kHz, respectively, on a one-to-one basis.

Figure 3:
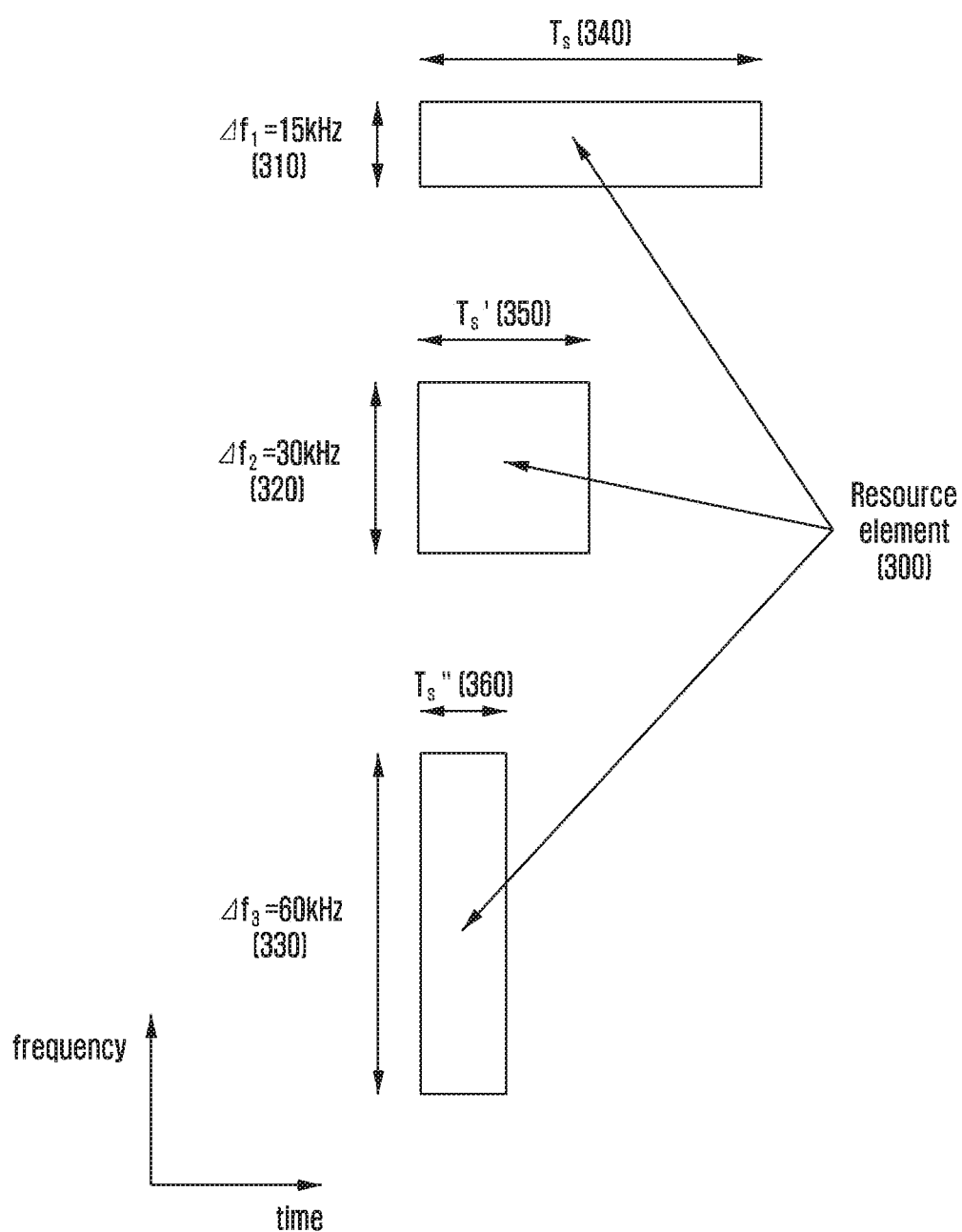
FIG. 3 is a diagram illustrating resource elements depending on a subcarrier spacing according to an embodiment of the disclosure.

FIG. 3 is a diagram illustrating a resource element 300 in the case in which the subcarrier spacings are $\Delta f_1$ (310), $\Delta f_2$ (320), and $\Delta f_3$ (330), respectively according to an embodiment of the disclosure.

In the example of FIG. 3, the subcarrier spacings of the respective resource elements, i.e., values of □$\Delta f_1$ 310, $\Delta f_2$ 320, and $\Delta f_3$ 330 correspond to 15 kHz, 30 kHz, and 60 kHz, respectively. In addition, each resource element has OFDM symbol lengths of $T_s$ 340, $T_{s'}$ 350, and $T_{s''}$ 360. According to the characteristics of the OFDM symbol, since the subcarrier spacing and the length of the OFDM symbol have a reciprocal relationship with each other, it can be seen that the larger the subcarrier spacing, the shorter the symbol length. Therefore, $T_s$ 340 is two times $T_{s'}$ 350 and four times $T_{s''}$ 360.

Various sets of subcarrier spacings described above can be used for various purposes within a system. For example, it may be appropriate to use the subcarrier spacing in consideration of channel conditions (multi-path delay spread) or coherence bandwidth of a corresponding band at a low carrier frequency such as 2 GHz to 4 GHz band. For example, it is advantageous to use low subcarrier spacing because the path delay spread is relatively large and therefore the coherence bandwidth is small at the carrier frequencies of the 2 GHz to 4 GHz band. At the same time, in a band having a high carrier frequency of 6 GHz or higher, it may be advantageous to use wide subcarrier spacing because the influence due to the channel condition, Doppler shift, and frequency offset is more serious. At the same time, the 5G communication system can use high subcarrier spacing of systems that have requirements of very low transmission delay time like the URLLC, even in the band using the low carrier frequency.

Hereinafter, the resource allocation method of the LTE and LTE-A systems will be described in more detail with reference to the drawings.

Figure 4:
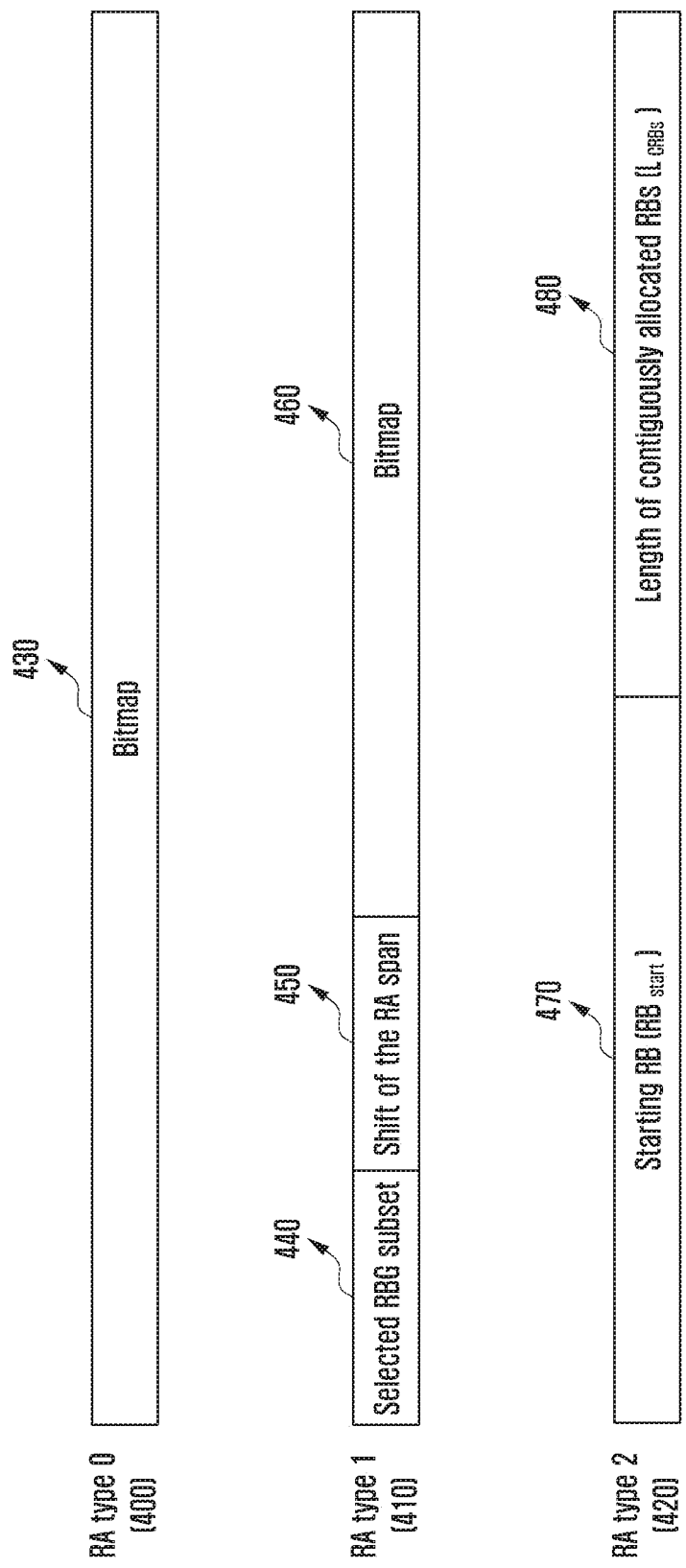
FIG. 4 is a diagram illustrating a resource allocation (RA) type supported in the LTE according to an embodiment of the disclosure.

FIG. 4 is a diagram illustrating a resource allocation (RA) type supported in the LTE according to an embodiment of the disclosure.

As shown in FIG. 4, three types of resource allocation schemes (resource allocation type 0 400, resource allocation type 1 410, and resource allocation type 2 420) are supported in the LTE system.

In the resource allocation type 0 400 of FIG. 4, non-contiguous RB allocation is supported on the frequency base and a bitmap is used to indicate the allocated RB. In this case, if the corresponding RBs are displayed with a bitmap having the same size as the number of RBs, it is necessary to transmit a very large bitmap for a large cell bandwidth, resulting in a high control signaling overhead. Therefore, in the resource allocation type 0 400, the method for reducing a size of a bit map by grouping contiguous RBs without indicating each RB in the frequency domain and indicating the group has been used. For example, when the total transmission bandwidth is $N_{RB}$ and the number of RBs per resource block group (RBG) is P, the bitmap 430 necessary to notify RB allocation information in resource allocation type 0 400 becomes $N_{RB}/P$. The smaller the number of RBs per RBG, that is, the P value, the greater the flexibility of the scheduling, but the greater the control signaling overhead. Therefore, the P value should be selected appropriately so as to reduce the required number of bits while maintaining sufficient resource allocation flexibility. In the LTE system, the P value is determined by the downlink cell bandwidth and can have a value from 1 to 4.

In the resource allocation type 1 410 of FIG. 4, the resource allocation is performed by dividing the entire RBG set on the frequency base into a scattered RBG subset. The number of subsets is given by the cell bandwidth, and the number of subsets of the resource assignment type 1 is equal to a group size P of resource assignment type 0 400. The RB allocation information of the resource allocation type 1 410 consists of three fields as follows.

First field 440: Selected RBG subset indicator ($\lceil \log_2 (P) \rceil$ bit)
Second field 450: Indicator indicating whether to shift resource allocation in subset (1 bit)
Third field 460: Bitmap ($\lceil N_{RB}/P \rceil - \lceil \log_2 (P) \rceil$ bit) for allocated RBG As a result, the total number of bits used in resource assignment type 1 410 becomes $\lceil N_{RB}/P \rceil$ and is equal to the number of bits required in the resource allocation type 0 400.

Therefore, a 1-bit indicator is added to notify the terminal of whether the resource allocation type is 0 400 or 1 410.

The resource assignment type 2 420 of FIG. 4 is not based on the bitmap, unlike the two resource assignment types described above. Instead, the allocated resource is represented by the start point and length of the RB allocation. Accordingly, the resource allocation types 0 400 and 1 410 both support non-contiguous RB allocation, while the resource allocation type 2 400 supports only the contiguous allocation. As a result, the RB allocation information of the resource allocation type 2 consists of two fields as follows.

First field 470: Indicator indicating RB start point $RB_{start}$
Second field 480: Indicator indicating length $L_{CRBs}$ of contiguously allocated RBs In the resource assignment type 2 420, the total number $\lceil \log_2 (N_{RB} (N_{RB}+1)/2 \text{ of bits} \rceil$ is used.

All three resource assignment types correspond to a virtual resource block (VRB). In the resource allocation types 0 400 and 1 410, the VRB are directly mapped to the physical resource block (PRB) in the localized form. On the other hand, in the resource allocation type 2 420, the VRBs in the localized and distributed forms are supported. Therefore, in the resource allocation type 2 420, there is an additional indicator to discriminate the localized and distributed VRBs.

Next, downlink control information (DCI) and a method for transmitting the DCI in the LTE and LTE-A systems will be described in detail.

In the LTE system, the scheduling information for the downlink data or the uplink data is transmitted from the base station to the terminal through the DCI. The DCI is defined in various formats, and thus the DCI formats are defined depending on whether the DCI is the scheduling information on the uplink data and the scheduling information on the downlink data, whether the DCI is compact DCI having a small size of control information, whether to apply spatial multiplexing using a multiple antenna, whether the DCI is DCI for a power control, or the like and are operated For example, DCI format 1 that is the scheduling control information on the downlink data is configured to include at least following control information.

Resource allocation type 0/1 flag: It is notified whether a resource allocation scheme is type 0 or type 1. The type 0 applies a bitmap scheme to allocate a resource in a resource block group (RBG) unit. In the LTE system, a basic unit of the scheduling is the resource block (RB) represented by the time-frequency domain resource and the RBG is configured of a plurality of RBs and thus becomes the basic unit of the scheduling in the type 0 scheme. The type 1 allocates a specific RB within the RBG.

Resource block allocation: The RB allocated for the data transmission is notified. The represented resource is determined depending on the system bandwidth and the resource allocation scheme.

Modulation and coding scheme (MCS): The modulation scheme used for the data transmission and a size of a transport block that is the data to be transmitted are notified.

Hybrid automatic repeat request (HARQ) process number: An HARQ process number is notified.

New data indicator: An HARQ initial transmission or retransmission is notified.

Redundancy version: An HARQ redundancy version is notified.

Transmit power control command for physical uplink control channel (PUCCH): A transmit power control command for the PUCCH that is an uplink control channel is informed.

The DCI is subjected to a channel coding and modulation process and then is transmitted on a physical downlink control channel (PDCCH) or an enhanced PDCCH (EPDCCH) that is the downlink physical control channel.

Generally, the DCI is independently channel-coded for each terminal and then is configured of independent PDCCH and is transmitted. In the time domain, the PDCCH is transmitted while being mapped during the control channel transmission section. A mapping position in the frequency domain of the PDCCH is determined by identifiers IDs of each terminal and is spread over the entire system transmission bandwidth.

The downlink data are transmitted on a physical downlink shared channel (PDSCH) that is a physical channel for downlink data transmission. The PDSCH is transmitted after the control channel transmission section and the DCI transmitted on the PDCCH informs the scheduling information on the detailed mapping position in the frequency domain, the modulation scheme, or the like.

By the MCS consisting of 5 bits among the control information configuring the DCI, the base station notifies the modulation scheme applied to the PDSCH to be transmitted to the terminal and a data size (transport block size (TBS)) to be transmitted. The TBS corresponds to a size before channel coding for error correction is applied to data (transport block (TB)) to be transmitted by a base station.

A cyclic redundancy check (CRC) is attached to a payload of a DCI message, and the CRC is scrambled with a radio network temporary identifier (RNTI) corresponding to identity of the terminal. Different RNTIs are used depending on the purpose of the DCI message, e.g. UE-specific data transmission, power control command, or random access response. In other words, the RNTI is not explicitly transmitted but is transmitted by being included in the CRC computation process. Upon receiving the DCI message transmitted onto the PDCCH, the terminal check the CRC using the allocated RNTI. If the check result of the CRC is correct, it can be seen that the corresponding message is transmitted to the terminal.

The resource allocation of the PDCCH is based on a control-channel element (CCE), and one CCE consists of nine resource element groups (REGs). In addition, one REG consists of four REs. The number of CCEs required for a specific PDCCH may be 1, 2, 4, or 8, which is changed depending on a channel coding rate of a DCI message payload. As such, the number of different CCEs is used to implement link adaptation of the PDCCH.

The terminal should detect a signal without knowing information about the PDCCH. In the LTE system, a search space representing a set of CCEs for blind decoding is defined. The search space consists of a plurality of sets at the aggregation level of each CCE, which is not explicitly signaled but implicitly defined by a function and a subframe number by the terminal identity. In each subframe, the terminal decodes all possible PDCCHs that may be generated from the CCEs in the set search space, and processes the information which is declared to be valid to the terminal through the CRC check.

The search space is classified into a UE-specific search space (USS) and a common search space (CSS). The terminals in a certain group or all the terminals may investigate the common search space of the PDCCH in order to receive cell-common control information such as dynamic scheduling or paging message for the system information. For example, the downlink scheduling allocation information for a transmission of system information block (SIB)-1 including the cell operator information may be received by investigating the common search space of the PDCCH.

The DCI format to be decoded in the UE-specific search space depends on a transmission mode configured for the corresponding terminal. Therefore, the terminal does not need to attempt to decode the rest DCI formats other than the DCI format corresponding to the configured transmission scheme, thereby reducing the number of blind decoding attempts of the terminal. The transmission mode is configured through radio resource control (RRC) signaling. However, since the correct subframe number on when the corresponding configuration is effective for the terminal is not specified, there may be the case in which the network and the terminal are set to be different transmission schemes for a specific time period. Therefore, in order to solve this problem, at least one DCI format which can be decoded regardless of the transmission mode is required. For example, in the LTE system, the DCI format 1A is always decoded regardless of the transmission scheme. As a result, the terminal needs to additionally perform blind decoding for the possible DCI formats as well as the blind decoding depending on the combination of CCEs in the search space.

In this manner, the downlink DCI generally includes information necessary for receiving downlink data of the terminal such as resource allocation, modulation and coding scheme (MCS), demodulation reference signal (DMRS) configuration information, and the information may have different values or different DCI message size depending on the DL transmission technique. For this reason, the DCI in the LTE system is classified into multiple DCI formats, which are classified depending on specific message size and usage. In addition, certain DCI formats are designed to have the same number of message bits to reduce the complexity associated with the blind decoding. However, the actual message size may be changed depending on various factors. For example, if the bandwidth is large, the actual message size may be changed depending on the cell bandwidth since more bits are needed to indicate the resource allocation.

On the other hand, unlike the existing wireless communication system, the 5G wireless communication system aims to support not only services requiring high transmission rate but also services having very short transmission delay and services requiring high connection density. Coordinated transmission between the respective cells, transmission and reception points (TRPs), and/or beams in a wireless communication network including a plurality of cells, a TRP, or a beam may increase the strength of the signal received by the terminal or is one of the element technologies capable of satisfying the various service requirements by efficiently performing the interference control between the respective cells, TRPs, or/and beams.

Joint transmission (JT) is a typical transmission technique for the coordinated transmission and can support one terminal through different cells, TRPs and/or beams through the above technology to increase strength of a signal received by the terminal. On the other hand, different precoding, MCS, resource allocation, and the like need to be applied to the respective cells, TRPs or/and beams, and inter-terminal link, since the characteristics of the respective cells, TRPs, or/and beams, and inter-terminal channels may be greatly different. In particular, in the case of non-coherent joint transmission (NC-JT) supporting non-coherent precoding between the respective cells, TRPs and/or beams, individual DL transmission information configuration for the respective cells, TRPs and/or beams is important. On the other hand, the individual DL transmission information configuration for the respective cells, TRPs, and/or beams is a major factor for increasing a payload required for the DL DCI transmission, which adversely affects reception performance of the physical downlink control channel (PDCCH) transmitting the DCI. Therefore, it is necessary to carefully design tradeoff between DCI information amount and PDCCH reception performance for the JT support.

To this end, the disclosure provides an efficient DCI configuring method for the NC-JT.

Figure 5A:
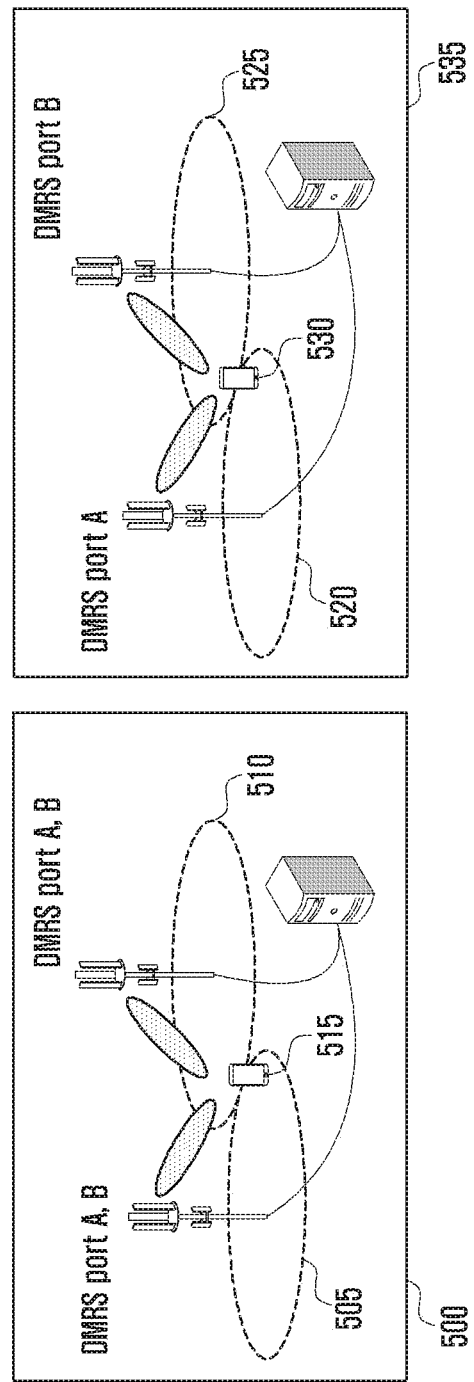
FIGS. 5A and 5B are diagrams illustrating examples of radio resource allocation for each transmission and reception point (TRP) according to a joint transmission technique and a situation according to various embodiments of the disclosure.
Figure 5B:
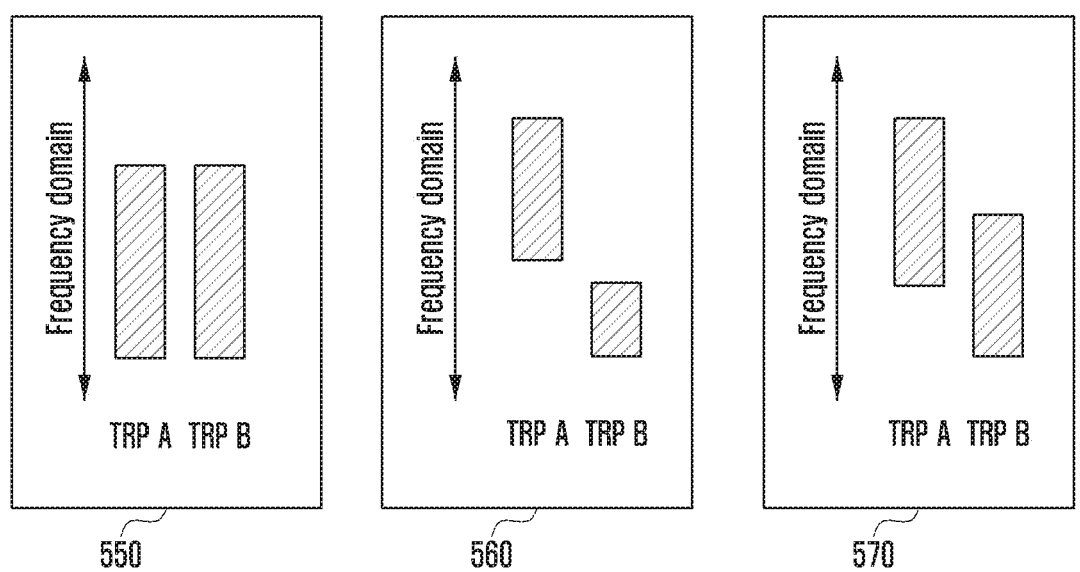

FIGS. 5A and 5B are diagrams illustrating examples of radio resource allocation for each TRP according to a joint transmission (JT) technique and a situation according to various embodiments of the disclosure.

In FIG. 5A, reference number 500 is a diagram illustrating the coherent joint transmission (C-JT) supporting coherent precoding between the respective cells, TRPs, or/and beams. In the C-JT, the same data (PDSCH) is transmitted in TRP A 505 and TRP B 510, and the joint precoding is performed in multiple TRPs. This means that in the TRP A 505 and the TRP B 510, the same DMRS ports for receiving the same PDSCH (for example, DMRS ports A and B in both TRPs) are transmitted. In this case, the terminal 515 will receive one DCI information for receiving one PDSCH demodulated by the DMRS ports A, B.

In FIG. 5B, reference number 535 is a diagram illustrating the non-coherent joint transmission (NC-JT) supporting the non-coherent precoding between the respective cells, TRPs, or/and beams. In case of the NC-JT, different PDSCHs are transmitted in the respective cells, TRPs and/or beams, and individual precoding can be applied to each PDSCH. This means that in the TRP A 520 and the TRP B 525, different DMRS ports (for example, DMRS port A in the TRP A and DMRS port B in the TRP B) for receiving different PDSCHs are transmitted. In this case, the terminal 530 will receive two kinds of DCI information for receiving PDSCH A demodulated by the DMRS port A and PDSCH B demodulated by the other DMRS port B.

For example, in the case of the NC-JT, various radio resource allocations can be considered like in the case in which the frequency and time resources used in the multiple TRPs are the same (550), frequency and time resources used in the plurality of TRPs do not overlap at all (560), and frequency and time resources used in the plurality of TRPs partially overlap, as illustrated in FIG. 5B. In particular, in the case of 570, it can be seen that the DCI payload required for the resource allocation information linearly increases with the number of TRPs. The increase in the DL DCI payload may adversely affect the reception performance of the physical downlink control channel (PDCCH) that transmits the DCI or may greatly increase the DCI blind decoding complexity of the terminal as described above. Therefore, the disclosure provides a DCI design method for efficiently supporting the NC-JT.

Hereinafter, embodiments of the disclosure will be described in detail with reference to the accompanying drawings. If it is determined that a detailed description for the known functions or configurations related to the disclosure may obscure the gist of the disclosure, the detailed description therefor will be omitted. Further, the following terminologies are defined in consideration of the functions in the disclosure and may be changed by intentions, practices or the like of users or operators. Therefore, the definitions thereof should be construed based on the contents throughout the specification.

Hereinafter, a base station is the subject performing resource allocation of a terminal and may be at least one of eNode B, Node B, a base station (BS), a wireless access unit, a base station controller, and a node on a network. The terminal may include user equipment (UE), a mobile station (MS), a cellular phone, a smart phone, a computer, or a multimedia system capable of performing a communication function. Further, as an example of LTE or an LTE-A system, an embodiment of the disclosure is described below, but the embodiment of the disclosure may be applied to other communication systems having similar technical background or a channel form. For example, 5G mobile communication technologies (5G, new radio, NR) developed after the LTE-A could be included. Further, the embodiment of the disclosure may be applied even to other communication systems by partially being changed without greatly departing from the scope of the disclosure under the decision of those skilled in the art.

The content of the disclosure may be applied to the FDD and time division duplex (TDD) system.

Hereinafter, in the disclosure, higher signaling is a method for transmitting a signal from a base station to a terminal using a downlink data channel of a physical layer or from a terminal to a base station using an uplink data channel of a physical layer.

Hereinafter, in the disclosure, the examples will be described based on a plurality of examples. However, the examples are not independent but at least one of the examples can be applied simultaneously or compositely.

1-1-th Embodiment

A 1-1-th embodiment proposes a DCI structure and a DCI transmission/reception method for multi-TRP transmission.

Figure 6:
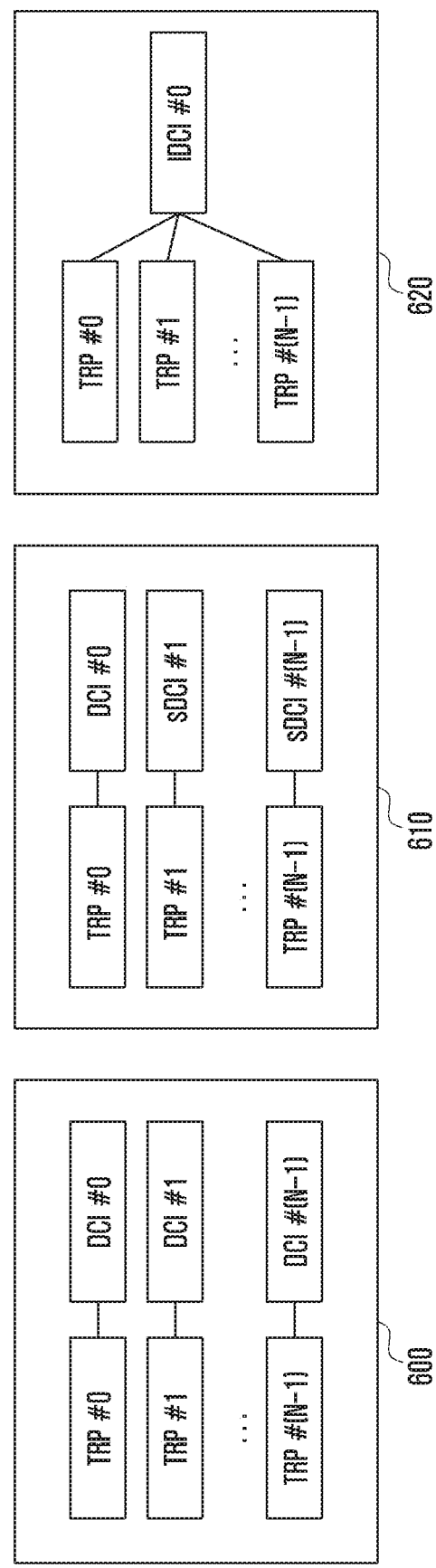
FIG. 6 is a diagram illustrating a downlink control information (DCI) structure and a DCI structure and a DCI transmitting/receiving method for multi-TRP transmission according to an embodiment of the disclosure.

FIG. 6 is a diagram illustrating a DCI structure and a DCI structure and a DCI transmitting/receiving method for multi-TRP transmission according to an embodiment of the disclosure.

As described above, the DCI for multiple TRP (or beam) transmission, especially, NC-JT support, requires more payload than the DCI for a single TRP (or beam) based transmission. To this end, it is possible to consider the following three DCI transmission methods.

Method 1 (Signaling Through Multiple DCIs Having the Same Structure)

A first method is to transmit information necessary for receiving multiple PDSCHs from the multiple TRPs or beams using the multiple DCIs of the same structure (600). In this case, since the DCI having the same structure are used for all TRPs or beams, the degree of freedom for configuring the transmission information for each PDSCH is the highest. However, the PDCCH resource for the DCI transmission and the blind decoding complexity of the UE may increase in proportion to the number of cooperative TRPs or beams. Also, if the DCI transmission is performed in different TRPs, respectively, the coverage of PDCCHs transmitted in different TRPs may be different.

Figure 7:
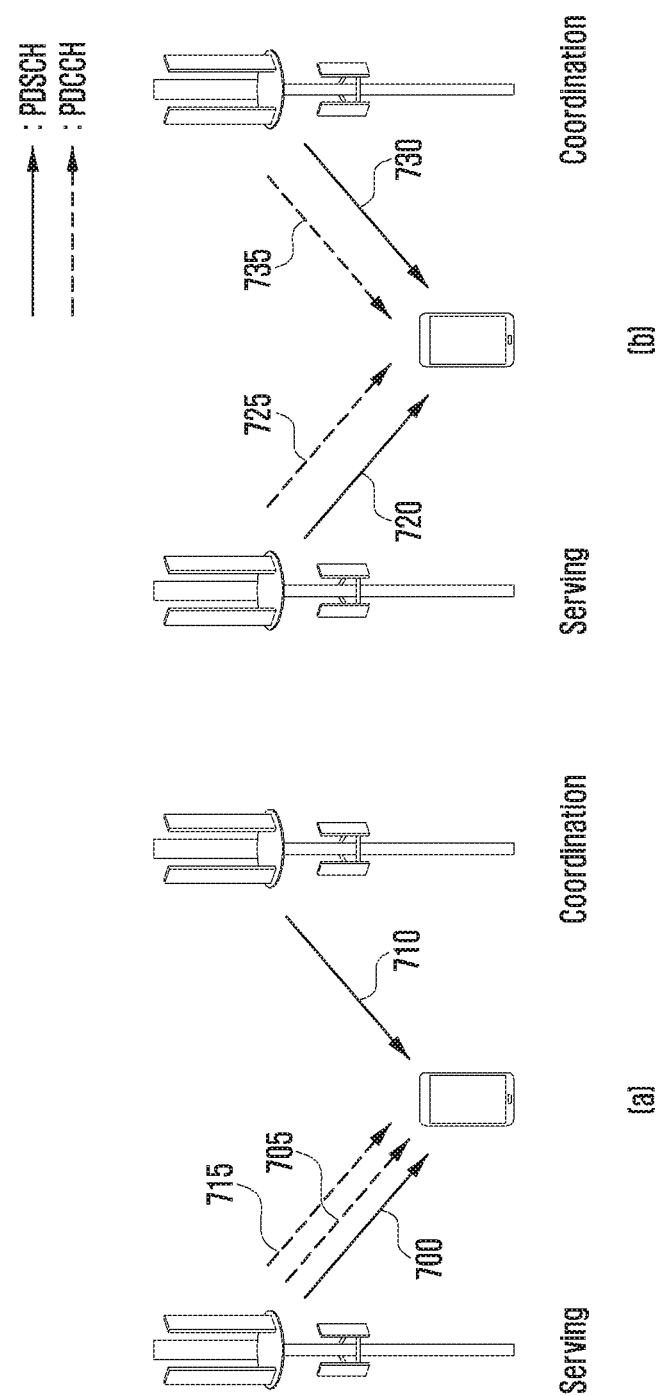
FIG. 7 is a diagram illustrating an example of physical downlink shared channel (PDSCH) and physical downlink control channel (PDCCH) transmissions transmitted in two TRPs according to an embodiment of the disclosure.

FIG. 7 is a diagram illustrating an example of PDSCH and PDCCH transmissions transmitted in two TRPs according to an embodiment of the disclosure.

If PDSCHs 700 and 710 transmitted in two TRPs are allocated DCI information by PDCCHs 705 and 715 transmitted in one serving TRP as in the case (a), coverage of PDCCHs 705 and 715 will be the same. However, if PDSCHs 720 and 730 transmitted in the two TRPs are allocated DCI information by PDCCH 725 transmitted in the serving TRP and PDCCH 735 transmitted in coordination TRP, respectively as in the case (b), coverage of the PDCCHs 725 and 735 may be different. Since a distance from the terminal to the serving TRP is usually closer than a distance to the coordination TRP, the reception performance of the PDCCH 735 transmitted from the coordination TRP may be lower than that of the PDCCH 725, which makes it difficult for the terminal to receive the PDSCH 730 from the coordination TRP.

Method 2 (Signaling Through Multiple DCIs Having Different Structures)

The second method is to transmit information necessary for receiving multiple PDSCHs from the multiple TRPs or beams using the multiple DCIs having different structures. Referring to 610 of FIG. 6, the control information related to PDSCH reception transmitted from one serving TRP (TRP #0) is signaled through a normal DCI (nDCI, DCI #0) including all information included in a normal single point transmission. Herein, the term "serving TRP" means the TRP used when the base station performs the single point transmission to the corresponding terminal and when the base station performs the multiple point transmission. On the other hand, the control information related to the reception of the PDSCH transmitted in the coordination TRP other than the serving TRP is signaled by shortened DCIs (sDCI, sDCI #1, . . . , sDCI #(N−1)) having a payload shorter than nDCI.

When the DCI length transmitted in the coordination TRP other than the serving TRP is shortened, there are an advantage in that firstly, there is no need to design DCIs having different sizes according to the number of coordination TRPs, secondly, the DCI transmission overhead for the NC-JT is reduced, and thirdly, the transmission performance of sDCIs transmitted in other TRPs other than the serving TRP is guaranteed, and the like. For example, even if the distance from the terminal to the coordination TRP is farther than the distance to the serving TRP, since the sDCI payload of the PDCCH 735 transmitted from the coordination TRP is smaller than the nDCI payload of the PDCCH 725 transmitted from the serving TRP, it is possible to compensate for the efficiency loss due to the distance. On the other hand, in the case of the method 2, there is a disadvantage in that the degree of freedom of the DCI signaling for the PDSCHs transmitted in the coordination TRP is more limited than the method 1.

Method 3 (Signaling Through DCI Having Large Payload)

The third method is to transmit information necessary for receiving multiple PDSCHs from the multiple TRP/beams using one DCI having a payload of a large size. Referring to 620 of FIG. 6, information for receiving all PDSCHs transmitted in a serving TRP (TRP #0) and other coordination TRPs (TRP #1, . . . , TRP #(N−1)) DCI is included in one DCI (long DCI, lDCI #0). In this case, the payload included in one lDCI is increased by scheduling flexibility to permit multiple coordination TRPs. In this case, the lDCI is transmitted in the serving TRP, and DCI transmission burden offloading for the NC-JT is difficult to be performed. In addition, there may also be a burden to design lDCIs with different payloads depending on the number of coordination TRPs.

In the following embodiments, specific support schemes for the arranged DCI design methods will be discussed in detail 1-2-th Embodiment In a 1-2-th embodiment, a concrete method for multiple DCI based NC-JT signaling based on the multiple DCIs is provided as in the methods 1 and 2 described above.

As described above, the terminal receives the DCI by performing the blind decoding on the search space without knowing the information on the PDCCH even in the case of the single TRP transmission, i.e., in the case of receiving the single DCI. Meanwhile, when one terminal needs to receive the multiple DCIs for the NC-JT transmission and reception, the terminal does not know the number of PDSCHs that the terminal should receive, and therefore performs the blind decoding having high complexity. For example, in the case in which the terminal receives the multiple DCIs and all of the DCIs are in the same search space, even when the terminal performs the blind decoding on the search space and finds one DCI allocated to the terminal, the terminal needs to perform the blind decoding without stopping. Alternatively, if the terminal receives the multiple DCIs and all or some of DCIs are present in different search spaces, the terminal needs to perform all blind decoding on various search spaces, which increases the complexity.

In this embodiment, the dependency between the DCI for the PDSCH transmitted in the coordination TRP and the DCI for the PDSCH transmitted in the serving TRP are defined to provide a concrete method for solving the above problem.

Example 1 (Reduction of Blind Decoding Complexity by Terminal Implementation)

Figure 8A:
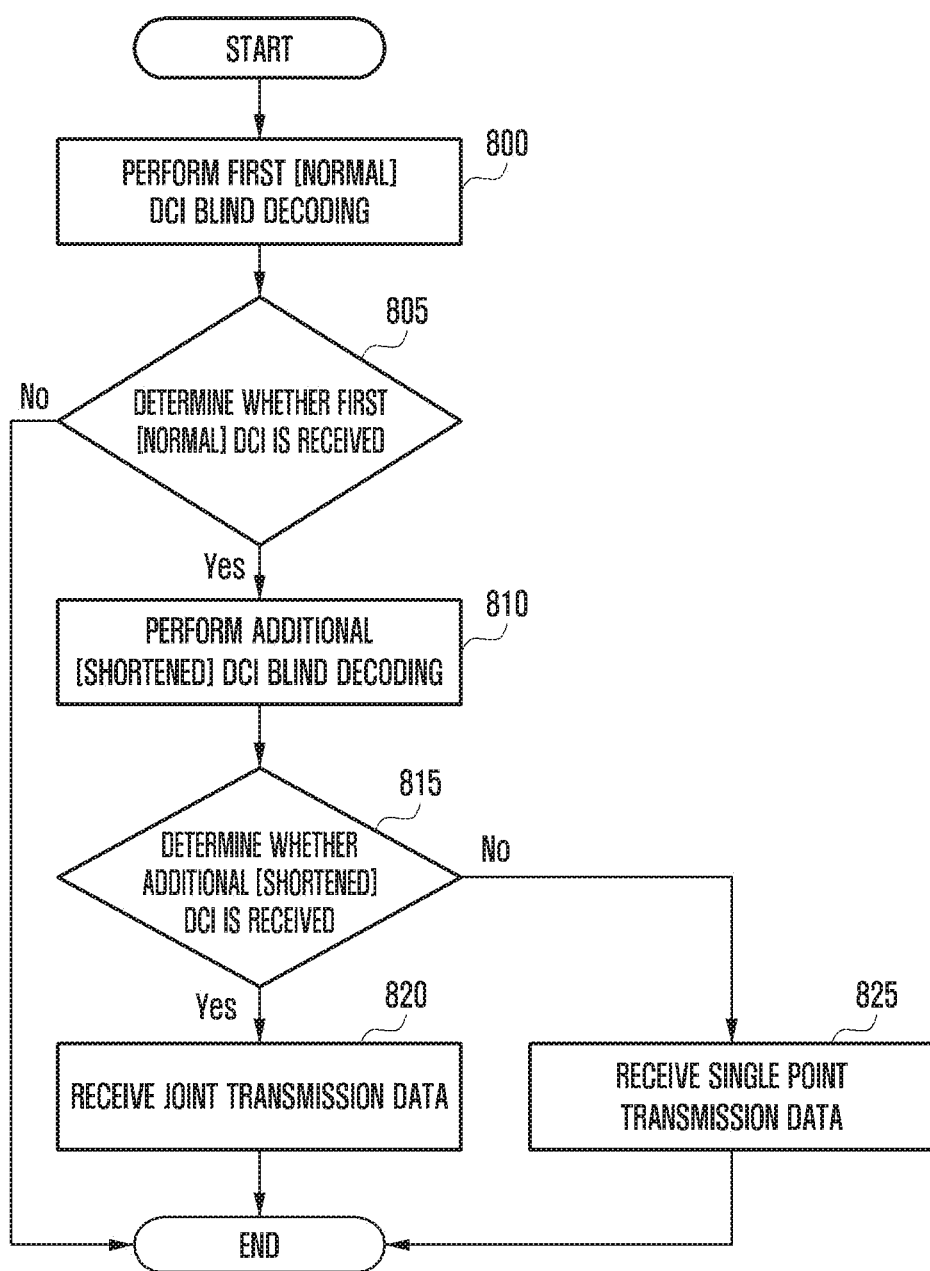
FIGS. 8A and 8B are diagrams illustrating a method for a terminal for reducing complexity of blind decoding according to various embodiments of the disclosure.
Figure 8B:
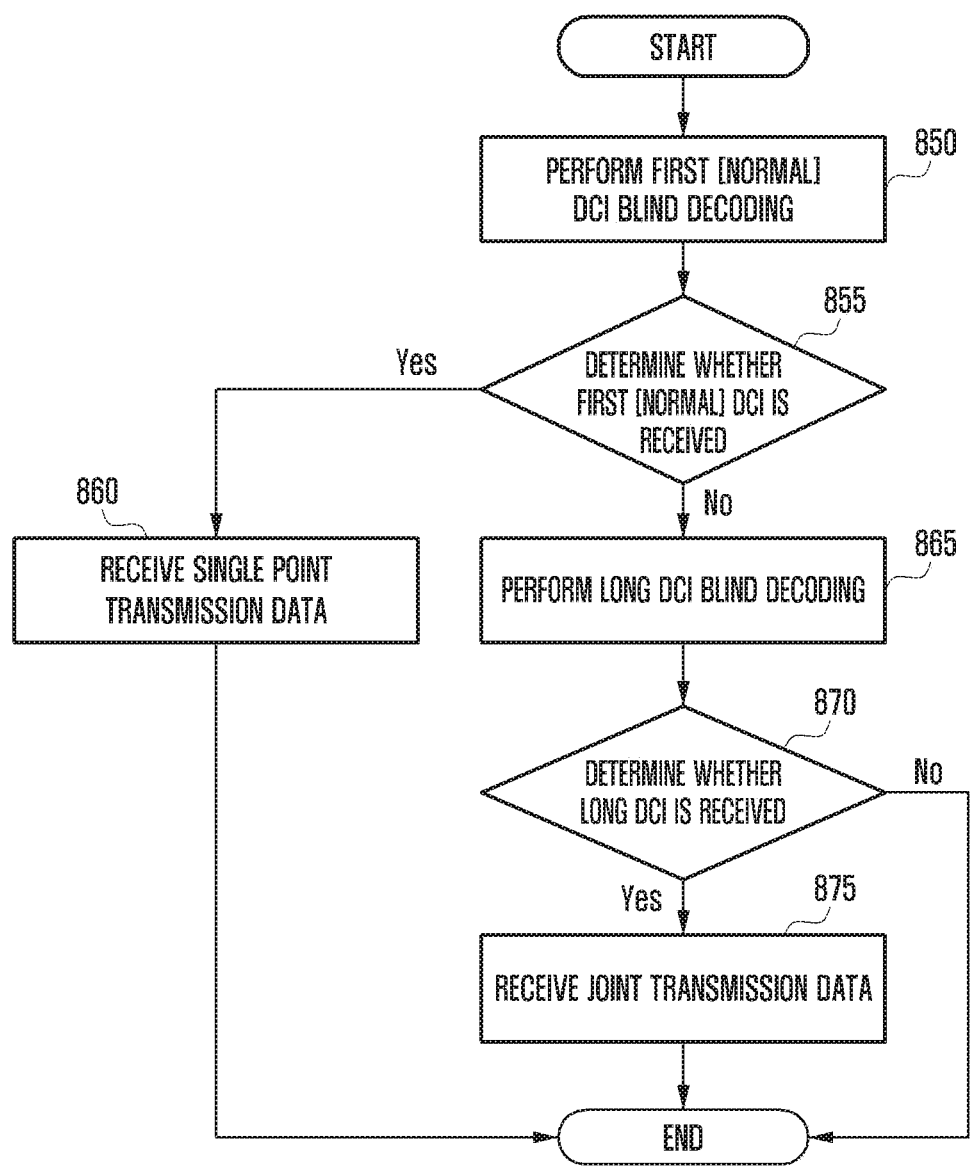

FIGS. 8A and 8B are diagrams illustrating a method for a terminal for reducing complexity of blind decoding according to various embodiments of the disclosure.

The terminal may determine the number of DCIs that can be received at a time according to the unique capability of each terminal. If the terminal is capable of simultaneously receiving more than one DCI, the base station may transmit a single DCI for the single TRP transmission or the multiple DCIs for the NC-JT support according to the channel environment, and the terminal needs to perform the blind decoding several times because of knowing the determination matters of the base station. Meanwhile, referring to the methods 1, 2, and 3, it can be seen that the DCI (nDCI, DCI #0) structure for single TRP transmission is identical regardless of NC-JT DCI design. Therefore, the terminal always searches for the DCI within the search space on the assumption of the single TRP transmission at the time of the first blind decoding (800, 850). Hereafter, in the case of the method 1 or 2, the blind decoding for the additional DCIs is performed only when the nDCI is present (805, 810). If the additional DCIs (sDCI, DCI #1 . . . ) are detected, the blind decoding is repeated until no more DCIs are detected. In the case of the method 3, since it can be seen that if no nDCI exists, the blind decoding is performed on the lDCI (855, 865) and if the nDCI exists, the single TRP transmission is performed, the blind decoding is not performed on the lDCI (855, 860).

Specifically, the process of FIG. 8A according to the methods 1 and 2 will be described as follows. The terminal performs the blind decoding (800) to search for a normal DCI (first DCI) in the search space, and determines whether the first DCI is received (805). At this time, if the first DCI does not exist, the operation stops. If the first DCI exists, the terminal performs the blind decoding of the shortened DCI (additional DCIs) (810). Hereinafter, the terminal determines whether to receive the additional DCIs (815), and if received, the terminal receives data according to the joint transmission (820), and if not received, the terminal receives data according to the single point transmission (825).

Specifically, the process of FIG. 8B according to the method 3 will be described as follows. The terminal performs the blind decoding (850) to search for a normal DCI (first DCI) in the search space, and determines whether the first DCI is received (855). At this time, if the first DCI exists, the terminal receives data according to the single point transmission (860). If the first DCI does not exist, the terminal performs the blind decoding on the long DCI (865). Hereinafter, the terminal determines whether the long DCI is received (870), and the terminal stops the operation if the long DCI is not received and the joint and receives the joint transmission data according to the long DCI if the long DCI is received (875).

Example 2 (Multiple RNTI Configuration for NC-JT)

In Example 1, when all DCIs allocated to one terminal are scrambled to the same RNTI, in some cases, the terminal may cause ambiguity in performing the blind decoding the DCI from the serving TRP. For example, if multiple DCI structures/payload sizes are all the same or the DCI payload sizes such as nDCI and sDCI are different as in the method 1, when the nDCI payload size itself for the single TRP transmission may be several or when all DCIs are transmitted within one control resource set (control resource SET (CORESET)), the terminal may not identify whether the first blind decoded DCI is the DCI for the serving TRP or the DCI for the coordination TRP. In order to solve such a problem, the base station allocates one or more RNTIs for PDCCH decoding of the terminal, and thus the terminal receiving the multiple DCIs can scramble each DCI with different RNTIs.

Example 3 (Notification of Presence or Absence of Additional DCIs (sDCI, DCI #1 . . . ) Through Serving TRP DCI (nDCI, DCI #0))

In example 3, the base station may notify the terminal of the presence of the additional DCIs (sDCI, DCI #1 . . . ) based on one bit included in the DCI (nDCI, DCI #0) for the serving TRP. In the case of the example 1 or 2, even if the terminal very accurately receives the nDCI, there is a risk of false alarm and miss detection for sDCI when the reception performance of sDCI deteriorates. However, it is possible to prevent such a risk in advance through additional information of one bit, and it is possible to prevent the unnecessary blind decoding of the terminal if the sDCI does not exist. When the information on the presence or absence of the sDCI included in the nDCI does not match the sDCI blind decoding result, that is, when one information indicates that there is the sDCI and other information indicates that there is no sDCI, the terminal is considered that the sDCI is not transmitted.

Example 4 (Notification of Position Information of Additional DCIs (sDCI, DCI #1 . . . ) Through Serving TRP DCI (nDCI, DCI #0))

In Example 4, the base station allocates two or more bits to the DCI (nDCI, DCI #0) for the serving TRP to notify the terminal of the presence or absence of the additional DCIs as well as the position information of the corresponding additional DCIs when the additional DCIs exist, for example, the information on the CORESET information or the CORESET candidate group, and the like. The following Table 2 shows an example in which two bits are used for the additional DCI position information. If the corresponding bit is '00', the terminal recognizes that no additional DCI has been transmitted and the blind decoding may be no longer performed. On the other hand, in the case of '01', '10', or '11', the terminal can perform the blind decoding based on a known position through higher layer signaling, thereby reducing terminal complexity.

TABLE 2

| Value of additional DCI information | Description |
| --- | --- |
| 00 | No additional DCI |
| 01 | Higher layer configured CORESET #0 |
| 10 | Higher layer configured CORESET #1 |
| 11 | Higher layer configured CORESET #2 |

Example 5 (Notification Information on the Number of Additional DCIs (sDCI, DCI #1 . . . ) Through Serving TRP DCI (nDCI, DCI #0))

In Example 5, the base station allocates two or more bits to the DCIs (nDCI, DCI #0) for the serving TRP to notify the terminal of the presence or absence of the additional DCIs as well as the information on the number of additional DCIs when the additional DCIs exist. The following Table 3 shows an example in which two bits are used for the information on the number of additional DCIs. If the corresponding bit is '00', the terminal recognizes that no additional DCI has been transmitted and the blind decoding may be no longer performed. On the other hand, in case of '01', '10', or '11', it is recognized that 1, 2, and 3 additional DCIs are transmitted, respectively, so that it is possible to reduce the terminal complexity by performing the blind decoding on the corresponding number of additional DCIs.

TABLE 3

| Value of additional DCI information | Description |
| --- | --- |
| 00 | No additional DCI |
| 01 | One additional DCI |
| 10 | Two additional DCIs |
| 11 | Three additional DCIs |

The above Examples are not necessarily applied independently, but may be used in combination of one or more. For example, the multiple RNTIs in Example 2 can be applied with Example 3, 4, or 5. As another example, the above Examples 4 and 5 may be applied together, such that the position information and the information on the number of additional DCIs can be indicated together through the serving TRP DCIs (nDCI, DCI #0). The following Table 4 shows an example of the case in which the above Examples 4 and 5 are applied together and two bits are used for the additional DCI count information.

TABLE 4

| Value of additional DCI information | Description |
| --- | --- |
| 00 | No additional DCI |
| 01 | One additional DCI at higher layer configured CORESET #0 |
| 10 | One additional DCIs at higher layer configured CORESET #1 |
| 11 | Two additional DCIs at higher layer configured CORESET #2 |

1-3-th Embodiment

In a 1-3-th embodiment, a method for designing a shortened DCI for multiple DCI reception is proposed. In the NR system, the DCIs (nDCI, normal DCI) for the single TRP transmission may consist of the following information. In the following description, the payload required for each information is predicted based on one codeword, and if more than one codeword is used, the payload of some information may be increased in proportion to the number of codewords.

Carrier indicator (~3 bits): Specifies a carrier to which the corresponding DCI schedules among multiple component carriers.

Resource allocation header (1 bit): Specifies the resource allocation type.

Resource block allocation (~20 bits): Specifies the actual RB allocation according to the resource allocation type. In the NR system, the total system bandwidth may can be divided into several bandwidth parts, and a first part of the resource block allocation (e.g., first X=10 bits) specifies some or all of the 'bandwidth part', and the remaining second part (e.g., the remaining Y=10 bits) can specify the RBs actually allocated within the selected 'bandwidth parts'.

TPC command for UL (~2 bits): Specify uplink power control information.

Downlink allocation index (0 bit for FDD and ~5 bits for TDD): Specifies DL/UL mapping information for TDD HARQ.

HARQ process number (~3 bits): Specifies HARQ process number used by the corresponding DCI.

Modulation and coding scheme (~5 bits): Specifies modulation order and coding rate used by the corresponding DCI.

New data indicator (1 bit): Specifies whether the corresponding DCI is for new data transmission or retransmission.

Redundancy version (~2 bits): Specifies redundancy version information used by the corresponding DCI.

Precoding information (0 bit for transparent DMRS and ~8 bits for non-transparent DMRS): Specifies precoding information when DMRS and PDSCH precoding are not the same (non-transparent DMRS).

Antenna ports, scrambling identity and number of layers (~4 bits): Transmit MIMO related information such as DMRS antenna port number, scrambling information, and number of layers to be transmitted.

SRS request (~3 bits): Requests aperiodic SRS transmission, specifies SRS resource or SRS port to be transmitted, or the like.

PDSCH RE mapping and PQI (~2 bits): Transmit data channel rate matching information DL data transmission timing (~2 bits): Transmits the transmission timing information for the PDSCH scheduled by the DCI.

UL control channel resource (~2 bits): Transmit UL control channel resource information on PDSCH that corresponding DCI schedules DL data transmission timing (~2 bits): Transmits the transmission timing information for the PDSCH scheduled by the DCI.

DMRS RE pattern/density (~2 bits): Transmit information such as DMRS RE pattern and RS density for the PDSCH scheduled by the DCI.

According to the above information, the DCI payload for the single TRP transmission needs about 50 to 60 bits. On the other hand, some of the above information may be shared between the serving TRP and the coordination TRP in the NC-JT transmission. For example, the uplink-related information not related to the NC-JT, such as TPC command for UL, SRS request, and UL control channel resource can be omitted in the sDCI for the coordination TRP.

In addition, in the case of the resource block allocation, it is also possible to support full flexible resource allocation for multiple TRPs (in this case, the resource block allocation payload is increased in proportion to the number of multiple TRPs). However, the PDSCH that the coordination TRP shares the allocation of the bandwidth part with the PDSCH that the serving TRP transmits in consideration of the sDCI transmission burden. This is because the bandwidth part of the PDSCH scheduled by the sDCI follows the 'bandwidth part' indicated by the first resource block allocation part of the nDCI (e.g., the first X=10 bits) and only the second part (e.g., the remaining Y=10 bits) of the resource block allocation can be transmitted to the sDCI.

Figure 9:
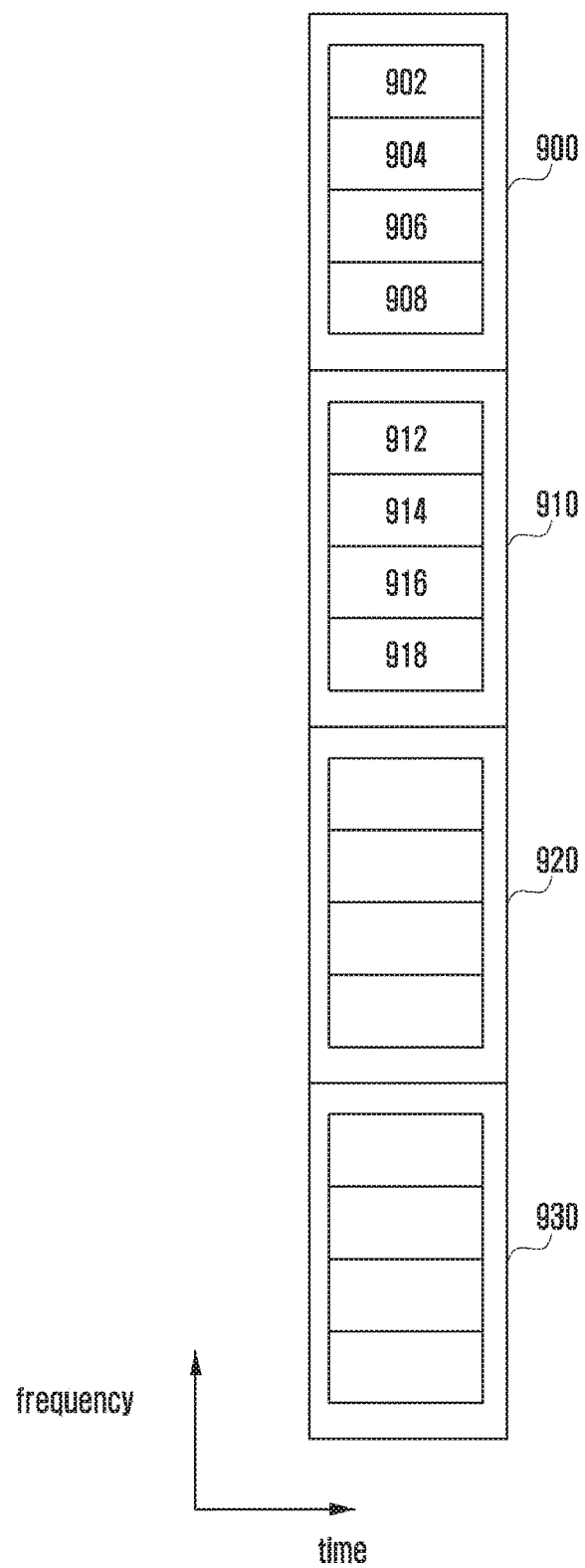
FIG. 9 is a diagram illustrating an example of non-coherent joint transmission (NC-JT) resource configuration by sharing resource allocation information between nDCI and sDCI according to an embodiment of the disclosure.

FIG. 9 is a diagram showing an example of the NC-JT resource configuration by sharing the bandwidth part allocation information between nDCI and sDCI according to an embodiment of the disclosure.

In FIG. 9, for convenience of explanation, it is assumed that the resource block allocation of the nDCI consists of a total of 8-bit bitmap, the first part of 4 bits indicates allocation information for four bandwidth parts 900, 910, 920 and 930, and the second part of 4 bits consisting of 4 bits indicates allocation information for four RB subsets (e.g., in the case of the resource part 900, 902, 904, 906, and 908) defined in each bandwidth part.

If the first part of the resource block allocation in the nDCI is allocated as '1100' and the bandwidth parts 900 and 910 are used for the PDSCH transmission of the serving TRP, the sDCI may also share the information and use the same bandwidth parts 900 and 910 for the PDSCH transmission of the cooperation TRP. On the other hand, the detailed RB subset can be set for each sDCI. For example, if 4 bits of the resource block allocation of the sDCI is set as '0101', it can be understood that four RB subsets 904, 908, 914, and 918 are used for the PDSCH transmission of the cooperation TRP.

The following Table 5 summarizes the information constituting the nDCI and the sDCI configured according to the above description. According to the following Table 5 and the estimated payload for each information, the sDCI requires a total of 30 to 40-bit payload, and it is possible to reduce about 20 bits compared with the nDCI which requires 50 to 60-bit payload. This is the number of payload bits that are saved per sDCI. If the number of sDCIs simultaneously received by the terminal increases, the overhead reduction effect is further increased.

TABLE 5

| DCI information for PDSCH | NR normal DCI (nDCI) | NR shortened DCI (sDCI) |
| --- | --- | --- |
| Carrier indicator | ○ | ○ |
| Resource allocation header | ○ | ○ |
| Resource block assignment (for indication of the bandwidth part) | ○ | X |
| Resource block assignment (for indication of the PRBs within the bandwidth part) | ○ | ○ |
| TPC command for PUCCH | ○ | X |
| Downlink Assignment Index | ○ | ○ |
| HARQ process number | ○ | ○ |
| Modulation and coding scheme | ○ | ○ |

TABLE 5-continued

| DCI information for PDSCH | NR normal DCI (nDCI) | NR shortened DCI (sDCI) |
|---|---|---|
| New data indicator | ○ | ○ |
| Redundancy version | ○ | ○ |
| Precoding information | ○ | ○ |
| Antenna ports, scrambling identity and number of layers | ○ | ○ |
| SRS request | ○ | X |
| PDSCH RE mapping and PQI | ○ | ○ |
| HARQ timing | ○ | ○ |
| UL control channel resource | ○ | X |
| DL data transmission timing | ○ | ○ |
| Number of transmission slots | ○ | ○ |
| DMRS pattern | ○ | ○ |

In the above description, the types of information and the information amount included in the nDCI are only examples, and detailed values thereof may be changed in actual application. At this time, it is obvious that the types of information and the information amount included in the sDCI may be changed accordingly. In addition, some information can be omitted or added in actual application.

Figure 10:
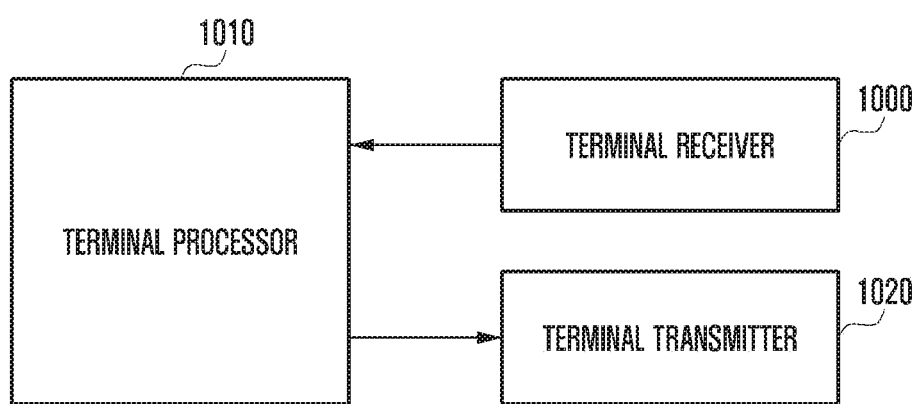
FIG. 10 is a block diagram illustrating an internal structure of a terminal according to an embodiment of the disclosure.
Figure 11:
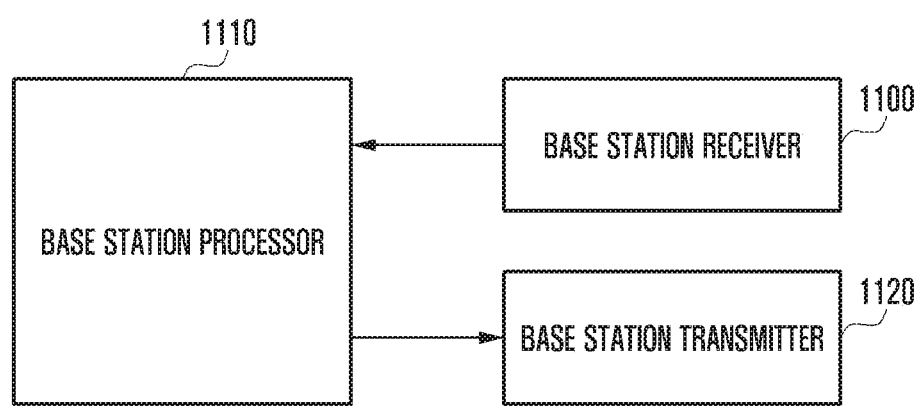
FIG. 11 is a block diagram illustrating an internal structure of a base station according to an embodiment of the disclosure.

In order to perform the above-described embodiments of the disclosure, a transmitter, a receiver, and a processor of the terminal and the base station are each shown in FIGS. 10 and 11. The 1-1-th and 1-3-th embodiments describe the transmission and reception method of the base station and the terminal for DCI configuration/transmission/reception for the NC-JT resource and the receiver, the processor, and the transmitter of the base station and the terminal for performing the method should be operated according to each embodiment.

In detail, FIG. 10 is a block diagram illustrating an internal structure of a terminal according to an embodiment of the disclosure.

As illustrated in FIG. 10, the terminal according to the embodiment of the disclosure may include a terminal receiver 1000, a terminal transmitter 1020, and a terminal processor 1010. The terminal receiver 1000 and the terminal transmitter 1020 are collectively referred to as a transceiver in the embodiment of the disclosure. The transceiver may transmit/receive a signal to/from the base station. The signal may include control information and data. For this purpose, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the terminal processor 1010 and transmit the signal output from the terminal processor 1010 on the radio channel. The terminal processor 1010 may control a series process to operate the terminal according to the embodiment of the disclosure as described above. For example, the terminal receiver 1000 receives a signal including the nDCI and the sDCI or the 1DCI from the base station, and the terminal processor 1010 may perform a control to perform the blind decoding on the signal. Hereinafter, the terminal processor 1010 may determine whether to receive one or more PDSCHs according to the blind decoding result, and may the terminal receiver 1000 to receive at least one PDSCH. The terminal transmitter 1020 may transmit acknowledgement (ACK)/negative acknowledgement (NACK) to the base station according to the result of the at least one PDSCH decoding.

FIG. 11 is a block diagram illustrating an internal structure of a terminal according to an embodiment of the disclosure.

As illustrated in FIG. 11, the base station of the disclosure may include a base station receiver 1100, a base station transmitter 1120, and a base station processor 1110. The base station receiver 1100 and the base station transmitter 1120 are collectively referred to as a transceiver in the embodiment of the disclosure. The transceiver may transmit/receive a signal to/from the terminal. The signal may include control information and data. For this purpose, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the base station processor 1110 and transmit the signal output from the base station processor 1110 on the radio channel. The base station processor 1110 may control a series process to operate the base station according to the embodiment of the disclosure as described above. For example, the base station processor 1110 may determine whether to transmit at least one DCI (nDCI, sDCI, 1DCI, or the like) according to the channel status information reported by the terminal, and perform a control to perform the at least one DCI. Hereinafter, the base station transmitter 1120 transmits the at least one DCI to the terminal. The base station receiver 1100 transmits the ACK/NACK for at least one PDSCH that the terminal schedules using the at least one DCI, receives the ACK/NACK, and transmits the received ACK/NACK to the base station processor 1110.

Meanwhile, the embodiments of the disclosure disclosed in the present specification and the accompanying drawings have been provided only as specific examples in order to assist in understanding the disclosure and do not limit the scope of the disclosure. That is, it is obvious to those skilled in the art to which the disclosure pertains that other change examples based on the technical idea of the disclosure may be made without departing from the scope of the disclosure. Further, each embodiment may be combined and operated as needed. For example, some of the first embodiment and the second embodiment of the disclosure are combined with each other to operate the base station and the terminal. In addition, although the above embodiments are presented on the basis of the FDD LTE system, other modifications based on the technical idea of the embodiment may be applicable to other systems such as a TDD LTE system and a 5G or NR system.

Second Embodiment

A wireless communication system has been developed from a wireless communication system providing a voice centered service in the early stage toward broadband wireless communication systems providing high-speed, high-quality packet data services, like communication standards of high speed packet access (HSPA), long term evolution (LTE), or evolved universal terrestrial radio access (E-UTRA) of the 3GPP, high rate packet data (HRPD) and ultra mobile broadband (UMB) of 3GPP2, IEEE 802.16e or the like. In addition, the 5G or new radio (NR) communication standard is being produced as the 5G wireless communication system.

As a representative example of the broadband wireless communication system, the LTE/LTE-A system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a user equipment (UE) or a mobile station (MS)

transmits data or a control signal to a base station (eNodeB or base station (BS)) and the down link refers to a radio link through which a base station transmits data or a control signal to a terminal. The multiple access scheme as described above normally allocates and operates time-frequency resources on which data or control information is transmitted to prevent the time-frequency resources from overlapping with each other, that is, establish orthogonality, thereby dividing the data or the control information of each user.

Figure 12:
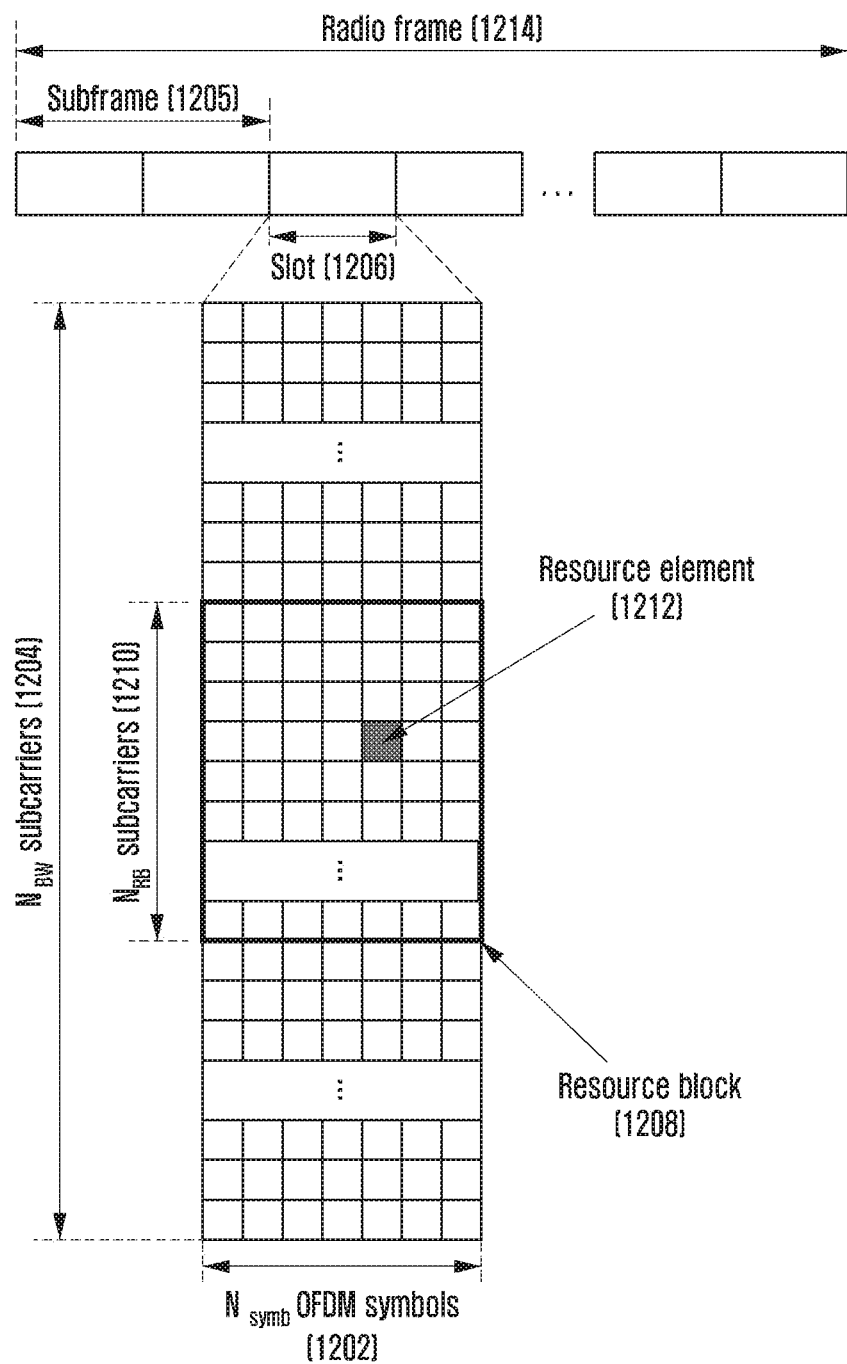
FIG. 12 is a diagram illustrating the structure of the time-frequency domain that is the radio resource area to which the data or the control channel is transmitted in a downlink of the LTE and the LTE-advanced (LTE-A) system according to an embodiment of the disclosure.

FIG. 12 is a diagram illustrating the structure of the time-frequency domain that is the radio resource area to which the data or the control channel is transmitted in a downlink of the LTE and the LTE-A system according to an embodiment of the disclosure.

In FIG. 12, an abscissa represents a time domain and an ordinate represents a frequency domain. A minimum transmission unit in the time domain is an OFDM symbol, in which one slot 1206 is configured by collecting $N_{symb}$ OFDM symbols 1202 and one subframe 1205 is configured by collecting two slots. A length of the slot is 0.5 ms and a length of the subframe is 1.0 ms. Further, a radio frame 1214 is a time domain section consisting of 10 subframes. A minimum transmission unit in a frequency domain is a sub-carrier, in which the entire system transmission bandwidth consists of a total of $N_{BW}$ sub-carriers 1204.

A basic unit of resources in the time-frequency domain is a resource element (RE) 1212 and may be represented by an OFDM symbol index and a sub-carrier index. A resource block (RB) or a physical resource block (PRB) 1208 is defined by the $N_{symb}$ consecutive OFDM symbols 1202 in the time domain and $N_{RB}$ consecutive sub-carriers 1210 in the frequency domain. Therefore, one RB 108 consists of $N_{symb} \times N_{RB}$ REs 1212. Generally, a minimum transmission unit of data is the RB unit. In the LTE system, generally, $N_{symb}=7$ and $N_{RB}=12$ and $N_{BW}$ is proportional to the system transmission bandwidth.

A data rate is increased in proportion to the number of RBs scheduled for the terminal. The LTE system is operated by defining six transmission bandwidths. In an FDD system operated by dividing a downlink and an uplink based on a frequency, a downlink transmission bandwidth and an uplink transmission bandwidth may be different from each other. A channel bandwidth represents an RF bandwidth corresponding to the system transmission bandwidth. The following Table 6 illustrates a correspondence relationship between the system transmission bandwidth and the channel bandwidth that are defined in the LTE system. For example, the LTE system having the channel bandwidth of 10 MHz is configured of a transmission bandwidth of 50 RBs.

TABLE 6

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Figure 13:
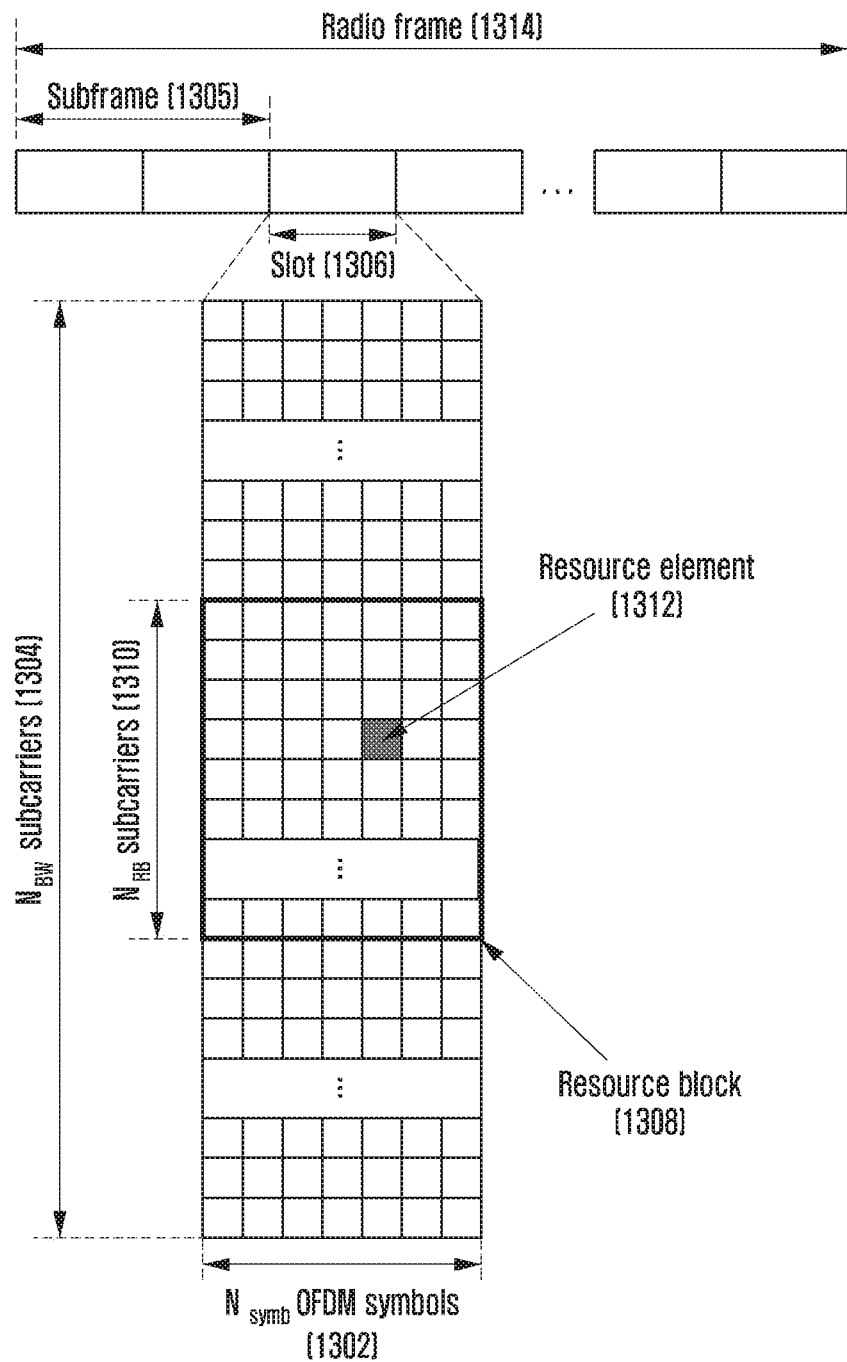
FIG. 13 is a diagram illustrating a structure of a time-frequency domain that is a radio resource area to which data or a control channel is transmitted in an uplink of the LTE and the LTE-A system according to an embodiment of the disclosure.

FIG. 13 is a diagram illustrating a structure of a time-frequency domain that is a radio resource area to which data or a control channel is transmitted in an uplink of the LTE and the LTE-A system according to an embodiment of the disclosure.

Referring to FIG. 13, an abscissa represents a time domain and an ordinate represents a frequency domain. The minimum transmission unit in the time domain is an SC-FDMA symbol 1302, and the $N_{symb}$ SC-FDMA symbols are gathered to form one slot 1306. Two slots are gathered to form one subframe 1305. The minimum transmission unit in the frequency domain is a subcarrier, in which the entire system transmission bandwidth 1304 includes a total of $N_{BW}$ subcarriers. The $N_{BW}$ has a value in proportion to the system transmission bandwidth.

A basic unit of resources in the time-frequency domain is a resource element (RE) 1312 and may be defined by an SC-FDMA symbol index and a subcarrier index. The resource block (RBs) 1308 is defined as $N_{symb}$ consecutive SC-FDMA symbols in the time domain and $N_{symb}$ consecutive subcarriers in the frequency domain. Accordingly, one RB consists of $N_{symb} \times N_{RB}$ REs. In general, the minimum transmission unit of data or control information is an RB unit. The PUCCH is mapped to a frequency region corresponding to 1 RB and transmitted for one subframe.

Figure 14:
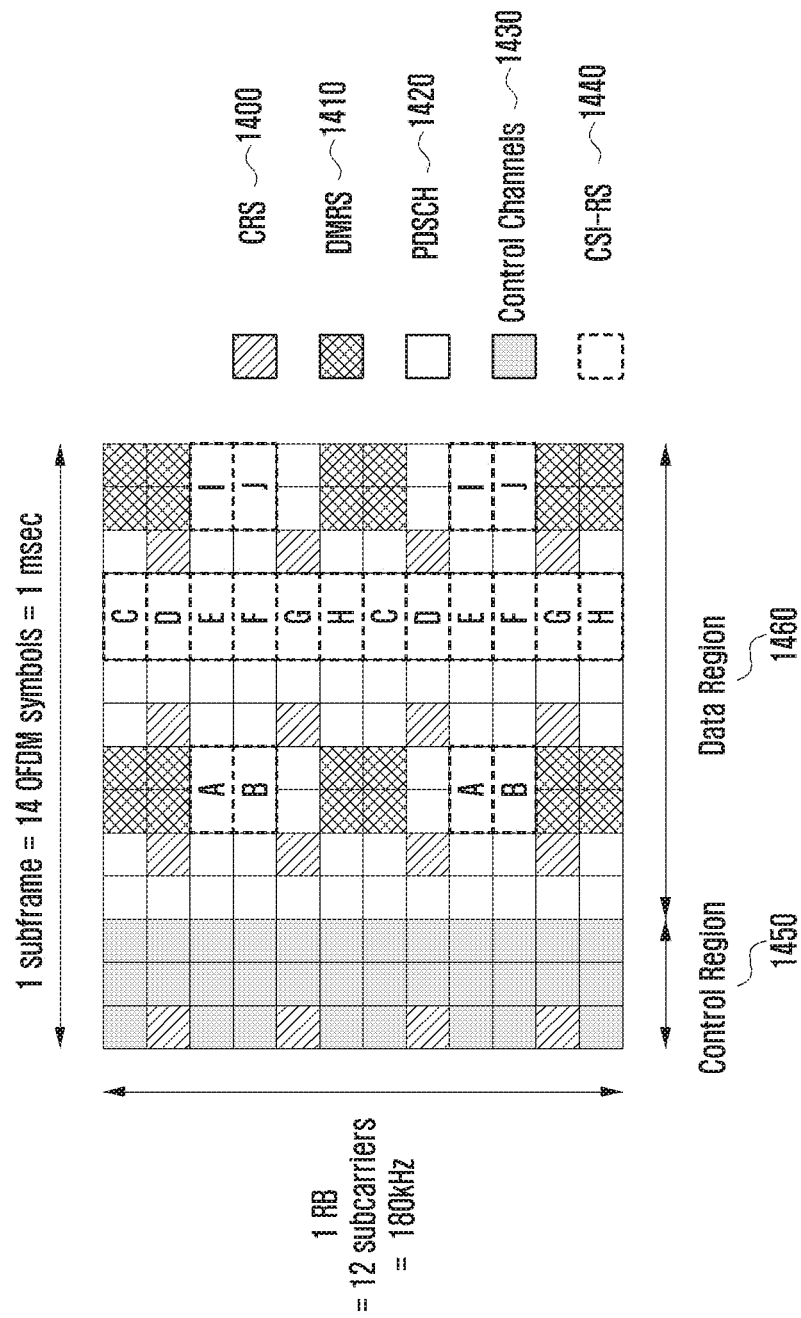
FIG. 14 illustrates radio resources of 1 RB that are a minimum unit that may be downlink-scheduled in the LTE and the LTE-A system according to an embodiment of the disclosure.

FIG. 14 illustrates radio resources of 1 RB that are a minimum unit that may be scheduled by a downlink in the LTE and the LTE-A system according to an embodiment of the disclosure. A plurality of different kinds of signals may be transmitted to the radio resource shown in FIG. 14 as follows.

1. Cell specific RS (CRS) 1400: Reference signal periodically transmitted for all terminals belonging to one cell and commonly used in the plurality of mobile stations.

2. Demodulation reference signal (DMRS) 1410: Reference signal transmitted for a specific terminal and transmitted only when data are transmitted to the corresponding mobile station. The DMRS may be configured of a total of 8 DMRS ports. In the LTE-A, port 7 to port 14 correspond to a DMRS port and each port uses code division multiplexing (CDM) or frequency division multiplexing (FDM_to maintain orthogonality, thereby preventing mutual interference.

3. Physical downlink shared channel (PDSCH) 1420: Used to transmit traffic from the base station to the terminal on the data channel transmitted to the downlink and transmitted using the RE to which the reference signal is not transmitted in the data region 1460.

4. Channel status information reference signal (CSI-RS) 1440: Reference signal transmitted for terminals belonging to one cell and used to measure the channel status. A plurality of CSI-RSs may be transmitted to one cell.

5. Other control channels (PHICH, PCFICH, PDCCH) 1430: Providing control information required for the terminal to receive PDSCH or used to transmit ACK/NACK for operating the HARQ for the data transmission of the uplink. Control region 1450 is illustrated in FIG. 14.

In order for the terminal to estimate the channel in the wireless communication system, the base station should transmit the reference signal for the channel estimation. The terminal may perform the channel estimation using the reference signal and demodulate the received signal. In addition, the terminal may check the channel state using the reference signal and feeds back the checked channel state to the base station.

In the case of the DMRS in the signal, the information according to the following Table 7 or Table 8 is transmitted through the DCI, and the information includes the following DMRS information.

Antenna port(s)
Scrambling identity ($n_{SCID}$)
number of layers (rank)

In the SU-MIMO operation, the DMRS information is signaled from the base station to the terminal through the DCI to dynamically operate the rank adaptation, and the dynamic switching for the SU-MIMO and MU-MIMO operations may be supported. In addition, the function of separating and signaling DMRS from neighbor cell using $n_{SCID}$ is also supported in the coordinated multi-points (CoMP) operation.

TABLE 7

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 8

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 0 | 1 layer, port 7, $n_{SCID}$ = 0 (OCC = 2) | 0 | 2 layer, port 7-8, $n_{SCID}$ = 0 (OCC = 2) |
| 1 | 1 layer, port 7, $n_{SCID}$ = 1 (OCC = 2) | 1 | 2 layer, port 7-8, $n_{SCID}$ = 1 (OCC = 2) |
| 2 | 1 layer, port 8, $n_{SCID}$ = 0 (OCC = 2) | 2 | 2 layer, port 7-8, $n_{SCID}$ = 0 (OCC = 4) |
| 3 | 1 layer, port 8, $n_{SCID}$ = 1 (OCC = 2) | 3 | 2 layer, port 7-8, $n_{SCID}$ = 1 (OCC = 4) |
| 4 | 1 layer, port 7, $n_{SCID}$ = 0 (OCC = 4) | 4 | 2 layer, port 11, 13, $n_{SCID}$ = 0 (OCC = 4) |
| 5 | 1 layer, port 7, $n_{SCID}$ = 1 (OCC = 4) | 5 | 2 layer, port 11, 13, $n_{SCID}$ = 1 (OCC = 4) |
| 6 | 1 layer, port 8, $n_{SCID}$ = 0 (OCC = 4) | 6 | 3 layer, port 7-9 |
| 7 | 1 layer, port 8, $n_{SCID}$ = 1 (OCC = 4) | 7 | 4 layer, port 7-10 |
| 8 | 1 layer, port 11, $n_{SCID}$ = 0 (OCC = 4) | 8 | 5 layer, port 7-11 |
| 9 | 1 layer, port 11, $n_{SCID}$ = 1 (OCC = 4) | 9 | 6 layer, port 7-12 |
| 10 | 1 layer, port 13, $n_{SCID}$ = 0 (OCC = 4) | 10 | 7 layers, ports 7-13 |
| 11 | 1 layer, port 13, $n_{SCID}$ = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

More specifically, the following Table 7 is a signaling table that may support up to two orthogonal DMRS ports for the MU-MIMO, and the following Table 8 is a signaling table that can support up to four orthogonal DMRS ports for the MU-MIMO, and the configuration thereof may be made by the RRC.

Unlike the LTE system, in the 5G wireless communication system, 12 orthogonal DMRS ports for the MU-MIMO are supported, as well as in the case of at least CP-OFDM waveform, the downlink and uplink (DL and UL) common DMRS structure is considered to be supported. When 12 orthogonal DMRS ports for the MU-MIMO are supported, the problem that the signaling overhead therefor is greatly increased occurs. In addition, it is important to use the effective signaling for the DMRS information when the DL/UL common DMRS structures are supported. Accordingly, the disclosure provides an effective DMRS configuring and signaling method for solving such a problem.

Hereinafter, embodiments of the disclosure will be described in detail with reference to the accompanying drawings. Hereinafter, as an example of the LTE or LTE-A system, an embodiment of the disclosure is described below, but the embodiment of the disclosure may be applied to other communication systems having similar technical background or a channel form. For example, 5G mobile communication technologies (5G, new radio, NR) developed after the LTE-A could be included. According to the disclosure, the basic structure of the time-frequency domain in which the signal is transmitted in the downlink and uplink is different from FIGS. 12 and 13 or the kind of signals transmitted to the downlink and the uplink may also be applied to other cases. That is, the embodiment of the disclosure may be applied even to other communication systems by partially being changed without greatly departing from the scope of the disclosure under the decision of those skilled in the art.

If it is determined that a detailed description for the known functions or configurations related to the disclosure may obscure the gist of the disclosure, the detailed description therefor will be omitted. Further, the following terminologies are defined in consideration of the functions in the disclosure and may be changed by intentions, practices or the like of users or operators. Therefore, the definitions thereof should be construed based on the contents throughout the specification.

Hereinafter, a base station is the subject performing resource allocation of a terminal and may be at least one of eNode B, Node B, a base station (BS), a wireless access unit, a base station controller, and a node on a network. The terminal may include user equipment (UE), a mobile station (MS), a cellular phone, a smart phone, a computer, or a multimedia system capable of performing a communication function. In the disclosure, a downlink (DL) means a radio transmission path of a signal transmitted from a base station to a terminal and an uplink (UL) means a radio transmission path of a signal transmitted from the terminal to the base station.

The DMRS described below refers to a reference signal having a characteristic that UE-specific precoding is applied to a reference signal and the terminal may perform the demodulation without additionally receiving the precoding information, and the names used in the LTE system are used as they are. However, the term DMRS may be expressed in other terms depending on the user's intention and the intended use of the reference signal. For example, it may be expressed as the terms such as the UE-specific RS or the dedicated RS. More specifically, the term DMRS is merely a specific example of the disclosure in order to easily explain the descriptions of the disclosure and facilitate the understanding of the disclosure. That is, it is apparent to those skilled in the art to which the disclosure pertains that the operations can be carried out through other terms based on the technical idea of the disclosure. The term SU-MIMO or MU-MIMO described below is also used to easily describe the technical content of the disclosure and to facilitate the understanding of the disclosure. It is apparent to those skilled in the art to which the disclosure pertains that the operations of the disclosure can be carried through other terms or without using these terms.

A method for transmitting a plurality of orthogonal DMRS antenna ports to the DMRS which is the reference signal will be described in the 2-1-th embodiment of the disclosure to be described below. In the 2-2-th and 2-3-th embodiments of the disclosure, a method for the base station to signal the DMRS information to a terminal will be described. In the 2-4-th embodiment of the disclosure, when the DMRS structure common to the DL/UL is designed to be applied, the base station proposes a method for signaling the DL/UL DMRS information to the terminal. In the 2-5-th embodiments of the disclosure, when the number of MU-MIMO layers supported for each UE is larger than 2 for the method for the base station to signal the DMRS information to the terminal as proposed in the 2-3-th embodiment, the additional DMRS information signaling method will be described.

2-1-th Embodiment

A 2-1—the embodiment describes a method for transmitting a plurality of orthogonal DMRS antenna ports to the DMRS which is the reference signal of the disclosure.

Figure 15:
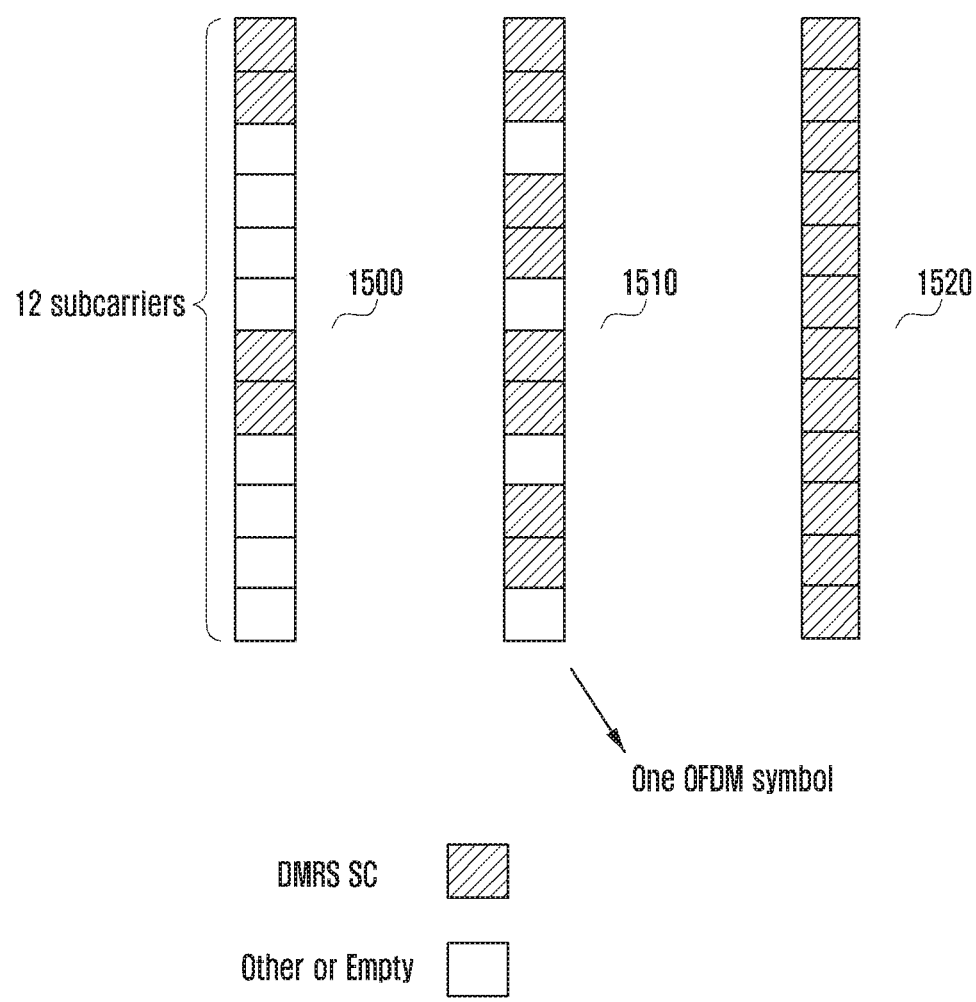
FIG. 15 is a diagram illustrating a demodulation reference signal (DMRS) structure according to an embodiment of the disclosure.

FIG. 15 is a diagram illustrating a DMRS structure according to an embodiment of the disclosure.

In the disclosure, a unit DMRS structure based on one OFDM symbol is proposed. The Unit DMRS structure based on one OFDM symbol is not only advantageous in setting the position of the reference signal for various transmission time interval (TTI), but also has advantages in low latency support and reference signal positioning for URLLC and scalability such as antenna port expansion.

As shown in FIG. 15, 12 subcarriers may be included in one OFDM symbol with respect to the PRB which is the minimum transmission unit of data. As in 1500, 1510, and 1520, the density of the DMRS subcarrier (hereinafter, interchangeably used with SC) in one OFDM symbol may be configured. 1500 and 1510 each indicate the DMRS structures in the case of four and eight DMRS SCs in 12 subcarriers, respectively, and 1520 indicates the DMRS structure in which all subcarriers consist of the DMRS SCs. In 1500 and 1510, the configuration of even-numbered DMRS SCs may be advantageous in that orphan RE does not occur when SFBC is considered as a transmit diversity technique. In 1500 and 1510, other signals such as data or other reference signals enter the SC which is not used as the DMRS SC or the SC can be emptied for DMRS power boosting. Emptying SCs that are not used as the DMRS SCs for the DMRS power boosting can be used to improve the performance of DMRS channel estimation in a low SNR region.

The DMRS structure of FIG. 15 can be used not only in the data channel but also in other channels such as control channels. In the DMRS structure shown in 1500 and 1510, since there are subcarriers where the DMRS is not transmitted, some of them can be used as a direct current (DC) subcarrier. However, in the DMRS structure of 1520, since the DMRS is transmitted in all subcarriers, it is necessary to puncture a part of the subcarriers in order to transmit the DC.

The DMRS SC shown in 1500, 1510, and 1520 may be generated based on a pseudo-random (PN) sequence or may be generated based on a Zadoff-Chu (ZC) sequence. As an example of a more specific utilization method, the DMRS structure of 1500 and 1510 can be used in a CP-OFDM system. It may be set and used at the same time-frequency position as in the UL/DL. If the UL/DL has the same DMRS structure, since it is possible to orthogonally allocate the UL/DL DMRS ports, it is possible to interference cancellation performance by improving the channel estimation performance in the environment such as a flexible duplex. In contrast, the DMRS structure of reference 1520 is based on a Zadoff-Chu (ZC) sequence similar to the LTE system and can be used in a DFT-s-OFDM system in the uplink. In this case, it may be possible to operate for low peak-to-average power ratio (PAPR) similar to the LTE system. However, the disclosure is not limited to the above-described using methods of 1500, 1510 and 1520, and for example, the DMRS structure of 1520 may be used for all the CP-OFDM, the DFT-s-OFDM, and the UL/DL.

Figure 16:
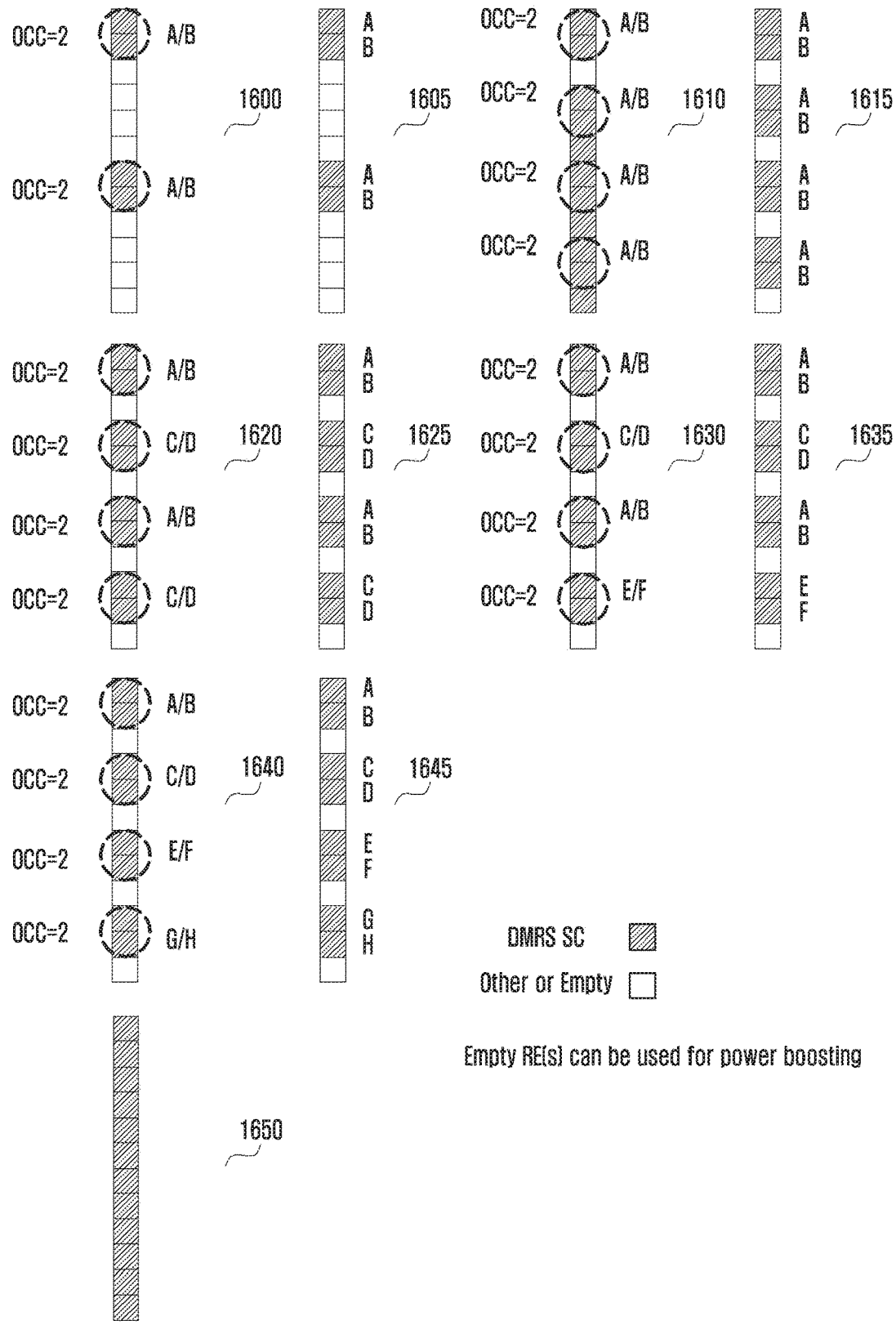
FIG. 16 is a diagram illustrating a method for mapping an antenna port to a unit DMRS structure according to an embodiment of the disclosure.

FIG. 16 is a diagram illustrating the method for mapping an antenna port to a unit DMRS structure proposed in FIG. 15 according to an embodiment of the disclosure.

In FIG. 16, the antenna port is represented by p=A, B, C, D, . . . for convenience. However, it is to be noted that the antenna port number may be represented by a different number. Also, since the mapping of the antenna port is to support a plurality of layer transmission and ranks, the antenna port matching specified below can be replaced with the term layer transmission or rank support.

Specifically, 1600 and 1605 illustrate the case in which two antenna ports are mapped to the DMRS structure of 1500 of FIG. 15. 1600 shows a method for mapping two antenna ports p=A, B by FDM and CDM by applying an orthogonal cover code (OCC) having length 2 and 1605 shows a method for mapping p=A, B by an FDM scheme without applying OCC. Next, 1610 and 1620 illustrate the case in which two antenna ports are mapped to the DMRS structure of 1510 of FIG. 15. The DMRS of 1510 may improve the channel estimation performance by increasing the density of the reference signal as compared with 1500. 1610 shows a method for mapping two antenna ports p=A, B by FDM and CDM by applying an orthogonal cover code (OCC) having length 2 and 1620 shows a method for mapping p=A, B by an FDM scheme without applying OCC.

Next, 1620 and 1630 illustrate the case in which four antenna ports are mapped to the DMRS structure of 1510 of FIG. 15. At this time, in order to improve the channel estimation performance, the subcarrier in which the DMRS is not transmitted in the DMRS structure of 1510 may be emptied and used for the DMRS power boosting. 1620 shows a method for mapping four antenna ports p=A, B, C, D by FDM and CDM by applying an orthogonal cover code (OCC) and FDM having length 2 and 1625 shows a method for mapping p=A, B, C, D by an FDM scheme without applying OCC.

Next, 1630 and 1635 illustrate a case in which six antenna ports are mapped to the DMRS structure of 1510. At this time, in order to improve the channel estimation performance, the subcarrier in which the DMRS is not transmitted in the DMRS structure of 1510 may be emptied and used for the DMRS power boosting. 1630 shows a method for mapping sixth antenna ports p=A, B, C, D, E, F by FDM and CDM by applying an orthogonal cover code (OCC) and FDM having length 2 and 1635 shows a method for mapping p=A, B, C, D, E, F by an FDM scheme without applying OCC. Unlike the antenna port mapping method, a method in which antenna ports are mapped in reference numerals 1630 and 1635 has the feature that a RS density for each antenna port is not constant. This is a design method for assuming an antenna port allocated for MU-MIMO. Since it can have different channel states for each terminal, a port having a low RS density can be allocated to a terminal having a good channel state and a port having a high RS density can be allocated a port having a poor channel state.

Next, 1640 and 1645 illustrate the case in which eight antenna ports are mapped to the DMRS structure of 1510 of FIG. 15. At this time, in order to improve the channel estimation performance, the subcarrier in which the DMRS is not transmitted in the DMRS structure of 1510 may be emptied and used for the DMRS power boosting. 1640 shows a method for mapping eight antenna ports p=A, B, C, D, E, F, G, H by FDM and CDM by applying an orthogonal cover code (OCC) and FDM having length 2 and 1645 shows a method for mapping p=A, B, C, D, E, F, G, H by an FDM scheme without applying OCC. The application of the OCC onto the frequency domain in 1600, 1610, 1620, 1630, and 1640 has an advantage that no power imbalance problem occurs. In the case of the LTE system, when the OCC is applied in time, the power imbalance problem occurs, and thus there is a limitation in that the OCC is different applied in every PRB within two PRBs.

Finally, 1650 denotes a DMRS structure of 1520 of FIG. 15, and since all 12 subcarriers are used as DMRS in 1520, a method for supporting an orthogonal DMRS antenna port using Zadoff-Chu (ZC) may be considered. In this case, as in the LTE system, it is possible to support up to 8 orthogonal antenna ports by applying 8 cyclic shift (CS) fields assuming subcarrier spacing of 15 kHz. As another method for using a DMRS structure of 1520, a method for supporting four orthogonal antenna ports by applying FDM in four subcarrier spacings. The disclosure is not limited to a method for mapping an antenna port to a DMRS structure proposed in 1600 to 1650.

Figure 17:
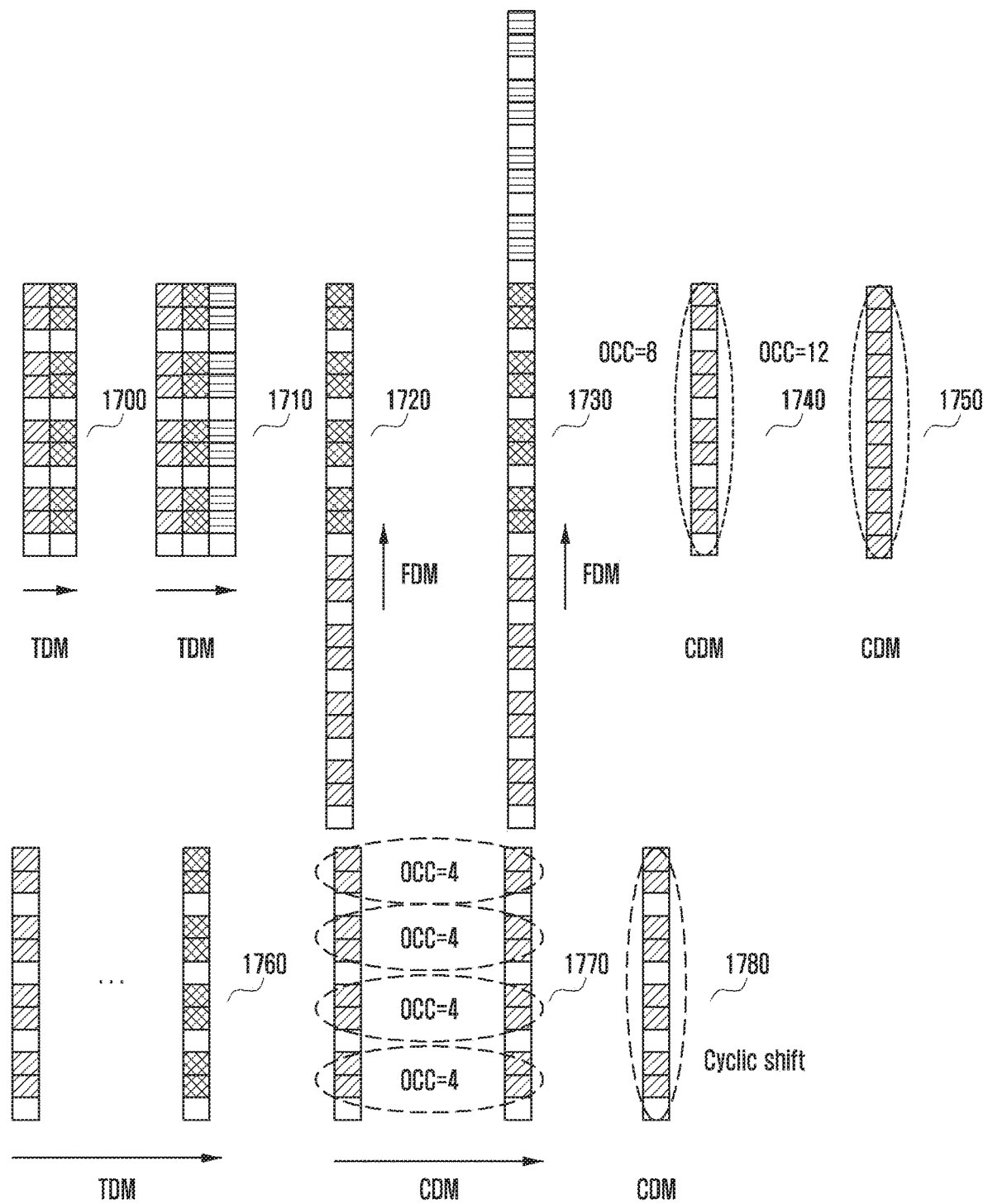
FIG. 17 is a diagram illustrating a method for mapping a larger number of antenna ports using the unit DMRS structure according to an embodiment of the disclosure.

FIG. 17 is a diagram illustrating a method for mapping a larger number of antenna ports using the unit DMRS structure proposed in FIG. 15 according to an embodiment of the disclosure. FIG. 15 shows a method for mapping up to 8 antenna ports to a unit DMRS structure. For a larger number of antenna port mappings, TDM, FDM, and CDM may be additionally applied to the unit DMRS structure. For example, as in 1700 and 1710, 1510 of FIG. 15 can be TDMed in time to map a larger number of antenna ports. In case of extending the orthogonal antenna port by using the TDM, the RS density on the frequency is maintained as it is, but the density of the DMRS is increased in the transmission unit (one PRB).

Considering that the higher rank is supported in the environment that the channel condition is very good and channel selectivity on the frequency is low in order to keep the low density of the DMRS in the transmission unit, a method for extending an orthogonal antenna port using FDM or CDM. For example, as in 1720 and 1730, 1510 can be FDMed in frequency to map a larger number of antenna ports. However, there is a disadvantage in that when the FDM is used to extend the number of antenna ports, the transmission unit expands to multiple PRBs.

It is also possible to map a larger number of antenna ports by applying an OCC having an extended length as in 1740 and 1750. More specifically, 1740 shows a method for multiplexing eight antenna ports using OCC having length 8 in 1510, and 1750 shows a method for multiplexing 12 antenna ports using OCC having length 12 in 1520. Here, the OCC code may be generated by a Walsh-Hadamard code.

Next, when all the subcarriers consist of the DMRS SC as in 1520, as described above, it is possible to extend various antenna ports according to the antenna port mapping method applied to 1520. If the subcarrier spacing is assumed to be 15 kHz in 1520 and the ZC sequence is CSed to support 8 orthogonal antenna ports, 16 orthogonal antenna ports can be extended by applying TDM as in 1700. If the FDM is used in four subcarrier spacings in 1520, up to four orthogonal antenna ports can be supported, but if the FDM is considered as in 1700, up to 8 orthogonal antenna ports can be supported. Alternatively, up to 12 orthogonal antenna ports can be supported when additional FDM is considered as in 1710.

The disclosure is not limited to the antenna port extending method proposed in FIG. 17, and it is possible to extend an orthogonal antenna port by various methods such as a method for combining TDM, FDM, and CDM. For example, as described above, there is a disadvantage in that when the number of antenna ports is extended by using only TDM as in 1700 or 1710, the density of the DMRS is increased in the transmission unit. A method for compensating for these disadvantages may perform TDM on two consecutive slots as in 1760 or apply CDM with OCC having length 4 based on two consecutive slots as in 1770. Although the description has been made based on two slots in 1760 and 1770, the time unit in which TDM or CDM is applied in 1760 and 1770 is not limited to a slot.

In addition, unlike the method for mapping up to 8 antenna ports by applying OCC having length 8 as in 1740, if the DMRS is generated as the ZC sequence, it is possible to support the additional antenna ports by using the CS as in 1780. For example, when four antenna ports are multiplexed by FDM and CDM as in 1620, an additional antenna port extension is possible using CS. If the CS field consists of four, the antenna port may be extended to a maximum of 16. In the case of using the CS instead of the OCC as in 1780, there is an advantage that the RS density on the frequency remains unchanged.

In the 5G communication system, a plurality of DMRS structures can be configured. The DMRS structure which can be configured as an example can be divided into a front-loaded DMRS and an extended (or additional) DMRS. Specifically, the front-loaded DMRS is a DMRS positioned in front of the NR-PDSCH for fast data decoding and may consist of one or two neighboring OFDM symbols. Also, the front-loaded DMRS is positioned in front of the NR-PDSCH, and a position thereof may be fixed or may be set to be flexible. For example, if the position of the front-loaded DMRS is defined as the first symbol of the NR-PDSCH, the front-loaded RS may be flexibly changed by the region of the NR-PDCCH.

Describing the advantages and disadvantages in the case in which the position of the front-loaded DMRS is fixed and in the case of the front-loaded DMRS is fixed, in the case in which the position of the front-loaded DMRS is fixed, it may be assumed that the DMRS of neighboring cells is transmitted at the same position at all times. However, the control channel region may be configured to be set or the DMRS of the data channel may not be positioned ahead in the subframe where the control channel is not transmitted, which may be vulnerable to decoding latency. If the position of the front-loaded DMRS is flexible, the front-loaded RS is always positioned in front of the data channel, which is advantageous in terms of the decoding latency. However, since the position of the front-loaded RS is variable, the inter-cell DMRS position is not fixed and therefore there may be a problem in the interference control and advanced receiver operation. To this end, a method for additionally introducing network signaling may be considered. In general, the method for fixedly setting the DMRS position is more advantageous in operating the system. Therefore, we propose a concrete method for setting the front-loaded DMRS at a fixed position for the above reasons.

Figure 18:
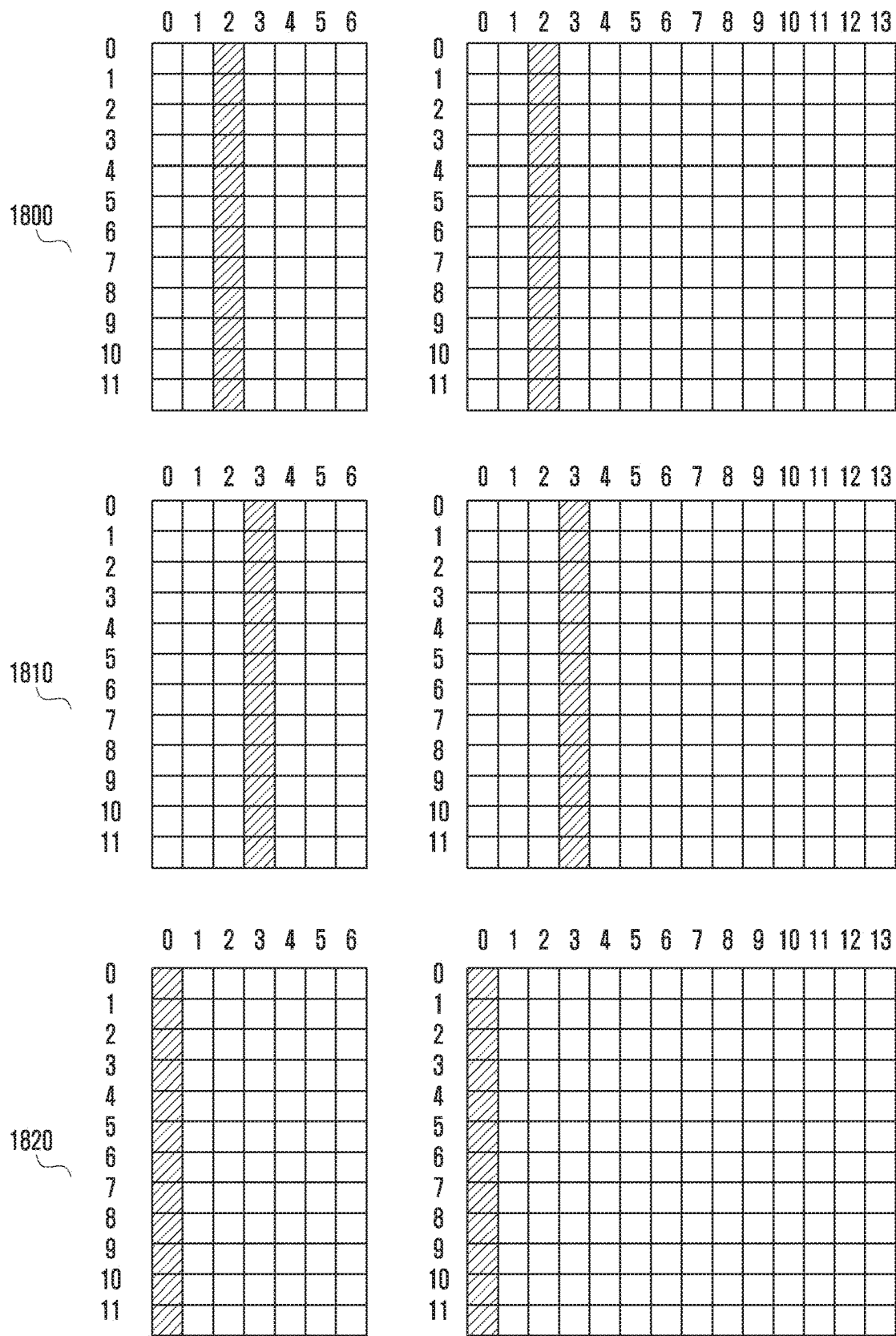
FIG. 18 is a diagram illustrating an example of a position of a front-loaded DMRS according to an embodiment of the disclosure.

FIG. 18 is a diagram illustrating an example of a position of a front-loaded DMRS according to an embodiment of the disclosure.

In FIG. 18, the position of the front-load DMRS is shown for the case in which the slot length is 7 or 14 OFDM symbols, respectively. Here, the positioning of the front-loaded DMRS may be determined by the control channel region. If the control channel region consists of up to two OFDM symbols, the front-loaded DMRS is positioned in a third OFDM symbol as in 1800. If the control channel region consists of up to three OFDM symbols, the front-loaded DMRS is positioned in a fourth OFDM symbol as in 1810. As described above, if the position of the front-loaded DMRS is determined by the control channel region which can be set to a maximum value, when the control channel is not partially or completely set, there may be a loss in reducing the decoding latency.

Accordingly, the disclosure proposes another method for setting a position of a front-loaded DMRS in an extended manner. For example, when the control channel region consists of up to two OFDM symbols, an option of fixedly setting the front-loaded DMRS to the third OFDM symbol as in 1800 and fixing the front-loaded DMRS to the first OFDM symbol may be set. Depending on the situation, when these two options are configured, the disadvantage in the case in which the position of the front-loaded DMRS is fixed can be compensated. Specifically, the position of a plurality of front-load DMRSs may be set by various methods. For example, a method for semi-statically setting the position of the front-load DMRS via the higher layer signaling such as the RRC can be considered. As another method, the position of the front-load DMRS can be set according to system information such as MIB or SIB. Alternatively, a method for dynamically setting the front-load DMRS by the DCI may be considered. On the contrary, it is possible to set the position of the front-load DMRS by semi-persistent scheduling (SPS).

Next, extended (or additional) DMRS is described. The front-loaded DMRS described above is not possible to tracking the rapidly changing channel in time in the High Doppler conditions, such that it is difficult to accurately estimate the channel. In addition, it is impossible to perform correction on a frequency offset only with the front-loaded DMRS. Therefore, for this reason, additional DMRS needs to be transmitted behind the position where the front-loaded DMRS is transmitted in the slot.

Figure 19:
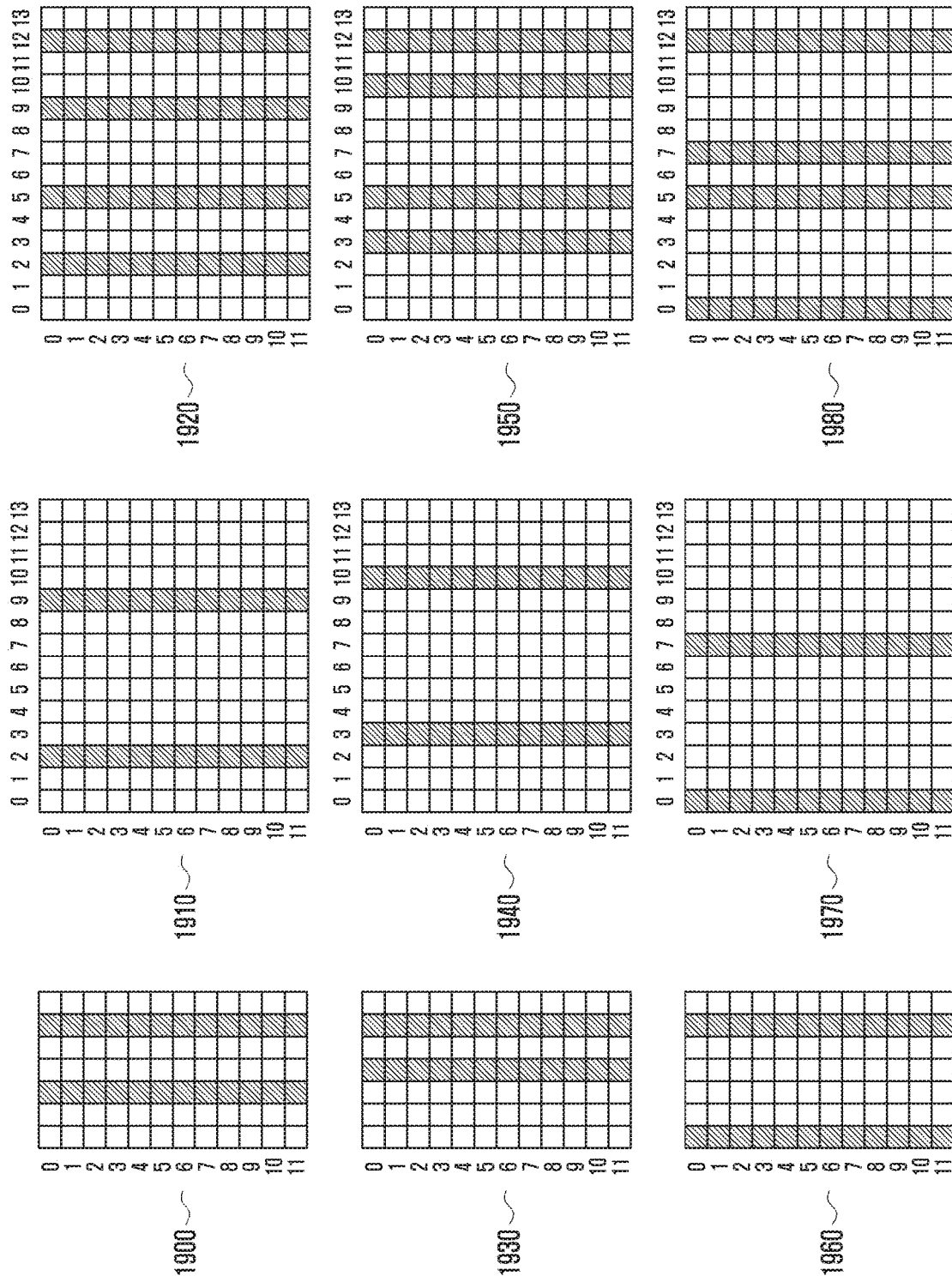
FIG. 19 is a diagram illustrating an example of a position of an extended (or additional) DMRS according to an embodiment of the disclosure.

FIG. 19 is a diagram illustrating an example of a location of an extended (or additional) DMRS according to an embodiment of the disclosure.

In FIG. 19, the location of the extended DMRS is shown for the case in which the slot length is 7 or 14 OFDM symbols, respectively. FIG. 19 shows extended DMRS for 1800, 1810, and 1820, respectively, which are positions of the front-loaded DMRS of FIG. 18, respectively. In addition, in 1900 to 1950, the extended DMRS position is set away from the position where the CRS is transmitted in the LTE system, which is advantageous in that the interference less occurs in the LTE-NR coexistence situation. However, in the case of reference numerals (or elements) 1960 to 1980, as in 1820 of FIG. 18, the position of the front-loaded DMRS overlaps with the position where the CRS is transmitted in the LTE system.

When the length of the slot is 7 OFDM symbols, as shown in FIG. 19, the position of the extended DMRS may be set to be 1, whereas when the length of the slot is 14 OFDM symbols, the position of the extended DMRS needs to be set as two depending on the Doppler situation. For example, under the environment where the channel is changed rapidly, it is possible to set the extended DMRS position as in 1910, and under the environment where the channel is changed very rapidly, it is necessary to set the extended DMRS position as in 1920.

In the above embodiment, FIGS. 18 and 19 show the basic positions in which the DMRS is configured based on the unit DMRS structure described with reference to FIG. 15. As described with reference to FIG. 17, when the unit DMRS structure is extended for the antenna port extension described with reference to FIG. 17, the position where the DMRS is transmitted may be additionally set. Also, in the case of the extended DMRS, the DMRS overhead problem may occur according to the configuration of the plurality of DMRS in time. Therefore, in this case, it is possible to reduce the DMRS overhead by setting the DMRS having the low density in frequency as in 1500 of FIG. 15.

Hereinafter, a method for considering a DMRS structure in consideration of the diversity of the DMRS structure according to the disclosure will be described. According to the disclosure, as the number of supported orthogonal antenna ports is increased, the DMRS port multiplexing method may be changed. Also, different RS densities may be set in the frequency in the unit DMRS structure. In addition, the extended RS structure in time like the front-loaded RS and the extended DMRS may be configured. Accordingly, when the base station configures the DMRS structure suitable for the transmission environment, in order for the terminal to perform the channel estimation well on the assumption of the DMRS structure configured by the terminal, the base station should signal the configuration therefor to the terminal. The configuration of the DMRS structure may be established semi-statically or dynamically. The simplest method for semi-statically configuring the DMRS structure is a method for configuring the DMRS structure through the high layer signaling. More specifically, the RS-related signaling field of the RRC may include the configuration information as shown in the following Table 9.

TABLE 9

```
-- ASN1START
DMRS-PatternId ::=          INTEGER (0..maxDMRS-Pattern)
DMRS-timeDensityId ::=      INTEGER (0..maxDMRS-Time)
DMRS-frequencyDensityId ::= INTEGER (0..maxDMRS-Freqeuncy)
-- ASN1STOP
```

More specifically, in the above Table 9, it is possible to indicate the mapping information in different patterns through DMRS-PatternId. Here, maxDMRS-Pattern represents the number of maximum configurable DMRS-PatternId. For example, in the above embodiment, when mapping 12 orthogonal DMRS ports for MU-MIMO, the mapping pattern may be changed in a case of mapping 8 orthogonal DMRS ports. In this case, the changed pattern information may be indicated using the DMRS-PatternId. In addition, in the above Table 9, it is possible to indicate the extended RS structure in time through DMRS-timeDensityId. Here, maxDMRS-Time represents the number of maximum configurable DMRS-timeDensityId. For example, the extended RS structure in time like the front-loaded RS and the extended DMRS may be configured. Finally, in the above Table 9, different RS densities may be set for different frequencies through DMRS-frequencyDensityId. Here, maxDMRS-Frequency represents the number of maximum configurable DMRS-frequencyDensityId. This may be used, for example, to set the low RS density in the frequency to adjust the RS overhead. The terms of field values set in the above Table 9 may be replaced by other terms. Through the above-described method, the DMRS structure may be semi-statically configured by the RRC, and the terminal can understand the structure of the currently transmitted DMRS by viewing the value set in the RRC.

Next, a method for the base station to dynamically configure the DMRS structure suitable for transmission environment will be described. If the information on the DMRS is included in the MAC CE in a manner similar to the method for setting the DMRS information in the RRC, it is possible to dynamically configure the information on the DMRS structure. Next, the simplest method for dynamically configuring the DMRS structure is to transmit the information about the DMRS structure to the DCI. In this case, for the basic operation, a DCI format in which a field for dynamically operating the DMRS structure is not applied can be defined separately. If the DMRS structure is configured using the DCI, it is possible to dynamically change the DMRS structure, but there is a disadvantage that the DCI overhead is generated to operate the DMRS structure.

2-2-th Embodiment

A 2-2-th embodiment describes a method for the base station to signal the DMRS information to the terminal. As described above, in the LTE system, the following DMRS information is mapped to the table and transmitted through the DCI. A table supporting four orthogonal DMRS ports for MU-MIMO and the existing table supporting two orthogonal DMRS ports may be configured through RRC.

Antenna port(s)
Scrambling identity ($n_{SCID}$)
number of layers (rank)

Unlike the LTE system, the NR system can support up to 12 orthogonal DMRS ports for MU-MIMO. As described above, unlike the existing LTE system, it is possible to consider a method for separately indicating information on the three pieces of information by a simple method for displaying the increased DMRS information.

First, the case of dynamically switching SU-MIMO and MU-MIMO is considered. More specifically, if the maximum number of layers (rank) of the information is up to 12, 4-bit information may be included in the DCI. If the number of layers (rank) is up to 8, 3-bit information can be included in the DCI. antenna port(s) information may be signaled by a method indicating the start position of the port number. For example, if the number of orthogonal DMRS ports is considered up to 12, 4-bit information antenna port (s)={A, B, C, . . . , L} may be included in the DCI. In this case, if the number of layers (rank) is set to be 4 and the antenna port (s) information indicates A, the used antenna port(s) can be set to be A, B, C, and D. In this case, it is possible to display the number of layers (rank) and the antenna port (s) information using a total of 8 bits. If the number of orthogonal DMRS ports is considered up to 8, 3-bit information antenna port (s)={A, B, C, . . . , H} may be included in the DCI. In this case, if the number of layers (rank) is set to be 4 and the antenna port (s) information indicates A, the used antenna port(s) can be set to be A, B, C, and D. In this case, it is possible to display the number of layers (rank) and the antenna port (s) information using a total of 6 bits.

Alternatively, a method for using a bitmap as a method for indicating the number of layers (rank) and the antenna port (s) information can be considered. More specifically, considering up to 12 orthogonal DMRS ports, it is possible to display the number of layers (rank) and antenna port (s) information using a 12-bit bitmap. In addition, considering up to 8 orthogonal DMRS ports, it is possible to display the number of layers (rank) and antenna port (s) information using an 8-bit bitmap.

In the above method, the number of layers (rank) and the antenna port (s) information are described considering the maximum number of orthogonal DMRS ports for the MU-MIMO support in consideration of the dynamic switching of the SU-MIMO and the MU-MIMO. However, considering the maximum number of orthogonal DMRS ports considering only the SU-MIMO, the signaling overhead can be further reduced. For example, when the maximum number of orthogonal DMRS ports for the MU-MIMO is 12 and the maximum number of orthogonal DMRS ports for the SU-MIMO is 8, considering a mode of operating only the SU-MIMO, the number of layers (rank) and antenna port(s) information can be signaled considering only the maximum number of orthogonal DMRS ports.

Finally, the scrambling identity ($n_{SCID}$) information can also be signaled separately considering the number of supported $n_{SCID}$s. If two $n_{SCID}$s are supported like LTE system, 1-bit information can be included in DCI. However, the number of support bits can be increased if the NR system supports increased $n_{SCID}$.

2-3-th Embodiment

A 2-3-th embodiment proposes another method for the base station to signal the DMRS information to the terminal as discussed in the 2-2-th embodiment. The method of the 2-3-th embodiment is to perform the signaling using a DMRS table similar to the existing LTE system. As the 2-2-th embodiment, when the increased orthogonal DMRS ports are supported, the problem that the signaling overhead therefor is greatly increased occurs. It is therefore important to consider the effective signaling for the DMRS information. In the 2-3-th embodiment, a method for reducing the signaling overhead for the DMRS information is proposed. Specifically, in the 2-3-th embodiment, the scrambling identity ($n_{SCID}$) information of the following DMRS information is not included in the DMRS table in order to reduce the signaling overhead, and the signaling is separately performed in the same manner as in the 2-2-th embodiment.

Antenna port(s)
Scrambling identity ($n_{SCID}$)
number of layers (rank)

Therefore, the scrambling identity ($n_{SCID}$) information can be signaled separately considering the number of supported $n_{SCID}$s. If two $n_{SCID}$s are supported like LTE system, 1-bit information can separately be included in DCI. However, the number of support bits can be increased if the NR system supports increased $n_{SCID}$. Therefore, in the 2-3-th embodiment, a method for signaling the number of layers (rank) and the antenna port(s) information of the DMRS information based on the DMRS table using a small number of bits will be described. For this purpose, in the 2-2-th embodiment, the case in which the maximum number of MU-MIMO layers supported per UE is up to 2 is considered.

There are provided various methods for signaling the antenna port(s) information to reduce the DMRS signaling overhead. A method for using a higher layer signal as a method for signaling an antenna port(s) information can be considered. Informing the antenna port information using the higher layer signal may be analyzed as an operation of dividing, by a base station, a DMRS port to be used through RRC signaling and distributing it to a plurality of users. For example, the base station may divide a user group into 1 and 2 and perform user grouping to allow a user of group 1 to use DMRS port=A, 88 and a user of group 2 to use DMRS port=C, D. As another method, a method for configuring antenna port information to be used for a user without notifying the higher layer signal may be considered. As one method for configuring a user group, the base station may be set to fixedly perform the user grouping at all time for the operation. As another method, the user group may also be changed temporally by using C-RNTI and subframe index information. For example, when the user group is divided into two, the user group ID in subframe n may be generated by the following Equation.

$$G_{ID}=c(n) \quad \text{Equation 2}$$

In the above Equation 2, c(i) is a pseudo-random sequence and an initial state may be set to be $c(i)=f(n_{RNTI})$. Even when the user group is divided into at least three, the C-RNTI and the subframe index information may be used.

Next, regarding the method for performing signaling based on the DMRS table using a small number of bits, the codeword mapping related agreement and working assumption in the current 3GPP radio access network (RAN)1 #88 are as follows.

Agreements:

NR supports the following number of codewords per PDSCH/PUSCH allocation per UE:

For 1 to 2-layer transmission: 1 codeword

For 5 to 8-layer transmission: 2 codewords

FFS for 3 & 4-layer transmissions—revisit today

Working Assumption:

NR supports the following number of codewords per PDSCH/PUSCH allocation per UE (Alt1):

For 3 and 4-layer transmission: 1 CW

FFS: the support of Alt2 (mapping 2-CW to 3 layers and 2-CW to 4 layers)

Companies are encouraged to evaluate the case of multi-panel/multi-TRP scenarios According to this, a method for supporting the 4 layer transmissions with one codeword is effective. However, there is a possibility that only 2 layer transmissions can be made with one codeword. Separately signaling the DMRS information according to the codeword number is advantageous in terms of overhead management.

Therefore, there is considered a method for designing a DMRS table in consideration of the case in which up to 4 layers is supported with one codeword. Considering the possibility of dynamic switching between the SU-MIMO and the MU-MIMO and assuming that the maximum number of orthogonal DMRS ports for the MU-MIMO support is 12, the user group is divided into three using the proposed antenna port(s) information signaling method to perform grouping and it is possible to the number of layers (rank) and the antenna port(s) information by 3 bits using the following Tables 10, 11, and 12.

In all embodiments of the disclosure, the number of user groupings and the method for operating the DMRS table may vary depending on the maximum number of orthogonal DMRS ports for the SU-MIMO and MU-MIMO support. For example, if only eight orthogonal DMRS ports are operated with the SU-MIMO, it operates using only the following Tables 10 and 12 below, but may be operated as one user group. Also, when only 12 orthogonal DMRS ports are operated with MU-MIMO, a method for operating it with three user groups using all of the following Tables 10, 11, and 12 is also possible. In addition, when operating with multiple DMRS tables, the antenna port for the 2 codeword transmission may be assumed to be the port number for the user group 1 during the partial retransmission (i.e., retransmission for one codeword) for the 2 codeword transmission.

TABLE 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port A | 0 | 5 layers, ports A-E |
| 1 | 1 layer, port B | 1 | 6 layers, ports A-F |
| 2 | 1 layer, port C | 2 | 7 layers, ports A-G |
| 3 | 1 layer, port D | 3 | 8 layers, ports A-H |
| 4 | 2 layers, ports A-B | 4 | Reserved |
| 5 | 2 layers, ports C-D | 5 | Reserved |
| 6 | 3 layers, ports A-C | 6 | Reserved |
| 7 | 4 layers, ports A-D | 7 | Reserved |

TABLE 11

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port E | 0 | 5 layers, ports A-E |
| 1 | 1 layer, port F | 1 | 6 layers, ports A-F |
| 2 | 1 layer, port G | 2 | 7 layers, ports A-G |
| 3 | 1 layer, port H | 3 | 8 layers, ports A-H |
| 4 | 2 layers, ports E-F | 4 | Reserved |
| 5 | 2 layers, ports G-H | 5 | Reserved |
| 6 | 3 layers, ports A-C | 6 | Reserved |
| 7 | 4 layers, ports A-D | 7 | Reserved |

TABLE 12

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port I | 0 | 5 layers, ports A-E |
| 1 | 1 layer, port J | 1 | 6 layers, ports A-F |
| 2 | 1 layer, port K | 2 | 7 layers, ports A-G |
| 3 | 1 layer, port L | 3 | 8 layers, ports A-H |
| 4 | 2 layers, ports I-J | 4 | Reserved |
| 5 | 2 layers, ports K-L | 5 | Reserved |
| 6 | 3 layers, ports A-C | 6 | Reserved |
| 7 | 4 layers, ports A-D | 7 | Reserved |

Next, there is considered a method for designing a DMRS table in consideration of the case in which up to 2 layers is supported with one codeword. Considering the possibility of dynamic switching between the SU-MIMO and the MU-MIMO and assuming that the maximum number of orthogonal DMRS ports for the MU-MIMO support is 12, the user group is divided into three using the proposed antenna port(s) information signaling method to perform grouping and it is possible to the number of layers (rank) and the antenna port(s) information by 3 bits using the following Tables 13, 14, and 15.

TABLE 13

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port A | 0 | 3 layers, ports A-C |
| 1 | 1 layer, port B | 1 | 4 layers, ports A-D |

TABLE 13-continued

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 2 | 1 layer, port C | 2 | 5 layers, ports A-E |
| 3 | 1 layer, port D | 3 | 6 layers, ports A-F |
| 4 | 2 layers, ports A-B | 4 | 7 layers, ports A-G |
| 5 | 2 layers, ports C-D | 5 | 8 layers, ports A-H |
| 6 | 3 layers, ports A-C | 6 | Reserved |
| 7 | 4 layers, ports A-D | 7 | Reserved |

TABLE 14

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port E | 0 | 3 layers, ports A-C |
| 1 | 1 layer, port F | 1 | 4 layers, ports A-D |
| 2 | 1 layer, port G | 2 | 5 layers, ports A-E |
| 3 | 1 layer, port H | 3 | 6 layers, ports A-F |
| 4 | 2 layers, ports E-F | 4 | 7 layers, ports A-G |
| 5 | 2 layers, ports G-H | 5 | 8 layers, ports A-H |
| 6 | 3 layers, ports A-C | 6 | Reserved |
| 7 | 4 layers, ports A-D | 7 | Reserved |

TABLE 15

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port I | 0 | 3 layers, ports A-C |
| 1 | 1 layer, port J | 1 | 4 layers, ports A-D |
| 2 | 1 layer, port K | 2 | 5 layers, ports A-E |
| 3 | 1 layer, port L | 3 | 6 layers, ports A-F |
| 4 | 2 layers, ports I-J | 4 | 7 layers, ports A-G |
| 5 | 2 layers, ports K-L | 5 | 8 layers, ports A-H |
| 6 | 3 layers, ports A-C | 6 | Reserved |
| 7 | 4 layers, ports A-D | 7 | Reserved |

As the first method for transmitting the DMRS information to a terminal through the DCI which is proposed in the 2-3-th embodiment, there is a method for separately configuring a table depending on the number of user grouping and informing which table any user uses based on the RRC signaling. A second method may configure one table regardless of the number of user grouping and configure a factor used therein by the RRC signaling, as the following Table 16. For example, in the following Table 16, when a value 0 of the first column is used, it may be indicated whether to use port=A or port=E or I using the RRC signaling. In all the embodiments of the disclosure, when a plurality of tables is used according to the number of user groupings, it can be operated in two methods as described above.

TABLE 16

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port A or E or I | 0 | 5 layers, ports A-E |
| 1 | 1 layer, port B or F or J | 1 | 6 layers, ports A-F |
| 2 | 1 layer, port C or G or K | 2 | 7 layers, ports A-G |
| 3 | 1 layer, port D or H or L | 3 | 8 layers, ports A-H |
| 4 | 2 layers, ports A-B or E-F or I-J | 4 | Reserved |
| 5 | 2 layers, ports C-D or G-H or K-L | 5 | Reserved |
| 6 | 3 layers, ports A-C | 6 | Reserved |
| 7 | 4 layers, ports A-D | 7 | Reserved |

Assuming that the maximum number of orthogonal DMRS ports for the MU-MIMO support is 8, grouping is performed by dividing the user group into two using the proposed antenna port(s) information signaling method and the DMRS information is displayed with 3 bits. In this case, first, it is possible to express the DMRS information using the above Tables 10 and 11 in consideration of the case in which up to 4 layer transmissions are supported with 1 codeword. On the contrary, it is possible to express the DMRS information using the above Tables 13 and 14 in consideration of the case in which up to 2 layer transmissions are supported with 1 codeword.

Considering the dynamic switching of the SU-MIMO and the MU-MIMO, the DMRS table design method considering the maximum number of orthogonal DMRS ports for the MU-MIMO support is described above. However, if only the SU-MIMO is considered, the signaling overhead therefor can be further reduced. Considering the case in which the maximum number of orthogonal DMRS ports of the SU-MIMO is 8 and the case of supporting 4 layer transmissions with 1 codeword, it is possible to display the number of layers (rank) and the antenna port(s) with 2 bits using the following Table 17.

TABLE 17

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port A | 0 | 5 layers, ports A-E |
| 1 | 2 layer, port A-B | 1 | 6 layers, ports A-F |
| 2 | 3 layer, port A-C | 2 | 7 layers, ports A-G |
| 3 | 4 layer, port A-D | 3 | 8 layers, ports A-H |

As described above, the DMRS information signaling considering only the SU-MIMO can be defined separately in the transmission mode considering fallback. In the LTE system, DCI format 1A is defined as the DCI operated as the fallback. If the transmission mode considering the fallback is defined even in the NR system, only the DMRS table considering only the SU-MIMO proposed in the above Table 17 can be signaled in consideration of the signaling overhead in the corresponding DCI. Also, the DMRS table considering the SU-MIMO can be transmitted through the common search space.

2-4-th Embodiment

In the 2-4-th embodiment, when the DMRS structure common to the DL/UL is designed to be applied, the base station proposes a method for signaling the DL/UL DMRS information to the terminal. The DMRS pattern, position, and scrambling sequence of the DMRS design proposed in the above-mentioned 2-1-th embodiment can be equally applied to DL and UL. In addition, if the same DMRS structure is applied to the DL/UL, since it is possible to orthogonally allocate the UL/DL DMRS ports, it is possible to interference cancellation performance by improving the channel estimation performance in the environment such as a flexible duplex. Also, even if the DMRS port of the UL/DL is not allocated orthogonally, the UL/DL DMRS is generated with different sequence IDs so that the UL/DL has the same DMRS structure, thereby randomizing the interference. In the 2-4-th embodiment, there is provided a signaling method for minimizing the DMRS interference of the UL/DL when the common DMRS structure is applied to the DL/UL for duplexing flexibility. In addition, a design method taking into consideration signaling overhead together is considered. For this purpose, first, it is necessary to define the duplexing flexibility field. The duplexing flexibility field can be enabled/disabled via RRC, MAC CE, or DCI as needed. At this time, if enabled, the DMRSs of the UL/DL is allocated having correlation with each other and if disabled, the DMRSs of the UL/DL is not allocated having correlation with each other.

As the first method for minimizing the DMRS interference of the UL/DL considering the signaling overhead when the duplexing flexibility field is enabled, similar to the method proposed in the 2-3—the embodiment, a method for allocating a subset of the orthogonal DMRS port to the DL and UL and allocating different scrambling identities to DL and UL may be considered. Specifically, when the DL supports up to 8 orthogonal DMRS ports and the UL supports up to 4 orthogonal DMRS ports, it is possible to signal DMRS information for DL/UL using the following Tables 18 and 19. Here, the Tables 18 and 19 are the same as the above Tables 10 and 11 of the 2-3-th embodiment. For example, the following Tables 18 and 19 can be utilized for DMRS signaling for DL. One of the following Tables 18 and 19 can be utilized for DMRS signaling for UL. It is also possible to randomize the UL/DL DMRS interference when allocating different scrambling identities to DL and UL. In addition, it is possible to display the number of layers (rank) and the antenna port(s) information with 3 bits.

TABLE 18

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port A | 0 | 5 layers, ports A-E |
| 1 | 1 layer, port B | 1 | 6 layers, ports A-F |
| 2 | 1 layer, port C | 2 | 7 layers, ports A-G |
| 3 | 1 layer, port D | 3 | 8 layers, ports A-H |
| 4 | 2 layers, ports A-B | 4 | Reserved |
| 5 | 2 layers, ports C-D | 5 | Reserved |
| 6 | 3 layers, ports A-C | 6 | Reserved |
| 7 | 4 layers, ports A-D | 7 | Reserved |

TABLE 19

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port E | 0 | 5 layers, ports A-E |
| 1 | 1 layer, port F | 1 | 6 layers, ports A-F |
| 2 | 1 layer, port G | 2 | 7 layers, ports A-G |
| 3 | 1 layer, port H | 3 | 8 layers, ports A-H |
| 4 | 2 layers, ports E-F | 4 | Reserved |
| 5 | 2 layers, ports G-H | 5 | Reserved |
| 6 | 3 layers, ports A-C | 6 | Reserved |
| 7 | 4 layers, ports A-D | 7 | Reserved |

In the above example, if up to 4 layers of the UL transmission are defined and 5-6 layer transmissions is not supported, the signaling corresponding to two codewords in the DMRS table allocated to the UL transmission may not be used in the UL transmission.

As the second method for minimizing the DMRS interference of the UL/DL considering the signaling overhead when the duplexing flexibility field is enabled, similar to the method proposed in the 2-3—the embodiment, a method for allocating a subset of the orthogonal DMRS port to the DL and UL, respectively, may be considered. Specifically, when the DL supports up to 8 orthogonal DMRS ports and the UL supports up to 4 orthogonal DMRS ports, it is possible to signal the DMRS information for DL/UL using the following Tables 20, 32, and 21. Here, the following Tables 20 and 21 are the same as the above Tables 10 and 11, respectively, of the 2-3-th embodiment. Comparing the following Table 21 with the above Table 12, some of the port numbers for the orthogonal DRMS port allocation is changed. In addition, some of the Table is changed assuming only 1 codeword transmission under the assumption that the UL transmission is transmitted only up to 4 layers. Describing in detail an example of the utilization method therefor, for example, the above Tables 20 and 21 may be used for the DMRS signaling for the DL. The following Table 22 can be utilized for the DMRS signaling for the UL. In this case, it is possible to minimize the influence of interference by orthogonally allocating the DMRS port of the UL/DL. In addition, it is possible to display the number of layers (rank) and the antenna port(s) information with 3 bits.

TABLE 20

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port A | 0 | 5 layers, ports A-E |
| 1 | 1 layer, port B | 1 | 6 layers, ports A-F |
| 2 | 1 layer, port C | 2 | 7 layers, ports A-G |
| 3 | 1 layer, port D | 3 | 8 layers, ports A-H |
| 4 | 2 layers, ports A-B | 4 | Reserved |
| 5 | 2 layers, ports C-D | 5 | Reserved |
| 6 | 3 layers, ports A-C | 6 | Reserved |
| 7 | 4 layers, ports A-D | 7 | Reserved |

TABLE 21

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port E | 0 | 5 layers, ports A-E |
| 1 | 1 layer, port F | 1 | 6 layers, ports A-F |
| 2 | 1 layer, port G | 2 | 7 layers, ports A-G |
| 3 | 1 layer, port H | 3 | 8 layers, ports A-H |
| 4 | 2 layers, ports E-F | 4 | Reserved |
| 5 | 2 layers, ports G-H | 5 | Reserved |
| 6 | 3 layers, ports A-C | 6 | Reserved |
| 7 | 4 layers, ports A-D | 7 | Reserved |

TABLE 22

| One Codeword: Codeword 0 enabled, Codeword 1 disabled | |
|---|---|
| Value | Message |
| 0 | 1 layer, port I |
| 1 | 1 layer, port J |
| 2 | 1 layer, port K |
| 3 | 1 layer, port L |
| 4 | 2 layers, ports I-J |
| 5 | 2 layers, ports K-L |
| 6 | 3 layers, ports I-K |
| 7 | 4 layers, ports I-L |

Note that the method proposed in the above Tables 18-22 is an example for the 2-4-th embodiment. That is, it is obvious to those skilled in the art to which the disclosure pertains that other change examples based on the technical idea of the disclosure may be made without departing from the scope of the disclosure.

2-5-th Embodiment

In the 2-5-th embodiments, when the number of MU-MIMO layers supported for each UE is larger than 2 for the method for the base station to signal the DMRS information to the terminal as proposed in the 2-3-th embodiment, the additional DMRS information signaling method will be described.

First, the DMRS table is designed in consideration of the case in which up to 4 layers is supported with one codeword. Considering the possibility of dynamic switching between the SU-MIMO and the MU-MIMO and assuming that the maximum number of orthogonal DMRS ports for the MU-MIMO support is 12, the user group is divided into three using the proposed antenna port(s) information signaling method to perform grouping and it is possible to the number of layers (rank) and the antenna port(s) information by 3 bits using the following Tables 23, 24, and 25. Here, the following Table 23 here is the same as Table 10 of the 2-3-th embodiment. The following Tables 24 and 25 consider that the number of MU-MIMO layers supported per UE is up to 4 when compared with the above Tables 11 and 12. Therefore, some port numbers are changed for orthogonal DMRS port allocation.

TABLE 23

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port A | 0 | 5 layers, ports A-E |
| 1 | 1 layer, port B | 1 | 6 layers, ports A-F |
| 2 | 1 layer, port C | 2 | 7 layers, ports A-G |
| 3 | 1 layer, port D | 3 | 8 layers, ports A-H |
| 4 | 2 layers, ports A-B | 4 | Reserved |
| 5 | 2 layers, ports C-D | 5 | Reserved |
| 6 | 3 layers, ports A-C | 6 | Reserved |
| 7 | 4 layers, ports A-D | 7 | Reserved |

TABLE 24

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port E | 0 | 5 layers, ports A-E |
| 1 | 1 layer, port F | 1 | 6 layers, ports A-F |
| 2 | 1 layer, port G | 2 | 7 layers, ports A-G |
| 3 | 1 layer, port H | 3 | 8 layers, ports A-H |
| 4 | 2 layers, ports E-F | 4 | Reserved |
| 5 | 2 layers, ports G-H | 5 | Reserved |
| 6 | 3 layers, ports E-G | 6 | Reserved |
| 7 | 4 layers, ports E-H | 7 | Reserved |

TABLE 25

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port I | 0 | 5 layers, ports A-E |
| 1 | 1 layer, port J | 1 | 6 layers, ports A-F |
| 2 | 1 layer, port K | 2 | 7 layers, ports A-G |
| 3 | 1 layer, port L | 3 | 8 layers, ports A-H |
| 4 | 2 layers, ports I-J | 4 | Reserved |
| 5 | 2 layers, ports K-L | 5 | Reserved |
| 6 | 3 layers, ports I-K | 6 | Reserved |
| 7 | 4 layers, ports I-L | 7 | Reserved |

Next, the DMRS table is designed in consideration of the case in which up to 2 layers is supported with one codeword. Considering the possibility of dynamic switching between the SU-MIMO and the MU-MIMO and assuming that the maximum number of orthogonal DMRS ports for the MU-MIMO support is 12, the user group is divided into three using the proposed antenna port(s) information signaling method to perform grouping and it is possible to the number of layers (rank) and the antenna port(s) information by 3 bits using the following Tables 26, 27, and 28. Here, the following Table 26 here is the same as Table 13 of the 2-3-th embodiment. The following Tables 27 and 28 consider that the number of MU-MIMO layers supported per UE is up to 4 when compared with the above Tables 14 and 15. Therefore, some port numbers are changed for orthogonal DMRS port allocation.

TABLE 26

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port A | 0 | 3 layers, ports A-C |
| 1 | 1 layer, port B | 1 | 4 layers, ports A-D |
| 2 | 1 layer, port C | 2 | 5 layers, ports A-E |
| 3 | 1 layer, port D | 3 | 6 layers, ports A-F |
| 4 | 2 layers, ports A-B | 4 | 7 layers, ports A-G |
| 5 | 2 layers, ports C-D | 5 | 8 layers, ports A-H |
| 6 | 3 layers, ports A-C | 6 | Reserved |
| 7 | 4 layers, ports A-D | 7 | Reserved |

TABLE 27

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port E | 0 | 3 layers, ports E-G |
| 1 | 1 layer, port F | 1 | 4 layers, ports E-H |
| 2 | 1 layer, port G | 2 | 5 layers, ports A-E |
| 3 | 1 layer, port H | 3 | 6 layers, ports A-F |
| 4 | 2 layers, ports E-F | 4 | 7 layers, ports A-G |
| 5 | 2 layers, ports G-H | 5 | 8 layers, ports A-H |
| 6 | 3 layers, ports E-G | 6 | Reserved |
| 7 | 4 layers, ports E-H | 7 | Reserved |

TABLE 28

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port I | 0 | 3 layers, ports I-K |
| 1 | 1 layer, port J | 1 | 4 layers, ports I-L |
| 2 | 1 layer, port K | 2 | 5 layers, ports A-E |
| 3 | 1 layer, port L | 3 | 6 layers, ports A-F |
| 4 | 2 layers, ports I-J | 4 | 7 layers, ports A-G |
| 5 | 2 layers, ports K-L | 5 | 8 layers, ports A-H |
| 6 | 3 layers, ports I-K | 6 | Reserved |
| 7 | 4 layers, ports I-L | 7 | Reserved |

As the first method for transmitting the DMRS information to a terminal through the DCI which is proposed in the 2-5-th embodiment, there is a method for separately configuring a table depending on the number of user grouping and informing which table any user uses based on the RRC signaling. A second method is a method for configuring one table regardless of the number of user grouping and configuring a factor used therein by the RRC signaling, as the above Table 16 of the above 2-3-th embodiment.

Assuming that the maximum number of orthogonal DMRS ports for the MU-MIMO support is 8, grouping is performed by dividing the user group into two using the proposed antenna port(s) information signaling method and the DMRS information is displayed with 3 bits. In this case, first, it is possible to express the DMRS information using the above Tables 23 and 24 in consideration of the case in which up to 4 layer transmissions are supported with 1 codeword. On the contrary, it is possible to express the DMRS information using the above Tables 26 and 27 in consideration of the case in which up to 2 layer transmissions are supported with 1 codeword.

2-6-th Embodiment

Unlike the DMRS table design method for signaling the DMRS information in consideration of the signaling overhead as described above in the 2-3-th, 2-4-th, and 2-5-th embodiments, the 2-6-th embodiment describes the example of the designed DMRS table without considering the number of signaling bits. As in the 2-3-th, 2-4-th, and 2-5-th embodiments, the present embodiment signals information on the number of antenna ports and the number of transmission layers. First, the following Table 29 shows the DMRS table designed for the case in which the number of MU-MIMO layers supported per UE is a maximum of 2 when 12 orthogonal ports is supported at the time of the MU-MIMO. In this case, the case in which the number of MU-MIMO layers supported per UE is represented by 12 cases, and the case in which the number of MU-MIMO layers supported per UE is represented by 6 cases.

TABLE 29

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port A | 0 | 5 layers, ports A-E |
| 1 | 1 layer, port B | 1 | 6 layers, ports A-F |
| 2 | 1 layer, port C | 2 | 7 layers, ports A-G |
| 3 | 1 layer, port D | 3 | 8 layers, ports A-H |
| 4 | 1 layer, port E | 4 | Reserved |
| 5 | 1 layer, port F | 5 | Reserved |
| 6 | 1 layer, port G | 6 | Reserved |
| 7 | 1 layer, port H | 7 | Reserved |
| 8 | 1 layer, port I | 8 | Reserved |
| 9 | 1 layer, port J | 9 | Reserved |
| 10 | 1 layer, port K | 10 | Reserved |
| 11 | 1 layer, port L | 11 | Reserved |
| 12 | 2 layers, ports A-B | 12 | Reserved |
| 13 | 2 layers, ports C-D | 13 | Reserved |
| 14 | 2 layers, ports E-F | 14 | Reserved |
| 15 | 2 layers, ports G-H | 15 | Reserved |
| 16 | 2 layers, ports I-J | 16 | Reserved |
| 17 | 2 layers, ports K-L | 17 | Reserved |
| 18 | 3 layers, ports A-C | 18 | Reserved |
| 19 | 3 layers, ports D-F | 19 | Reserved |
| 20 | 3 layers, ports G-I | 20 | Reserved |
| 21 | 3 layers, ports J-L | 21 | Reserved |
| 22 | 4 layers, ports A-D | 22 | Reserved |
| 23 | 4 layers, ports E-H | 23 | Reserved |
| 24 | 4 layers, ports I-L | 24 | Reserved |
| 25 | Reserved | 25 | Reserved |
| 26 | Reserved | 26 | Reserved |
| 27 | Reserved | 27 | Reserved |
| 28 | Reserved | 28 | Reserved |
| 29 | Reserved | 29 | Reserved |
| 30 | Reserved | 30 | Reserved |
| 31 | Reserved | 31 | Reserved |

On the contrary, the following Table 30 shows the DMRS table designed for the case in which the number of MU-MIMO layers supported per UE is a maximum of 4 when 12 orthogonal ports are supported at the time of the MU-MIMO. In this case, the case in which the number of MU-MIMO layers supported per UE is represented by 12 cases, the case in which the number of MU-MIMO layers supported per UE is represented by 6 cases, the case in which the number of MU-MIMO layers supported per UE is 3 is represented by 4 cases, and the case in which the number of MU-MIMO layers supported per UE is represented by 3 cases.

TABLE 30

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port A | 0 | 5 layers, ports A-E |
| 1 | 1 layer, port B | 1 | 6 layers, ports A-F |
| 2 | 1 layer, port C | 2 | 7 layers, ports A-G |
| 3 | 1 layer, port D | 3 | 8 layers, ports A-H |
| 4 | 1 layer, port E | 4 | Reserved |
| 5 | 1 layer, port F | 5 | Reserved |
| 6 | 1 layer, port G | 6 | Reserved |
| 7 | 1 layer, port H | 7 | Reserved |
| 8 | 1 layer, port I | 8 | Reserved |
| 9 | 1 layer, port J | 9 | Reserved |
| 10 | 1 layer, port K | 10 | Reserved |
| 11 | 1 layer, port L | 11 | Reserved |
| 12 | 2 layers, ports A-B | 12 | Reserved |
| 13 | 2 layers, ports C-D | 13 | Reserved |
| 14 | 2 layers, ports E-F | 14 | Reserved |
| 15 | 2 layers, ports G-H | 15 | Reserved |
| 16 | 2 layers, ports I-J | 16 | Reserved |
| 17 | 2 layers, ports K-L | 17 | Reserved |
| 18 | 3 layers, ports A-C | 18 | Reserved |
| 19 | 3 layers, ports D-F | 19 | Reserved |
| 20 | 3 layers, ports G-I | 20 | Reserved |
| 21 | 3 layers, ports J-L | 21 | Reserved |
| 22 | 4 layers, ports A-D | 22 | Reserved |
| 23 | 4 layers, ports E-H | 23 | Reserved |
| 24 | 4 layers, ports I-L | 24 | Reserved |
| 25 | Reserved | 25 | Reserved |
| 26 | Reserved | 26 | Reserved |
| 27 | Reserved | 27 | Reserved |
| 28 | Reserved | 28 | Reserved |
| 29 | Reserved | 29 | Reserved |
| 30 | Reserved | 30 | Reserved |
| 31 | Reserved | 31 | Reserved |

The above Tables 29 and 30 show 1 codeword (CW) transmission and 2 CW transmission separately by using two columns. However, as shown in the following Tables 31 and 32, only one column can be used to signal the information on the number of antenna ports and the number of transmission layers. In the following Tables 31 and 32, it is assumed that the transmission case in the 2CW is displayed separately but the transmission case not displayed is transmitted in 1CW. Specifically, the following Table 31 is a DMRS table for the case in which the maximum number of MU-MIMO layers supported per UE is 2 when 12 orthogonal ports are supported at the time of the MU-MIMO using one column in a form in which the above Table 29 is modified, and the following Table 32 Is a DMRS table for the case in which the number of MU-MIMO layers supported per UE is a maximum of 4 when 12 orthogonal ports are supported at the time of the MU-MIMO using one column in a form in which the above Table 30 is modified. The signaling method proposed in the following Tables 31 and 32 can be considered as a method for preventing a lot of unused reserved indexes for the 2CW in the above Tables 29 and 30.

TABLE 31

| Value | Message |
|---|---|
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 1 layer, port I |
| 9 | 1 layer, port J |
| 10 | 1 layer, port K |
| 11 | 1 layer, port L |
| 12 | 2 layers, ports A-B |
| 13 | 2 layers, ports C-D |
| 14 | 2 layers, ports E-F |
| 15 | 2 layers, ports G-H |
| 16 | 2 layers, ports I-J |
| 17 | 2 layers, ports K-L |
| 18 | 3 layers, ports A-C |
| 19 | 4 layers, ports A-D |
| 20 | 5 layers, ports A-E (2 CW) |
| 21 | 6 layers, ports A-F(2 CW) |
| 22 | 7 layers, ports A-G (2 CW) |
| 23 | 8 layers, ports A-H (2 CW) |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

TABLE 32

| Value | Message |
|---|---|
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 1 layer, port I |
| 9 | 1 layer, port J |
| 10 | 1 layer, port K |
| 11 | 1 layer, port L |
| 12 | 2 layers, ports A-B |
| 13 | 2 layers, ports C-D |
| 14 | 2 layers, ports E-F |
| 15 | 2 layers, ports G-H |
| 16 | 2 layers, ports I-J |
| 17 | 2 layers, ports K-L |
| 18 | 3 layers, ports A-C |
| 19 | 3 layers, ports D-F |
| 20 | 3 layers, ports G-I |
| 21 | 3 layers, ports J-L |
| 22 | 4 layers, ports A-D |
| 23 | 4 layers, ports E-H |
| 24 | 4 layers, ports I-L |
| 25 | 5 layers, ports A-E (2 CW) |
| 26 | 6 layers, ports A-F (2 CW) |
| 27 | 7 layers, ports A-G (2 CW) |
| 28 | 8 layers, ports A-H (2 CW) |
| 29 | Reserved |
| 30 | Reserved |
| 31 | Reserved |

When the DMRS table is designed without considering the signaling overhead as in the embodiment of the disclosure, a 2-bit additional signaling bit may be generated than the method proposed in the 2-3-th, 2-4-th, and 2-5-th embodiments. However, the methods proposed in the 2-3-th, 2-4-th, and 2-5-th embodiments may cause a disadvantage that the scheduling proposal for the MU-MIMO may be generated. However, in the present embodiment, 2 bits may be further used to solve the above problem.

2-7-th Embodiment

The 2-7-th embodiment propose a method for performing signaling for DMRS information in an initial access operation using a SIB transmission or a remaining minimum system information (RMSI) transmission newly introduced in the NR system. Specifically, the LTE system receives the system information transmitted to the data channel using the CRS in the initial access operation, but the NR system should receive the system information transmitted to the data channel using the DMRS. Therefore, it is necessary to know the DMRS information used in the initial access operation. Also, when the information on various DMRS patterns that can be configured in the NR system is transmitted through the higher layer signaling, it is necessary to know which DMRS pattern is used in the initial access operation before receiving the higher layer signaling. In this case, there are two possible methods that can be considered.

Method 1: Fixed DMRS Pattern Definition Used in the Initial Connection operation Method 2: DMRS Information Signaling Used in the Initial Access Phase The Method 1 of the above methods is a method for defining the DMRS pattern used in the initial access operation. In contrast, the Method 2 is a method for signaling the DMRS pattern that is used in the initial access operation among various DMRS patterns that can be configured. Considering the initial access operation, it is possible to signal which DMRS pattern is used via the master information block (MIB). As another method, it is possible to consider a method for signaling which DMRS pattern is used on the control channel transmitted in the initial access operation. In the case of the Method 2, a method for inserting information bits depending on the number of types of DMRS patterns into the MIB or the DCI or transmitting the information bits may be used.

In another embodiment of the disclosure, information for generating a DMRS sequence in the initial access operation may be required. Specifically, in the LTE system, the DMRS is generated as a pseudo-random (PN) sequence based on a Gold sequence having a length of 31. More specifically, a first m-sequence x1(n) generated from polynomial $D^{31}+D^3+1$ of the higher register and a second m-sequence x2(n) generated from polynomial $D^{31}+D^3+D^2+D+1$ of a lower register are connected to each other to generate a PN sequence C (n), which can be expressed by the following Equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{Equation 3}$$

Here, $N_c = 1600$ and the register initialization is done as follows.

The first m-sequence x1 (n) generated from the higher register is initialized with the following fixed pattern $x_1(0) = 1$, $x_1(n) = 0$, $n = 1, 2, \ldots, 30$.

The second m-sequence x2 (n) generated from the lower register is initialized by the following equation according to the scrambling condition required by each signal.

$$c_{init} = \sum_{i=0}^{30} x_2(i) \cdot 2^i \quad \text{Equation 4}$$

More specifically, in the case of the DMRS, in order to transmit the DMRS port p=5, the above Equation 4 is expressed by the following Equation.

$$c_{init} = (\lfloor n_s/2 \rfloor + 1) \cdot (2N_{ID}^{cell} + 1) \cdot 2^{16} + n_{RNTI} \quad \text{Equation 5}$$

In the above Equation, $n_s$ represents a slot number in a transmission frame, and $n_{RNTI}$ represents a UE ID. $N_{ID}^{cell}$ represents Cell ID. On the contrary, to transmit the DMRS port $p \in \{7, 8, \ldots, 14\}$, the above Equation 4 is expressed by the following Equation.

$$c_{init} = (\lfloor n_s/2 \rfloor + 1) \cdot (2n_{ID}^{(nSCID)} + 1) \cdot 2^{16} + n_{SCID} \quad \text{Equation 6}$$

In the above Equation, $n_s$ represents a slot number in a transmission frame, $n_{SCID}$ represents a scrambling ID having a value of 0 or 1, and a scrambling ID value is assumed to be 0 when there is no specific description. Also, $n_{ID}^{(i)}$, i=0, 1 is determined as follows.

$n_{ID}^{(i)} = n_{ID}^{cell}$ if no value for $n_{ID}^{DMRS,i}$ is provided by higher layers or if DCI format 1A, 2 B or 2 C is used for the DCI associated with the PDSCH transmission $n_{ID}^{(i)} = n_{ID}^{DMRS,i}$ otherwise As described above, in the case of the DMRS, initialization is performed every subframe, and a reference signal for transmitting the DMRS port $p \in \{7, 8, \ldots, 14\}$ is expressed by the following Equation 7.

$$r(m) = \frac{1}{\sqrt{2}}(1 - 2 \cdot c(2m)) + j\frac{1}{\sqrt{2}}(1 - 2 \cdot c(2m+1)), \quad \text{Equation 7}$$

$$m = \begin{cases} 0, 1, \ldots, 12N_{RB}^{max,DL} - 1 & normalcyclioprefix \\ 0, 1, \ldots, 16N_{RB}^{max,DL} - 1 & extendedcyclioprefix \end{cases}$$

Here, the maximum number of RBs supported for DL in the LTE system is represented by $N_{RB}^{max,DL} = 110$. Also, since the fixed DMRS pattern is used for a normal CP and an extended CP in the LTE system, the DMRS sequence is generated as in the above Equation 7 considering the number of DMRS REs per PRB. In summary, in the case of the LTE system, the DMRS sequence is generated using the following information.

Slot number

Cell ID or virtual Cell ID(VCID)

The value of the VCID is signaled to the higher layer.

Scrambling ID(SCID)

The signaling via DCI is performed, but the value of SCID is assumed to be 0 if there is no specific mention.

Even in the NR system, the DMRS is generated as the PN sequence for the CP-OFDM, so that a DMRS sequence can be generated in a manner similar to the above. However, as described above, since the DMRS is used in the initial access operation before receiving the higher layer signaling in the NR system, the information for generating the DMRS sequence may be required at this time. Also, as mentioned in the previous embodiment, the NR system considers the support of the DL/UL common DMRS structure for the CP-OFDM waveform. When designed as the DMRS structure common to the DL/UL, it is possible to allocate the orthogonal DMRS ports to the DL/UL or allocate different sequences to minimize the DMRS interference of the UL/DL.

Therefore, in the embodiment of the disclosure, the NR system proposes information setting and signaling methods necessary for generating the DMRS sequence in consideration of this situation. More specifically, a method to allocate different sequences to the DL and UL in the NR system is proposed. To the end, it is necessary to consider operating scenarios first. If it is assumed that the DMRS is scrambled with different cell IDs between TRPs for the DL/UL interference occurring between TRPs, it is possible to automatically allocate different sequences to the DL and UL. However, in order to more effectively remove the DL/UL interference, the cell ID information between the TRPs needs to be additionally signaled. If the Cell ID information is not signaled, the overhead for the blind detection thereon increases. To this end, it is possible to signal the cell ID information between the TRPs through the higher layer signaling. However, in the initial access operation before receiving the higher layer signaling, a method for signaling the cell ID information through the system information such as the MIB can be considered.

On the contrary, it is possible to allocate different sequences to the DL and UL through the SCID for the DL/UL interference occurring in the TRP. In addition, the SCID information of the other link may be additionally signaled so that the terminal can more effectively remove the DL/UL interference. At this time, the following method can be considered, which can be applied even at the initial access operation before receiving the higher layer signaling.

Method 1: DCI signaling for SCID information
Method 2: 1 bit DCI signaling for the same presence and absence of SCID of DL/UL
Method 3: Fix the SCID for DL/UL The Method 1 is a method for signaling a corresponding bit through the DCI depending on the SCID information amount. In the initial access operation before receiving the higher layer signaling, it is possible to signal the SCID through the control resource set (CORSET) for the RMSI, for example. The Method 2 is a method for signaling only the information on whether the SCID of the DL/UL is the same, and is a method for alleviating the signaling overhead of the Method 1 when the information of the SCID is defined as two or more in the NR system. The Method 2 has an advantage in having low signaling overhead by notifying only the same presence or absence of the SCID of the DL/UL with 1-bit information, and may be a method for lowering the complexity in the case of performing the blind detection without signaling for the SCID. Finally, the Method 3 is a method for fixing different DL and UL SCID values by default and operating them, without explicit signaling for the SCID information as in the Method 1 or Method 2. For example, the SCID for the DL may be fixed to 0 and the SCID for the UL may be fixed to 1. In the case of using the Method 3, it is possible to easily allocate different sequences to the DL and UL without additional signaling for the SCID information. In the above description, the disclosure is described based on the operating scenario in which different sequences are allocated to the DL and UL through the SCID, for the DL/UL interference occurring in the TRP.

Figure 20:
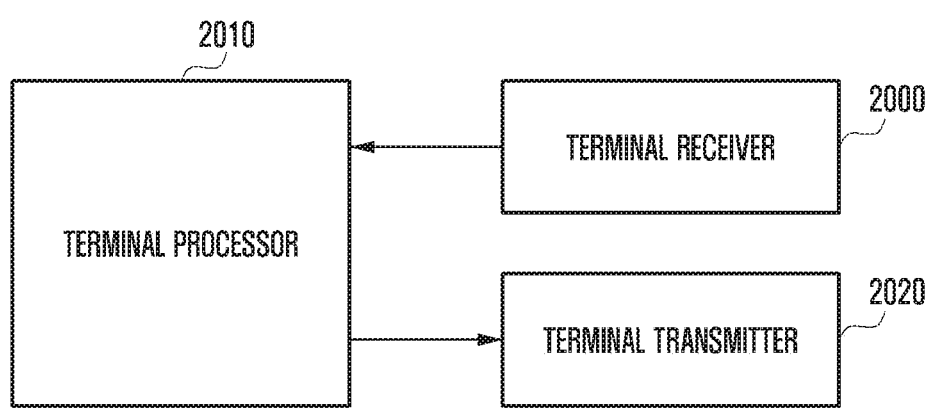
FIG. 20 is a block diagram illustrating an internal structure of a terminal according to an embodiment of the disclosure.
Figure 21:
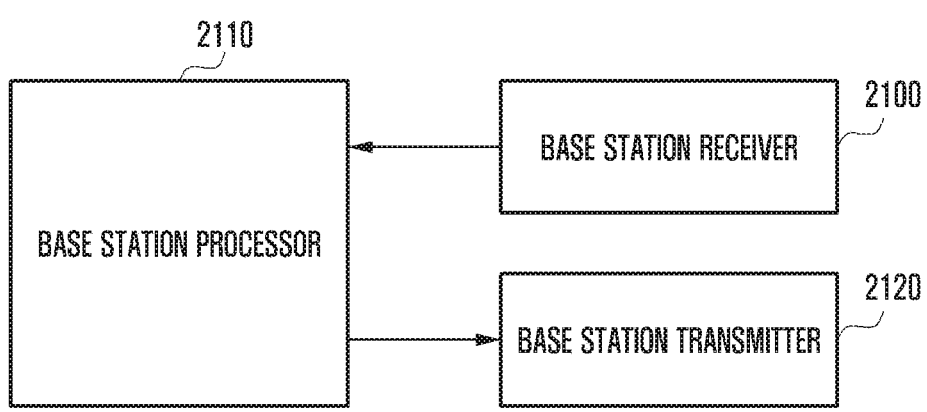
FIG. 21 is a block diagram illustrating an internal structure of a base station according to an embodiment of the disclosure.

In order to perform the above-described embodiments of the disclosure, a transmitter, a receiver, and a processor of the terminal and the base station are each shown in FIGS. 20 and 21. In the 2-1-th to 2-7-th embodiments, the DMRS structure is configured and the method for the base station to configure the DMRS structure and the transmission/reception method of the base station and the terminal is described.

In detail, FIG. 20 is a block diagram illustrating an internal structure of a terminal according to an embodiment of the disclosure. As illustrated in FIG. 20, the terminal according to the embodiment of the disclosure may include a terminal receiver 2000, a terminal transmitter 2020, and a terminal processor 2010. The terminal receiver 2000 and the terminal transmitter 2020 are collectively referred to as a transceiver in the embodiment of the disclosure. The transceiver may transmit/receive a signal to/from the base station. The signal may include control information and data. For this purpose, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the terminal processor 2010 and transmit the signal output from the terminal processor 2010 on the radio channel. The terminal processor 2010 may control a series process to operate the terminal according to the embodiment of the disclosure as described above. For example, the terminal receiver 2000 receives the reference signal from the base station, and the terminal processor 2010 can perform a control to interpret the application method of the reference signal. In addition, the terminal transmitter 2020 can also transmit the reference signal.

FIG. 21 is a block diagram illustrating an internal structure of a base station according to an embodiment of the disclosure.

As illustrated in FIG. 21, the base station of the disclosure may include a base station receiver 2100, a base station transmitter 2120, and a base station processor 2110. The base station receiver 2100 and the base station transmitter 2120 are collectively referred to as a transceiver in the embodiment of the disclosure. The transceiver may transmit/receive a signal to/from the terminal. The signal may include control information and data. For this purpose, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the base station processor 2110 and transmit the signal output from the base station processor 2110 on the radio channel. The base station processor 2110 may control a series process to operate the base station according to the embodiment of the disclosure as described above. For example, the base station processor 2110 may perform a control to determine the structure of the reference signal and generate the configuration information of the reference signal to be transmitted to the terminal. Thereafter, the base station transmitter 2120 transmits the reference signal and the configuration information to the terminal, and the base station receiver 2100 can also receive the reference signal.

Also, according to the embodiment of the disclosure, the base station processor 2110 may process a control to support MU transmission orthogonally between terminals using different DMRS structures. In addition, the base station transmitter 2120 can transmit necessary information to the terminal.

Meanwhile, the embodiments of the disclosure disclosed in the present specification and the accompanying drawings have been provided only as specific examples in order to assist in understanding the disclosure and do not limit the scope of the disclosure. That is, it is obvious to those skilled in the art to which the disclosure pertains that other change examples based on the technical idea of the disclosure may be made without departing from the scope of the disclosure. Further, each embodiment may be combined and operated as needed. For example, some of the embodiments of the disclosure may be combined with each other to operate the base station and the terminal.

Third Embodiment

A wireless communication system has been developed from a wireless communication system providing a voice centered service in the early stage toward broadband wireless communication systems providing high-speed, high-quality packet data services, like communication standards of high speed packet access (HSPA), long term evolution (LTE), or evolved universal terrestrial radio access (E-UTRA) of the 3GPP, high rate packet data (HRPD) and ultra mobile broadband (UMB) of 3GPP2, IEEE 802.16e or the like. In addition, the 5G or new radio (NR) communication standard is being produced as the 5G wireless communication system.

In a wireless communication system including the 5G, at least one service of enhanced mobile broadband (eMBB), massive machine type communications (mMTC), and ultra-reliable and low latency communications (URLLC) may be provided to the terminal. At this time, the services can be provided to the same terminal during the same time period. In the following embodiments of the disclosure, the eMBB is a high speed transmission of high capacity data, the mMTC is terminal power minimization and connection of a plurality of terminals, and the URLLC may be a service aiming at high reliability and low latency, but the disclosure is not limited thereto. Also, in the following embodiments of the disclosure, it is assumed that the URLLC service transmission time is shorter than the eMBB and mMTC service transmission time, but the disclosure is not limited thereto. The above three services may be a major scenario in an LTE system or in systems such as 5G or NR (new radio, next radio) since the LTE.

Hereinafter, embodiments of the disclosure will be described in detail with reference to the accompanying drawings. If it is determined that a detailed description for the known functions or configurations related to the disclosure may obscure the gist of the disclosure, the detailed description therefor will be omitted. Further, the following terminologies are defined in consideration of the functions in the disclosure and may be changed by intentions, practices or the like of users or operators. Therefore, the definitions thereof should be construed based on the contents throughout the specification.

Hereinafter, the base station is a subject of configuring some or the whole of control information of the terminal and performing the resource allocation of the terminal and may be at least one of eNode B, Node B, a base station (BS), a wireless access unit, a base station controller, a transmission and reception point (TRP), and a node on a network. The terminal may include user equipment (UE), a mobile station (MS), a cellular phone, a smart phone, a computer, or a multimedia system capable of performing a communication function. In the present disclosure, a downlink (DL) means a radio transmission path of a signal transmitted from a base station to a terminal and an uplink (UL) means a radio transmission path of a signal transmitted from the terminal to the base station.

Further, as an example of LTE or an LTE-A system, an embodiment of the disclosure is described below, but the embodiment of the disclosure may be applied to other communication systems having similar technical background or a channel form. For example, 5G mobile communication technologies (5G, new radio, NR) developed after the LTE-A could be included. Further, embodiments of the disclosure may be applied even to other communication systems by partially being changed without greatly departing from the scope of the disclosure under the decision of those skilled in the art.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The multiple access scheme as described above normally allocates and operates time-frequency resources on which data or control information is transmitted to prevent the time-frequency resources from overlapping with each other, that is, establish orthogonality, thereby dividing the data or the control information of each user.

If a decoding failure occurs upon initial transmission, the LTE system has adopted a hybrid automatic repeat request (HARQ) scheme of retransmitting the corresponding data in a physical layer. If a receiver does not accurately decode data, the HARQ scheme enables the receiver to transmit information (negative acknowledgement (NACK)) informing the decoding failure to a transmitter to thereby enable the transmitter to retransmit the corresponding data in the physical layer. The receiver combines the data retransmitted by the transmitter with the data that are not decoded previously, thereby increasing reception performance of the data. Further, when the receiver accurately decodes the data, information (acknowledgement (ACK)) informing a decoding success is transmitted to the transmitter so that the transmitter may transmit new data.

Figure 22:
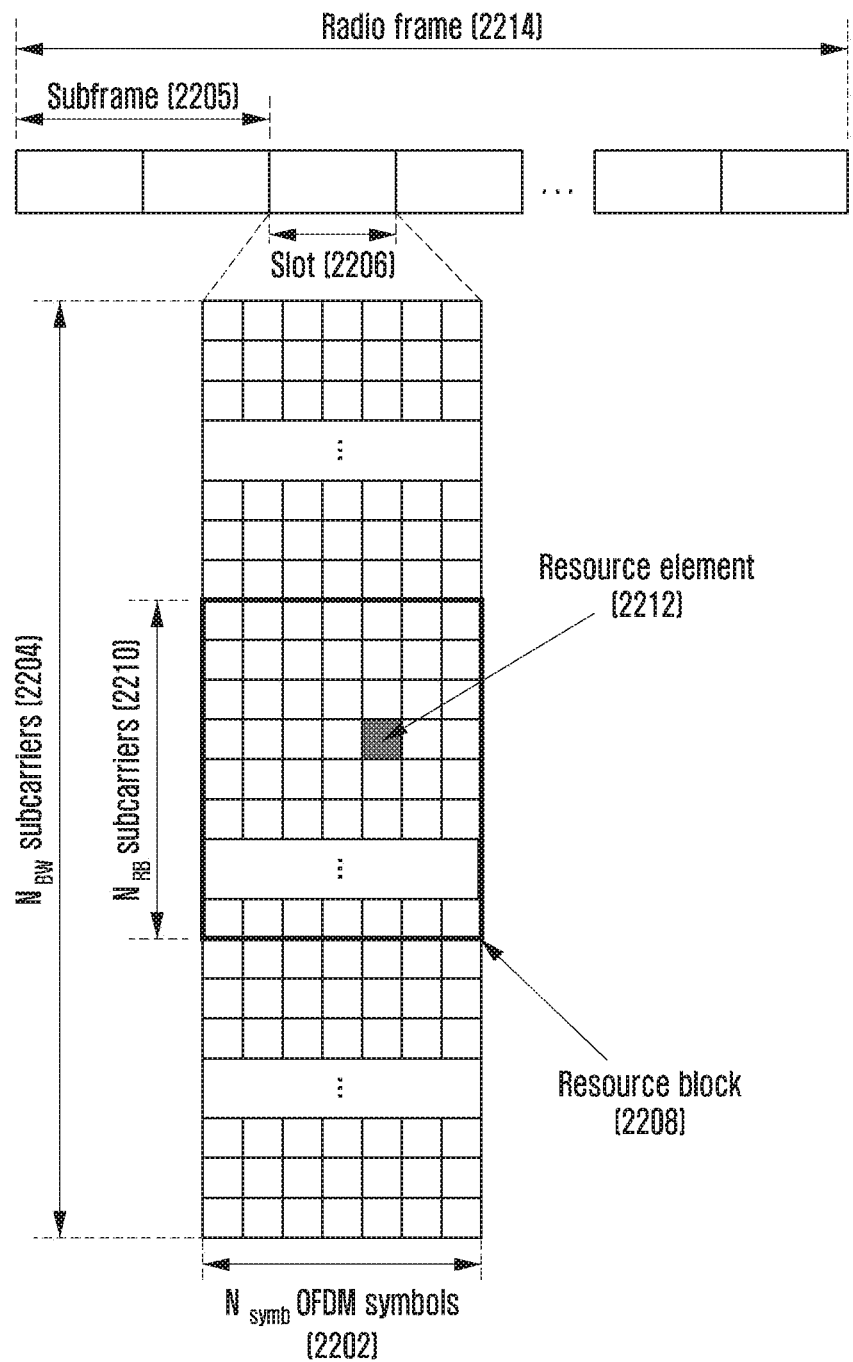
FIG. 22 is a diagram illustrating the basic structure of the time-frequency domain that is the radio resource area to which the data or the control channel is transmitted in a downlink of the LTE system or the system similar thereto according to an embodiment of the disclosure.

FIG. 22 is a diagram illustrating the basic structure of the time-frequency domain that is the radio resource area to which the data or the control channel is transmitted in a downlink of the LTE system or the system similar thereto according to an embodiment of the disclosure.

Referring to FIG. 22, an abscissa represents a time domain and an ordinate represents a frequency domain. A minimum transmission unit in the time domain is an OFDM symbol, in which one slot 2206 is configured by collecting $N_{symb}$ OFDM symbols 2202 and one subframe 2205 is configured by collecting two slots. A length of the slot is 0.5 ms and a length of the subframe is 1.0 ms. Further, a radio frame 2214 is a time domain section consisting of 10 subframes. A minimum transmission unit in a frequency domain is a sub-carrier, in which the entire system transmission bandwidth consists of a total of $N_{BW}$ sub-carriers 2204. However, such specific values can be applied variably.

A basic unit of resources in the time-frequency domain is a resource element (RE) 2212 and may be represented by an OFDM symbol index and a sub-carrier index. A resource block (RB) or a physical resource block (PRB) 2208 is defined by the $N_{symb}$ consecutive OFDM symbols 2202 in the time domain and $N_{RB}$ consecutive sub-carriers 2210 in the frequency domain. Thus, one RB 2208 in one slot may include $N_{symb} \times N_{RB}$ REs 2212. In general, the minimum frequency-domain allocation unit of data is the RB, and in the LTE system, generally $N_{symb}=7$ and $N_{RB}=12$, and the $N_{BW}$ can be proportional to the bandwidth of the system transmission band.

The data rate increases in proportion to the number of RBs scheduled to the terminal, and the LTE system can define and operate six transmission bandwidths. In an FDD system operated by dividing a downlink and an uplink based on a frequency, a downlink transmission bandwidth and an uplink transmission bandwidth may be different from each other. A channel bandwidth represents an RF bandwidth corresponding to the system transmission bandwidth. The following Table 33 shows a correspondence relationship between the system transmission bandwidth and the channel bandwidth that are defined in the LTE system. For example, the LTE system having the channel bandwidth of 10 MHz is configured of a transmission bandwidth including 50 RBs.

TABLE 33

| Channel bandwidth BW$_{channel}$ [MHz] | 1.4 | 3 | 5 | 10 | 15 | 20 |
|---|---|---|---|---|---|---|
| Transmission bandwidth configuration N$_{RB}$ | 6 | 15 | 25 | 50 | 75 | 100 |

The downlink control information may be transmitted within first N OFDM symbols within the subframe. In the embodiment, generally, N={1, 2, 3}. Therefore, the N value may variably apply to each subframe depending on the amount of control information to be transmitted to the current subframe. The transmitted control information may include a control channel transmission section indicator representing over how many OFDM symbols the control information is transmitted, scheduling information on downlink data or uplink data, information on HARQ ACK/NACK, or the like.

In the LTE system, the scheduling information on the downlink data or the uplink data is transmitted from a base station to a terminal through the downlink control information (DCI). The DCI is defined depending on various formats, and thus applies and it may be indicated whether the DCI is the scheduling information (uplink (UL) grant) on the uplink data and the scheduling information (downlink (DL) grant) on the downlink data, whether the DCI is compact DCI having a small size of control information, whether the DCI applies spatial multiplexing using a multiple antenna, whether the DCI is DCI for a power control, or the like depending on each format. For example, DCI format 1 that is the scheduling control information (DL grant) on the downlink data may include one of at least following control information.

Resource allocation type 0/1 flag: It is indicated whether a resource allocation scheme is type 0 or type 1. The type 0 applies a bitmap scheme to allocate a resource in a resource block group (RBG) unit. In the LTE system, a basic unit of the scheduling is an RB represented by time-frequency domain resources, and the RBG is configured of a plurality of RBs and thus becomes the basic unit of the scheduling in the type 0 scheme. The type 1 allocates a specific RB within the RBG.

Resource block allocation: The RB allocated to the data transmission is indicated. The represented resource is determined depending on the system bandwidth and the resource allocation scheme.

Modulation and coding scheme (MCS): The modulation scheme used for the data transmission and a size of a transport block that is the data to be transmitted are indicated.

HARQ process number: An HARQ process number is indicated.

New data indicator: An HARQ initial transmission or retransmission is indicated.

Redundancy version: An HARQ redundancy version is indicated.

Transmit power control (TPC) command for physical uplink control channel (PUCCH): A transmit power control command for the PUCCH that is an uplink control channel is indicated.

The DCI is subjected to a channel coding and modulation process and then is transmitted on a physical downlink control channel (PDCCH) or an enhanced PDCCH (EPDCCH) that is the downlink physical control channel. Hereinafter, the PDCCH or EPDCCH transmission may be interchangeably used with the DCI transmission on the PDCCH or the EPDCCH.

Generally, the DCI is independently scrambled with a specific radio network temporary identifier (RNTI) (or a terminal identifier) for each terminal to be added with a cyclic redundant check (CRC), subjected to channel coding, and then configured of independent PDCCH to be transmitted. In the time domain, the PDCCH is transmitted while being mapped during the control channel transmission section. A mapping position in the frequency domain of the PDCCH is determined by identifiers (IDs) of each terminal and is spread over the entire system transmission bandwidth.

The downlink data may be transmitted on a physical downlink shared channel (PDSCH) that is a physical channel for downlink data transmission. The PDSCH is transmitted after the control channel transmission section and the scheduling information on the detailed mapping location in the frequency domain, the modulation scheme, or the like is determined based on the DCI transmitted on the PDCCH.

By the MCS among the control information configuring the DCI, the base station notifies the modulation scheme applied to the PDSCH to be transmitted to the terminal and a data size (transport block size (TBS)) to be transmitted. In the embodiments, the MCS may consist of 5 bits or bits larger or smaller than that. The TBS corresponds to a size before channel coding for error correction is applied to data (transport block (TB)) to be transmitted by a base station.

The modulation scheme supported in the LTE system is quadrature phase shift keying (QPSK), 16 quadrature amplitude modulation (QAM), and 64QAM, in which each modulation order $Q_m$ corresponds to 2, 4, and 6. That is, in the case of the QPSK modulation, 2 bits per symbol may be transmitted, in the case of the 16QAM modulation, 4 bits per symbol may be transmitted, and in the case of the 64QAM modulation, 6 bits per symbol may be transmitted. Further, the modulation scheme above 256 QAM may be used depending on the system modification.

Figure 23:
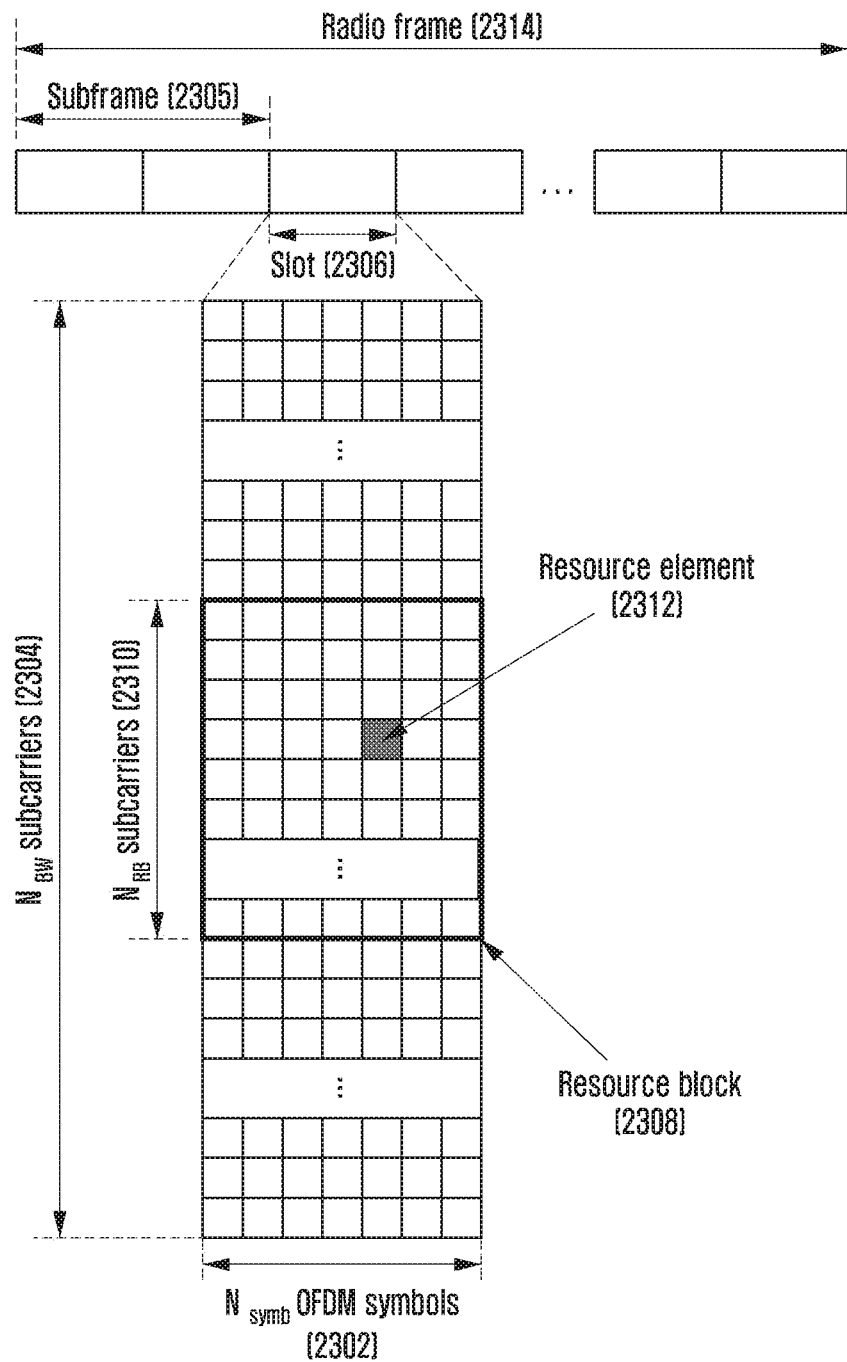
FIG. 23 is a diagram illustrating a basic structure of a time-frequency domain that is a radio resource area to which data or a control channel is transmitted in the uplink of the LTE-A system and the system similar thereto according to an embodiment of the disclosure.

FIG. 23 is a diagram illustrating a basic structure of a time-frequency domain that is a radio resource area to which data or a control channel is transmitted in the uplink of the LTE-A system and the system similar thereto according to an embodiment of the disclosure.

Referring to FIG. 23, an abscissa represents a time domain and an ordinate represents a frequency domain. The minimum transmission unit in the time domain is an SC-FDMA symbol 2302, and the $N_{symb}$ SC-FDMA symbols are gathered to form one slot 2306. Two slots are gathered to form one subframe 2305. The minimum transmission unit in the frequency domain is a subcarrier, in which the entire system transmission bandwidth 2304 includes a total of $N_{BW}$ subcarriers. The $N_{BW}$ may have a value proportional to the system transmission bandwidth.

A basic unit of resources in the time-frequency domain is a resource element (RE) 2312 and may be defined by an SC-FDMA symbol index and a subcarrier index. The resource block (RBs) 2308 is defined as $N_{symb}$ continued SC-FDMA symbols in the time domain and $N_{sc}$ continued subcarriers in the frequency domain. Accordingly, one RB consists of $N_{symb} \times N_{RB}$ REs. In general, the minimum transmission unit of data or control information is an RB unit. The PUCCH is mapped to a frequency domain corresponding to 1 RB and transmitted for one subframe.

In the LTE system, a timing relationship between a PUCCH or a PUSCH is defined, with the PUCCH or the PUSCH being an uplink physical channel to which an HARQ ACK/NACK corresponding to a PDSCH as a physical channel for downlink data transmission or a PDCCH or EPDDCH including a semi-persistent scheduling release (SPS release) is transmitted. For example, in an LTE system operated by frequency division duplex (FDD), the HARQ ACK/NACK corresponding to the PDSCH transmitted in an n-4-th subframe or the PDCCH or EPDCCH including the SPS release is transmitted to the PUCCH or the PUSCH in an n-th subframe.

In the LTE system, the downlink HARQ has adopted an asynchronous HARQ scheme in which data retransmission timing is not fixed. That is, if the HARQ NACK for initial transmission data transmitted by the base station is fed back from the terminal, the base station freely determines transmission timing of the retransmission data based on the scheduling operation. The terminal performs buffering on data determined as an error as a result of decoding the received data for an HARQ operation and then performs combining with the next retransmission data.

If the terminal receives the PDSCH including the downlink data transmitted from the base station in subframe n, the uplink control information including the HARQ ACK or NACK of the downlink data is transmitted to the base station on the PUCCH or the PUSCH in subframe n+k. At this time, the k is differently defined depending on the FDD or time division duplex (TDD) of the LTE system and the subframe setting thereof. For example, in the case of the FDD LTE system, the k is fixed as 4. On the other hand, in the case of the TDD LTE system, the k may be changed according to the subframe setting and the subframe number. In addition, the value of k may be differently applied depending on the TDD setting of each carrier at the time of data transmission through a plurality of carriers.

In the LTE system, unlike the downlink HARQ, the uplink HARQ has adopted a synchronous HARQ scheme in which the data transmission timing is fixed. That is, the uplink/downlink timing relationship between the physical uplink shared channel (PUSCH) as the physical channel for the uplink data transmission and the PDCCH as the downlink control channel preceding the PUSCH and a physical hybrid indicator channel (PHICH) as the physical channel to which a downlink HARQ ACK/NACK corresponding to the PUSCH is transmitted may be transmitted and received by the following rule.

When receiving the PDCCH including the uplink scheduling control information transmitted from the base station at the subframe n or the PHICH on which the downlink HARQ ACK/NACK are transmitted, the terminal transmits the uplink data corresponding to the control information at subframe n+k on the PUSCH. At this time, the k is differently defined depending on the FDD or time division duplex (TDD) of the LTE system and the setting thereof. For example, in the case of the FDD LTE system, the k is fixed as 4. On the other hand, in the case of the TDD LTE system, the k may be changed according to the subframe setting and the subframe number. In addition, the value of k may be differently applied depending on the TDD setting of each carrier at the time of data transmission through a plurality of carriers.

Further, if the terminal receives the PHICH including the information associated with the downlink HARQ ACK/NACK from the base station in subframe i, the PHICH corresponds to the PUSCH that the terminal transmits in subframe i-k. At this time, the k is differently defined according to the FDD or the TDD of the LTE system and the setting thereof. For example, in the case of the FDD LTE system, the k is fixed as 4. On the other hand, in the case of the TDD LTE system, the k may be changed according to the subframe setting and the subframe number. In addition, the value of k may be differently applied depending on the TDD setting of each carrier at the time of data transmission through a plurality of carriers.

The description of the wireless communication system is based on the LTE system, and the contents of the disclosure are not limited to the LTE system but may be applied to various wireless communication systems such as NR and 5G. Also, in the embodiment, in a case where the disclosure is applied to another wireless communication system, the k value may be changed and applied to a system using a modulation scheme corresponding to FDD FIGS. 24 and 25 are diagrams illustrating an example in which data for eMBB, URLLC, and mMTC, which are services to be considered in a 5G or NR system are allocated in frequency-time resources according to various embodiments of the disclosure.

Figure 24:
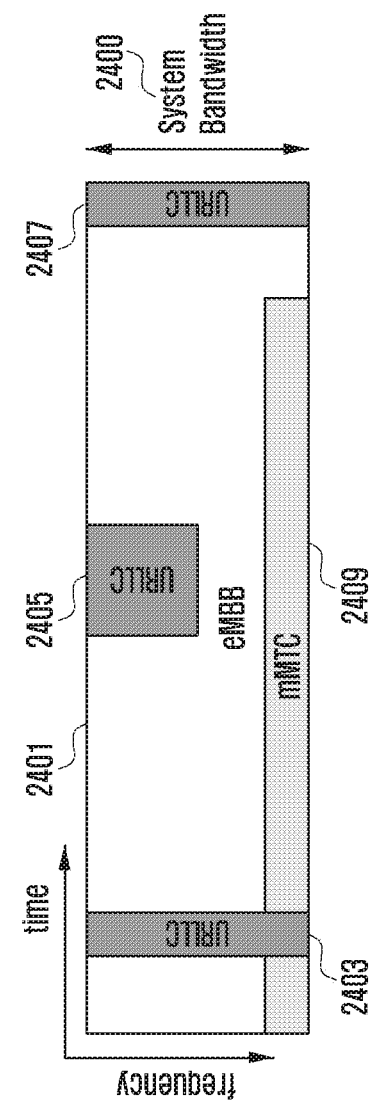
FIGS. 24 and 25 are diagrams illustrating an example in which data for enhanced mobile broadband (eMBB), ultra-reliable and low latency communication (URLLC), and massive machine type communication (mMTC), which are services to be considered in a 5G or new radio (NR) system are allocated in frequency-time resources according to various embodiments of the disclosure.
Figure 25:
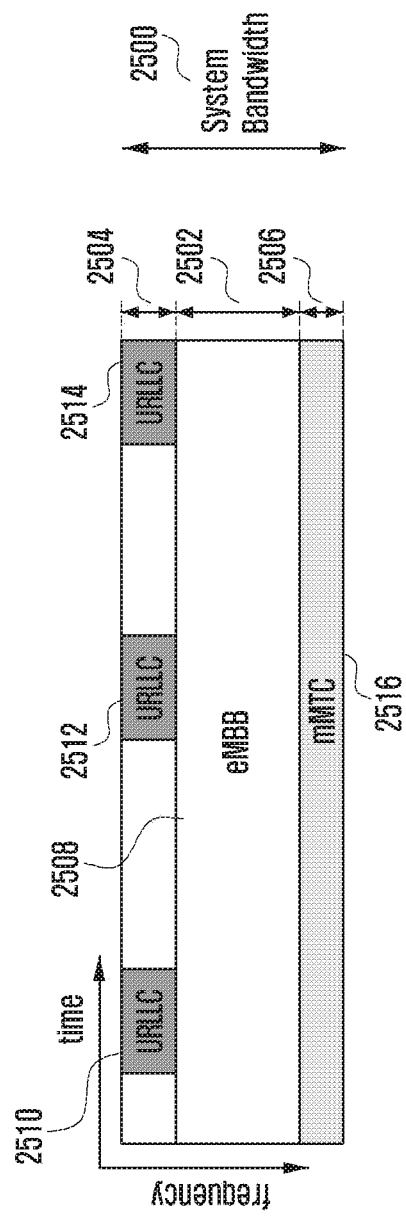

Referring to FIGS. 24 and 25, a method for allocating frequency and time resources for information transmission in each system can be seen.

First, FIG. 24 shows an appearance in which the data for the eMBB, the URLLC, and the mMTC are allocated in the entire system frequency bandwidth 2400. If URLLC data 2403, 2405, and 2407 needs to be generated and transmitted while the eMBB 2401 and the mMTC 2407 are allocated and transmitted in a specific frequency band, the transmitter may empty or does not transmit a part to which the eMBB 2403 and the mMTC 2409 are allocated in advance is emptied and may transmit the URLLC data 2403, 2405, and 2407. In the URLLC among the above services, since there is a need to reduce the delay time, the URLLC data 2403, 2405, and 2407 may be transmitted while being allocated to a part of the resource 2401 to which the eMBB is allocated. If the URLLC is transmitted while being additionally allocated to the resource to which the eMBB is allocated, the eMBB data may not be transmitted in the redundant frequency-time resources, such that the transmission performance of the eMBB data may be lowered. That is, in such a case, the eMBB data transmission failure may occur due to the URLLC allocation.

In FIG. 25, the entire system frequency band 2500 may be divided into each subband 2502, 2504, and 2506 and may be used for the purpose of transmitting service and data. Information related to the subband setting may be determined in advance. The information may be transmitted from the base station to the terminal through higher signaling. Alternatively, the base station or the network node are arbitrarily divided into each subband and may provide services without transmitting the separate subband configuration information to the terminal. FIG. 25 illustrates an appearance that subband 2502 is used for eMBB data transmission 2508, subband 2504 is used for URLLC data transmissions 2510, 2512, and 2514, and subband 2506 is used for mMTC data transmission 2516.

All the embodiments are described on the assumption that the length of the transmission time interval (TTI) used in the URLLC transmission is shorter than the TTT length used for the eMBB or mMTC transmission but may be applied even to the case in which the URLLC transmission TTI length is used for the eMBB or mMTC transmission. In addition, a response to the information related to the URLLC may be transmitted faster than the response time of the eMBB or mMTC, such that the information may be transmitted and received with the low latency.

To transmit at least one of control information and data for three services, the structure of the physical layer channel used according to each service type may be different. For example, at least one of the transmission time interval (TTI) length, the frequency or time resource allocation unit, the control channel structure, the method for mapping data may be different. In this case, although three different services, control information and data have been described above by way of example, more kinds of services, control information and data may exist. Even in this case, the contents of the disclosure may also be applied. In addition, it is to be understood that the embodiments of the disclosure may separately describe the control information and data for the services without departing from the scope of the disclosure as defined by those skilled in the art and the disclosure can be applied by considering the control information in the service data.

For describing the method and the apparatus proposed in the above embodiments, the terms physical channel and signal in the existing LTE or LTE-A system can be used. However, the content of the disclosure may be applied to wireless communication systems other than the LTE and LTE-A systems.

In the disclosure, at least one of an uplink scheduling grant signal and a downlink data signal is referred to as a first signal. In addition, in the disclosure, at least one of the uplink data signal for the uplink scheduling grant and the response signal (or HARQ ACK/NACK signal) for the downlink data signal are referred to as a second signal. In addition, among the signals transmitted from the base station to the terminal, a signal expecting a response from terminal may be a first signal, and a response signal of the terminal corresponding to the first signal may be a second signal. Also, in the embodiment, the service type of the first signal may be at least one of eMBB, URLLC, and mMTC, and the second signal may also correspond to at least one of the services.

Also, the technology proposed in the disclosure is applicable not only to FDD and TDD systems, but also to a new type of duplex mode (for example, frame structure type 3).

Hereinafter, in the disclosure, the higher signaling refers to a method for transmitting a signal from the base station to the terminal using the downlink data channel or from the terminal to the base station using the uplink data channel, and refers to the transmission between the base station and the terminal by at least one method of the radio resource control (RRC) signaling, packet data convergence protocol (PDCP) signaling, and the medium access control (MAC) control element (MAC CE).

Hereinafter, the embodiment of the disclosure describes an uplink transmission resource allocation method for reducing delay between uplink transmission configuration information transmission and uplink transmission in providing at least one service including eMBB, mMTC, URLLC to the terminal. In addition, the embodiment of the disclosure is described on the assumption of the base station and the terminal that perform uplink transmission through a licensed band or an unlicensed band. However, the embodiments of the disclosure may be applied without separately discriminating the licensed band or the unlicensed band.

In general, the base station schedules a specific TTI and a frequency resource region so that the terminal can transmit the uplink data or the control information corresponding to eMBB, mMTC, URLLC, and the like. For example, the base station can set the subframe n to perform uplink transmission subframe n+k (k≥0) to a specific terminal on a downlink control channel in a subframe n. In other words, the base station transmits the uplink transmission configuration information to a UE requiring the uplink transmission on the downlink control channel in the subframe n, and the terminal receiving the uplink transmission configuration information may transmit the uplink data or the control information to the base station (or another terminal) using the time and frequency resource region set in the uplink transmission configuration information. At this time, the terminal having the data or control information to be transmitted through the uplink may transmit the scheduling request information to the base station or may request the base station to transmit the uplink transmission configuration information to the terminal through the random-access procedure.

In other words, the uplink transmission of the general terminal can be performed in the following three operations. In this case, the uplink transmission through the three operations, is only an example, and the uplink transmission through operations larger or smaller than the operations described in this example is also possible.

Operation 1: The terminal generating the data or control information to be transmitted through the uplink requests the base station to transmit the uplink transmission configuration to the base station through the effective uplink resource capable of transmitting the uplink transmission configuration request. At this time, at least one of a time resource and a frequency resource that can request the uplink transmission configuration may be defined in advance or may be set through a higher signal.

Operation 2: The base station receiving the uplink transmission configuration request from the terminal configures the uplink transmission by transmitting the uplink transmission configuration information to the terminal on the downlink control channel.

Operation 3: The terminal receiving the uplink transmission configuration from the base station performs uplink transmission using the uplink transmission configuration information configured by the base station.

That is, the terminal generating data or control information to be transmitted through the uplink generates a transmission delay longer than a predetermined time taken to transmit the uplink information. For example, when the uplink transmission configuration request resource is set at a period of 5 ms in the terminal in which the uplink transmission data has been generated at time n, a delay of up to 5 ms may occur in transmitting uplink transmission configuration request information. In addition, if the transmission delay (for example, 1 ms) between the set uplink control information reception time and the set uplink transmission start time is required, a transmission delay of at least 6 ms is inevitable in starting the uplink transmission. In the case of the general LTE system, the transmission delay between the set uplink reception control information reception time and the set uplink transmission start time is at least 4 ms. Accordingly, the disclosure proposes a method for reducing an uplink transmission delay by enabling the terminal for performing the uplink signal transmission operation to perform the uplink transmission without receiving the separate uplink transmission configuration information from the base station.

Hereinafter, in all the embodiments of the disclosure, the terminal receives the uplink transmission configuration information or the uplink scheduling grant information or the uplink grant which is transmitted on the downlink control channel (e.g., PDCCH) transmitted from the base station, and the scheme of transmitting the uplink information (e.g., uplink data channel (PUSCH)) according to the received uplink transmission configuration information refers to a first uplink transmission scheme or a grant-based uplink transmission scheme. The terminal transmits the uplink information depending on the uplink transmission configuration information configured in advance or directly selects at least one of the preset uplink transmission configuration information without receiving the uplink transmission configuration information or the uplink scheduling grant information or the UL grant transmitted on the downlink control channel (e.g., PDCCH) transmitted from the base station, and the uplink transmission scheme of transmitting the uplink information depending on the preset uplink transmission configuration information and the uplink transmission configuration information selected by the terminal is referred to as a second uplink transmission scheme or a grant-free uplink transmission scheme or a non-scheduling uplink transmission scheme.

In other words, the second uplink transmission means that the terminal the uplink transmission is performed without the terminal receiving the DCI format transmitting the uplink transmission configuration information on the PDCCH from the base station. In this case, in the second uplink transmission scheme, the uplink transmission configuration information related to the uplink transmission for the initial transmission may start the uplink transmission based on the uplink transmission configuration information or the uplink scheduling grant information or the UL grant transmitted on the downlink control channel (e.g., PDCCH) transmitted from the base station.

Accordingly, in the disclosure, when the terminal attempts to transmit the uplink signal according to the second uplink transmission scheme, a method for the terminal to perform the uplink transmission using (without receiving the separate uplink transmission configuration information transmitted from the base station on the downlink control channel) radio resources such as time, frequency, and code in which the second uplink transmission indicated on the broadcast channel or the like which is defined in advance or transmitted including the higher signal or the system information (e.g., system information block (SIB)) from the base station is set. In addition, in the disclosure, a method for the terminal to transmit the uplink transmission transmitted without receiving the uplink transmission configuration information from the base station through the second uplink transmission scheme, that is, a method for changing the uplink transmission scheme will be described.

Generally, for the uplink signal transmission of the terminal, after the terminal receives the configuration information or the scheduling information on the uplink transmission from the base station, the terminal may perform the configured uplink transmission using the time and frequency resources or the like that the base station sets through the uplink transmission configuration information of the terminal.

The base station can establish the uplink transmission scheme in the base station or the cell to the terminal through the higher signal. For example, the base station may set the terminal to use only one of the first uplink transmission scheme and the second uplink transmission scheme, or the base station may set the terminal to use the second uplink transmission scheme in addition to the first uplink transmission scheme. A method for configuring the uplink transmission scheme of the terminal through the higher signal is as follows. The base station adds a field about the uplink transmission scheme of the terminal (e.g. grantfreeULtransmission field) to RRC configuration information for a specific base station or cell (or SCell or TRP (transmission and reception point)), and sets the field value as true or allows the field exists, thus may allow the terminal to configure the uplink transmission scheme for the cell as the second uplink transmission scheme or configured as the second uplink transmission or add the second uplink transmission scheme to the first transmission scheme. At this time, the terminal receives the RRC field value set as false or determines that the grantFreeUtransmission field does not exist, so that the terminal determines that only the first uplink transmission scheme receiving the uplink control information from the base station by the uplink transmission scheme for the cell and transmitting it is used. The RRC field and configuring method (e.g., true/false) and the division of the uplink transmission scheme are merely examples, but the disclosure is not limited thereto.

In addition, the base station can transmit the uplink transmission scheme in the base station or the cell to one or more terminals through the system information transmission on the broadcast channel of the base station or the cell. Hereinafter, a method for transmitting or configuring uplink transmission scheme of a terminal through a transmission of system information on a broadcast channel to a terminal is as follows. A base station or a cell (or SCell, or transmission and reception point (TRP)) may periodically or non-periodically transmit or broadcast system information (e.g., master information block (MIB) or system information block (SIB) to one or more terminal. At this time, the broadcast channel means a channel that a plurality of terminals may receive through a predetermined identifier (e.g. system information RNTI). At this time, the system information includes not only the configuration related to the uplink transmission scheme of the cell, but it may also include the configuration information related to the second uplink transmission scheme, for example, at least one of time and frequency resource information on which the uplink signal can be transmitted according to the second uplink transmission scheme. If the uplink transmission scheme of the cell is configured as the first uplink transmission scheme, the time and frequency resource information that can transmit uplink signals for second uplink transmission scheme may not be included, and even if the uplink signal transmission time and frequency resource information are included according to the second uplink transmission scheme, the terminal can ignore the time and frequency resource information.

The base station can configure the uplink transmission scheme of the terminal on the downlink control channel of the base station. A method for configuring the uplink transmission scheme of the base station on the downlink control channel of the base station is as follows. The base station may add and transmit the field that indicates or transmits the uplink transmission scheme to the common control channel (or cell-specific search space) or the group common control channel (or group-specific search space) among the downlink link control channels of the base station configuring the uplink transmission scheme of the terminal, and the terminal may determine the uplink transmission scheme based on the field or determine whether to transmit the uplink according to the second uplink transmission scheme. At this time, the common control channel or the group common control channel may be predefined for specific terminals or may refer to a channel which enables all or a specific group of terminals to receive the same control information from the base station through an identifier (e.g., group RNTI) or the like configured from the group.

For example, the base station may configure the uplink transmission scheme of the terminal included in the group by adding fields related to the uplink transmission scheme of the group among the information on the uplink transmission transmitted in the group common control channel or permit the uplink transmission through the second uplink transmission scheme. Specifically, a field for transmitting information related to the uplink transmission scheme, the type field, or the presence or absence of the uplink transmission configuration, for example, a 1-bit field is added. When the field is set to be 1, the terminals receiving the control channel may perform the uplink transmission to the base station or the cell according to the second uplink transmission scheme. At this time, if the field is set to be 0, the terminals receiving the control channel can perform the uplink transmission to the base station or the cell according to the first uplink transmission scheme. At this time, the added field and the field configuration scheme are only one example, and a field of 1 bit or more can be configured. For example, by adding a 2-bit field, the uplink transmission scheme of the terminals may be configured by dividing the second uplink transmission scheme, the first uplink transmission scheme, the second uplink transmission scheme, and the first uplink transmission scheme.

As described above, the terminal having the uplink transmission scheme configured as the second uplink transmission scheme may receive all of the parameters related to the uplink transmission through the higher signal from the base station or receive some of the parameters related to the uplink transmission through the higher signal from the base station, and select the uplink transmission configuration information not configured and transmit the uplink signal through the second uplink transmission scheme depending on the selected configuration. At this time, the terminal configures the candidates that can be selected by the terminal through the higher signal from the base station for the parameters related to the uplink transmission other than the established configuration, and the terminal selects one of the candidates and transmit the uplink signal according to the second uplink transmission scheme depending on the selected configuration. For example, the terminal may select at least one parameter of the time resource region, the frequency resource region, an MCS, a PMI MCS, a DMRS sequence, a DMRS cyclic shift information, and the like.

Figure 26:
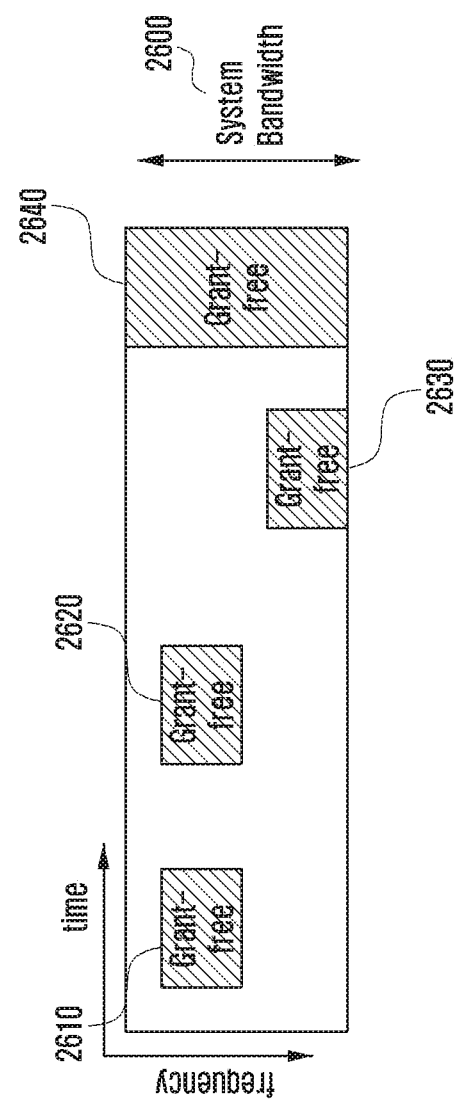
FIG. 26 is a diagram illustrating an example of a second uplink transmission scheme according to an embodiment of the disclosure.

FIG. 26 is a diagram illustrating an example of a second uplink transmission scheme according to an embodiment of the disclosure.

As shown in FIG. 26, the base station that configures the second uplink transmission scheme for the terminal may configure the periodic time resource region information, which can perform the uplink transmission according to the second uplink transmission scheme, in the terminal based on the higher signal or the uplink transmission configuration information. The terminal may select and transmit a time-frequency resource domain in which the actual uplink transmission is performed in the time-frequency domain in which uplink transmission can be performed according to the established second uplink transmission scheme. As another example, the base station may set a selectable candidate or set value, for example, an MCS set (QPSK, 16QAM), among the parameters related to the uplink transmission that the terminal can select, and the terminal can select the uplink transmission setting value to be used for the second uplink transmission scheme among the established candidates. At this time, the example in which the time-frequency resource region is set in advance and the time-frequency resource and/or the MCS value or the like is selected arbitrarily or according to the channel status information or the like is merely an example. The terminal may select all or some of the parameters including the parameters in addition the parameters necessary for the above-mentioned uplink transmission and can transmit the uplink signal according to the second uplink transmission scheme.

At this time, the base station receives the uplink signal transmitted by the terminal and detects a specific signal among the received signals, for example, a DMRS sequence, DMRS cyclic shift information, or a preamble set for use by the terminal or the like to determine whether to transmit the uplink signal of the terminal. The base station that has correctly detected whether or not the uplink signal is transmitted by the terminal decodes the received uplink signal to determine the reception result of the uplink signal. In other words, when the base station detects the uplink signal transmission of the terminal for the uplink signal transmission of the terminal and correctly decodes the uplink signal (successful reception), the base station detects the uplink signal transmission of the terminal, but when the uplink signal is not decoded correctly (reception failure) but the uplink signal transmission of the terminal is not detected (detection failure), the base station may determine three uplink signal reception results.

The base station detects the uplink signal transmission but when the uplink signal is not decoded correctly, the uplink retransmission should be requested to the terminal. That is, the base station should notify the terminal of the uplink reception result of the base station. When the base station detects the uplink signal transmission of the terminal and correctly decodes the uplink signal, the base station may not separately notify the terminal of the uplink reception result of the base station. If the base station does not notify the reception result when the uplink transmission of the terminal is received correctly, the terminal may determine that the base station correctly receives the uplink signal transmission using the information or the like after a predetermined time elapses or when the timer is completed or a new uplink transmission is configured by the first uplink transmission scheme or the like. At this time, even when the base station detects the uplink signal transmission of the terminal and correctly decodes the uplink signal, the base station can notify the terminal of the uplink reception result of the base station. However, if the base station does not detect the uplink signal transmission of the terminal, i.e., if it is determined that the base station does not transmit the uplink signal transmitted from the terminal, the base station notifies the terminal of the uplink signal reception result of the terminal.

That is, when the base station detects the uplink signal transmission of the terminal and correctly decodes the uplink signal (reception success), the base station detects the uplink signal transmission of the terminal, or when the base station does not correctly decode the uplink signal (reception failure), the base station at least detects the uplink signal transmission of the terminal, or when the base station does not correctly decode the uplink signal, the base station notifies the terminal of the reception result of the uplink signal of the base station and should request the retransmission for the uplink signal. Accordingly, the base station transmits the configuration information on the retransmission for the transmitted uplink transmission or the uplink scheduling configuration information or the UL grant to the terminal on the downlink control channel, and the terminal receiving the transmitted uplink transmission configuration information may retransmit the uplink signal depending on the uplink transmission configuration information. That is, the uplink signal transmitted according to the second uplink transmission scheme may be retransmitted based on the first uplink transmission scheme.

However, the terminal may not determine whether the uplink scheduling grant information received from the base station is the uplink transmission configuration information configured for the retransmission for the uplink signal transmitted according to the second uplink transmission scheme or the new uplink signal is the uplink transmission configuration information set to be transmitted according to the first uplink transmission scheme. However, according to the disclosure, a method for the terminal to determine whether the uplink scheduling grant information received from the base station is the uplink transmission configuration information configured for the retransmission for the uplink signal transmitted according to the second uplink transmission scheme or the new uplink signal is the uplink transmission configuration information set to be transmitted according to the first uplink transmission scheme is proposed.

In addition, although the disclosure has been described with reference to the slot, the HARQ process ID may be determined in the time or slot proposed in the disclosure, based on a mini slot having the number of symbols smaller than the number of symbols configuring the slot or a subframe having the larger number of symbols than the number of symbols configuring the slot.

Further, the disclosure is not limited to the embodiments 3-1, 3-2, and 3-3, based on using some or all of the embodiments, a method for the terminal to determine whether the uplink scheduling setting information received from the base station is the uplink transmission configuration information configured for the retransmission for the uplink signal transmitted according to the second uplink transmission scheme or whether the new uplink signal is the uplink transmission configuration information configured to be transmitted according to the first uplink transmission scheme is proposed.

3-1-th Embodiment

In this embodiment, a method for configuring a retransmission identifier (hereinafter referred to as HARQ process ID) for uplink signal transmission according to time is proposed. The terminal can determine the HARQ process ID for the uplink signal transmitted according to the second uplink transmission scheme according to the HARQ process ID configuration over the time proposed in the present embodiment. If the uplink transmission configuration information received on the downlink control channel from the base station or the uplink transmission determined by the DCI format for the uplink transmission configuration is a retransmission for the uplink signal transmitted according to the second uplink transmission scheme, for example, if the HARQ process ID included in the received uplink transmission configuration information or the DCI format for uplink transmission configuration is the same as the HARQ process ID for the uplink signal transmitted according to the second uplink transmission scheme determined by the terminal according to the present embodiment and the initial transmission or retransmission identifier, for example, a new data indicator (NDI) information is determined as the configuration of the retransmission for the HARQ process ID (for example, when the NDI value is set to be 1), the terminal determines that the received uplink transmission configuration information is the retransmission for the uplink signal transmitted according to the second uplink transmission scheme and retransmit the uplink signal according to the received uplink transmission configuration.

If the HARQ process ID included in the received uplink transmission configuration information or the DCI format for uplink transmission configuration is the same as the HARQ process ID for the uplink signal transmitted according to the second uplink transmission scheme determined by the terminal according to the present embodiment and the initial transmission or retransmission identifier, for example, it is determined that the new data indicator (NDI) information configures the initial transmission for the HARQ process ID (e.g., when the NDI value is set to be 0), the terminal determines that the base station correctly receives the uplink signal transmitted according to the second uplink transmission scheme through the received uplink transmission configuration information and delete the uplink signal transmitted according to the second uplink transmission scheme from a buffer, an HARQ soft buffer or the like. If the terminal has a signal to be transmitted to the base station through the uplink, the terminal can transmit the uplink signal according to the received uplink transmission configuration information. If the terminal does not have a signal to be transmitted to the base station through the uplink, the terminal cannot transmit the uplink signal according to the received uplink transmission configuration information. Even if the terminal does not have a signal to be transmitted to the base station through the uplink, the terminal can transmit the uplink signal, for example, buffer status report (BSR) information or the like according to the received uplink transmission configuration information.

The base station and the terminal can determine the HARQ process ID by Equation having as a factor at least one of a system frame number (SFN), a number N of uplink transmission slots in which an uplink signal transmission according to a second uplink transmission scheme is set in a predetermined interval (M slots) M), an index n (n is an integer ranging from 0 to N−1) of an uplink transmission slot in which an uplink signal transmission according to the second uplink transmission scheme is set, an absolute value (or slot number) of the uplink transmission slot in which an uplink signal transmission according to the second uplink transmission scheme is set, or the total number (K) of the uplink HARQ process IDs.

In this case, the index n, n', n" of the uplink transmission slot in which the uplink signal transmission according to the second uplink transmission scheme described in the disclosure is set may be different from the absolute value or the slot number of the uplink transmission slot as the index value in which the uplink signal transmission according to the second uplink transmission scheme is set in the interval M. At this time, M of the interval may be expressed by the number of slots or subframes configuring one radio frame.

Figure 27:
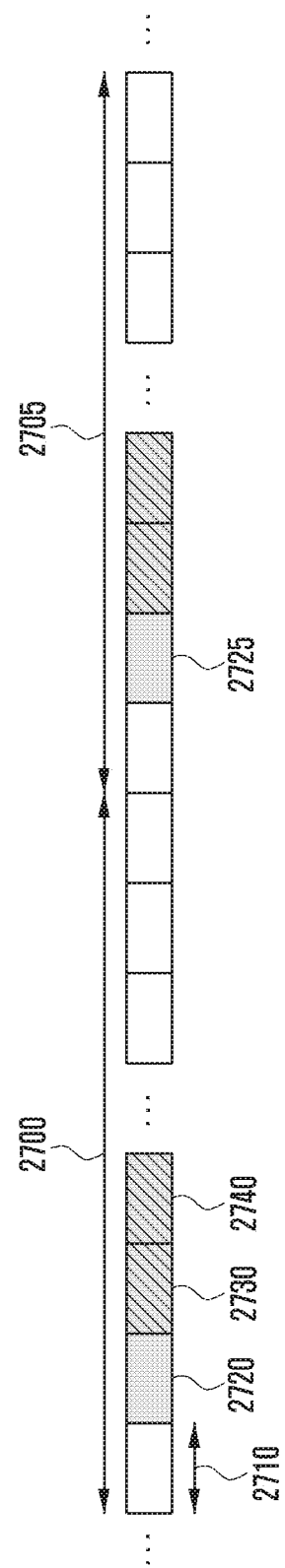
FIG. 27 is a diagram illustrating an example of a 3-1-th according to an embodiment of the disclosure.

FIG. 27 is a diagram illustrating an example of a 3-1-th according to an embodiment of the disclosure.

In FIG. 27, the HARQ process ID for the uplink transmission depending on the time or the slot may be determined using at least one of the following Equations based on the number (N=2) of uplink transmission slots 2730 and 20740 in which the uplink signal transmission according to the second uplink signaling scheme is set in the interval M 2700, and the index of the uplink transmission slot in which the second uplink signal transmission is set in the interval M 2700, (index n=0 in slot 2730) (index n=1 in slot 2740) and the total number (K) of uplink HARQ process IDs. At this time, the interval M is assumed to be the number of slots included in one radio frame. In addition, in FIG. 27, the slots 2720 and 2725 are uplink transmission slots configured to transmit the uplink signal according to the first uplink signaling scheme.

$$\text{HARQ ProcessID} = (\text{SFN} * N + n) \text{modulo}(K) \quad \text{Equation 8}$$

At this time, K may be defined in advance for the first uplink transmission scheme or may be configured in the terminal through a higher signal or a group common control channel from the base station. Alternatively, K may be defined in advance for the first uplink transmission scheme or may be a value configured in the terminal through a higher signal or a group common control channel from the base station. In addition, the K may be different according to a multiplexing scheme (e.g., FDD or TDD) of a cell in which the uplink transmission is performed.

If the second uplink signal transmission is set to be iteratively transmitted in one or more slots, for example, if the slot 2740 is a slot set to iteratively transmit the uplink transmission signal transmitted in the slot 2730 according to the second uplink transmission scheme, the HARQ process ID for the slot 2730 and the slot 2740 should be the same. Therefore, when the second uplink signal transmission is set to be iteratively transmitted in one or more slots as described above, the HARQ process ID for the uplink transmission according to time or slot may be determined using a part of the information on the slot that is set to enable the initial transmission during the second uplink signal transmission as in Equations 9 and 10 or only the information on the slot that is set to enable the initial transmission during the transmission of the second uplink signal.

$$\text{HARQ ProcessID}=(SFN*N+n')\text{modulo}(K) \quad \text{Equation 9}$$

$$\text{HARQ ProcessID}=(SFN*N'+n')\text{modulo}(K) \quad \text{Equation 10}$$

Here, N' represents the number of slots that are set to enable initial transmission during the transmission of the second uplink signal in the interval, and n' represents an index of a slot set to enable initial transmission during the transmission of the second uplink signal in the interval. In this case, when determining the HARQ process ID for the uplink transmission according to time or slot in the same manner as Equation 10, only a specific HARQ process ID may be iteratively used for the uplink transmission according to the second uplink transmission scheme. Therefore, Equation (9) or Equation (10) can be used depending on the set value of at least one parameter of the N, N', n, n', and K values.

If the uplink transmission slot configured for the uplink transmission according to the second uplink transmission scheme is periodically set according to a specific period, the base station and the terminal may set the HARQ process by Equation having as a factor at least one of the system frame number (SFN), an uplink transmission slot period (T) in which the uplink signal transmission according to the second uplink transmission scheme is configured, an index n (n has a value ranging from 0 to T−1) in an uplink transmission slot in which the uplink signal transmission according to the second uplink transmission scheme is configured in the period T, and a total number K of uplink HARQ process IDs. At this time, the uplink transmission slot in which the uplink signal transmission according to the second uplink transmission scheme is configured is set in the terminal in a bit map type in which the uplink transmission slot in which the uplink signal transmission according to the second uplink transmission scheme is configured within the period T is expressed, or may be set in the terminal using the period T, a slot position or an offset value at which the uplink transmission slot in which the uplink transmission according to the second uplink transmission scheme is configured is started in the period T, and the length or the number of the uplink transmission slot in which the uplink signal transmission according to the second uplink transmission scheme is configured, or the like.

In this case, if the uplink transmission slot in which the uplink signal transmission according to the second uplink transmission scheme is periodically set according to a specific period, the HARQ process ID for the uplink transmission according to time or slot may be determined based on the following Equation 11.

$$\text{HARQ ProcessID}=(\text{floor}(CURRENT\_TTI/T)+n')\text{modulo}(K) \quad \text{Equation 11}$$

Here, CURRENT_TTI refers to a time or slot for performing the initial transmission according to the second uplink transmission scheme, and it can be calculated as CURRENT_TTI=(SFN*M+index of slot for performing the initial transmission according to the second uplink transmission scheme). In this case, M is the total number of slots configuring the radio frame.

If the uplink transmission slot in which the uplink transmission according to the second uplink transmission scheme is configured is set in a bitmap form for a predetermined interval (for example, M2 slots) according to a specific period, the interval M2 is divided in 1 radio frame unit, and the second uplink transmission scheme, and a maximum value among the number of uplink transmission slots in which the uplink initial signal transmission according to the second uplink transmission scheme is configured. The maximum value of the set uplink transmission slot numbers may be determined as n in the Equation 8 and n' in the above Equations 9 and 10.

If the uplink transmission slot in which the uplink transmission according to the second uplink transmission scheme is configured is not defined in advance, the base station has not received the setting for the transmission slot from the base station, or the uplink transmission slot or the downlink transmission slot may be changed every slot as in the case of the dynamic TDD or the unlicensed band communication, the HARQ process ID may be defined in advance like a system frame number (SFN), a total number M of slots included in the 1 radio frame, or the like, or may be determined using the following Equation 12 having as a factor at least one of the slot index n" included in the 1 radio frame and the total number K of uplink HARQ process IDs, including the specific value set through the higher signal.

$$\text{HARQ ProcessID}=(SFN*M+n")\text{modulo}(K) \quad \text{Equation 12}$$

If the uplink transmission slot or the downlink transmission slot can be changed every slot as described above, the HARQ process ID for each slot is determined using the above Equation, and the predetermined HARQ process ID for the slot in which the uplink initial signal transmission according to the second uplink transmission scheme is performed can be determined as the HARQ process ID for the uplink initial signal transmission according to the second uplink transmission scheme.

The terminal can configure the uplink signal transmission resource according to one or more second uplink signaling scheme divided into time and/or frequency domain in one slot. For example, if the uplink signal transmission resource region according to the second uplink signaling scheme consists of one or more symbol in a slot, and one or more uplink signal transmission resource region according to the second uplink signal scheme consisting of the one or more symbols in one slot may be configured. One or more UL signal transmission resource regions may be set. Also, the terminal may be configured such that the uplink signal transmission resource according to the second uplink signal scheme is transmitted in a specific symbol or symbols (e.g., an even symbol in a slot) in one slot. Also, it is possible for the terminal to configure an uplink signal transmission resource according to the second uplink signaling scheme which is divided through different frequency resource regions in one slot. That is, the terminal can configure one or more uplink signal transmission resource according to the second uplink signaling scheme divided into time and/or frequency domain with respect to the specific time unit. In the case of the terminal having at least one of the configured uplink signal transmission resources according to a second uplink signaling scheme divided into time and/or frequency regions as described above, the HARQ process ID for uplink signaling according to the second uplink signaling scheme may be determined as follows.

Figure 28:
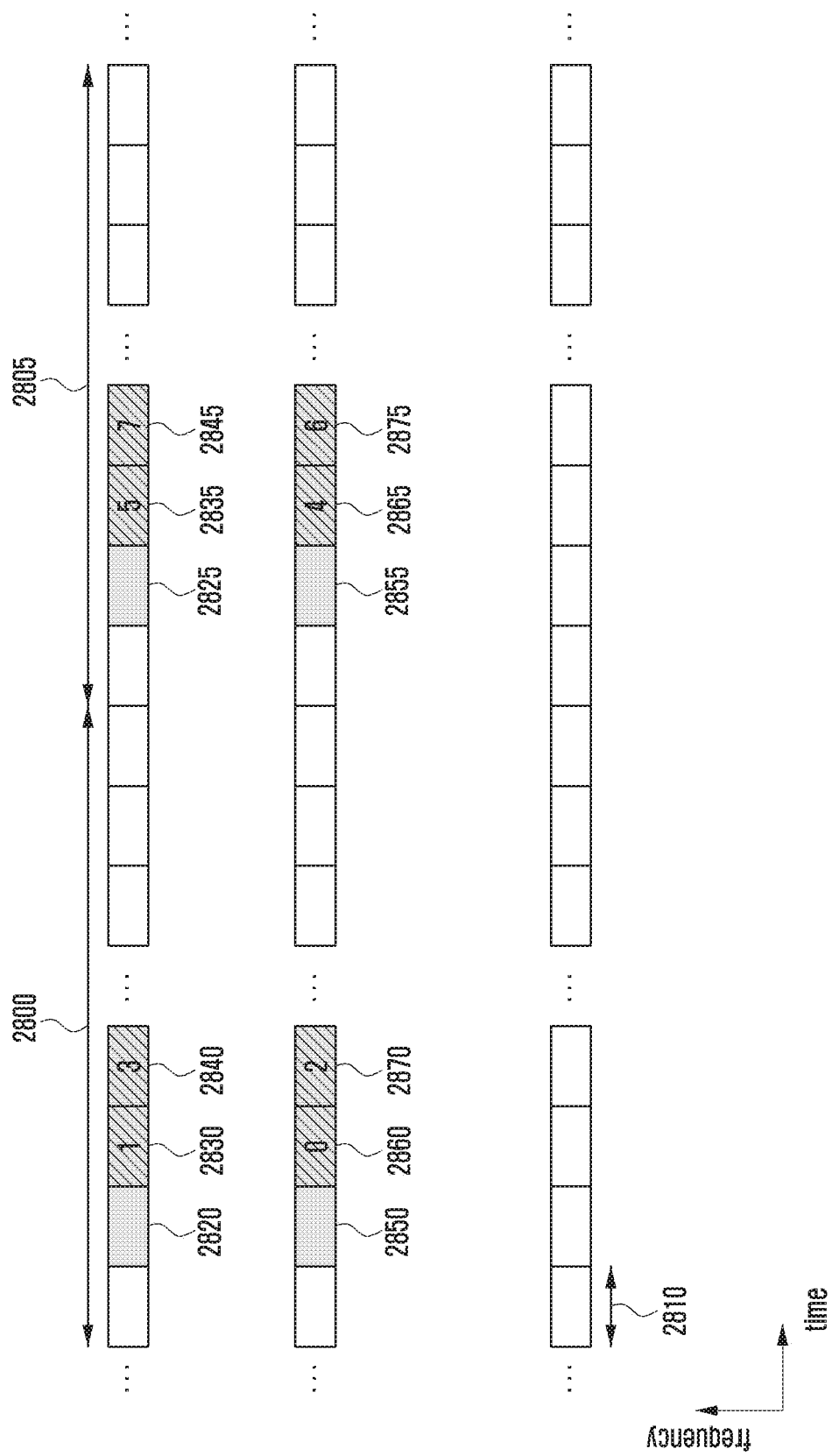
FIG. 28 is a diagram illustrating another example of the 3-1-th according to an embodiment of the disclosure.

FIG. 28 is a diagram illustrating another example of the 3-1-th according to an embodiment of the disclosure.

For the convenience of explanation, in FIG. 28, it is assumed that an interval 2800 refers to one slot or a subframe, and the interval 2800 consists of X OFDM symbols 2810. In addition, it is assumed that the unit of time resources for uplink signal transmission according to the second uplink signal transmission scheme is X' symbols, and the unit of frequency resource for uplink signal transmission according to the second uplink signal transmission scheme is Y PRBs. That is, the uplink signal transmission resource according to the second uplink signal transmission scheme consists of X' symbols and Y PRBs. At this time, the terminal may set at least one value of X' and Y values through the higher signal from the base station in order to configure an uplink signal transmission resource according to the second uplink signal transmission scheme. Among the X' and Y values, a value not set through the higher signal from the base station can be set by the terminal on the downlink control channel transmitted by the base station.

In FIG. 28, it is assumed that the terminal transmits uplink signal transmission resources 2830 and 2840 according to n (n=2) second uplink signal transmission schemes identified by a time base in the interval 2800 and receives the configuration of the uplink signal transmission resource depending on a total of n+I second uplink signal transmission schemes, including uplink signal transmission resources 2860 and 2870 according to I (I=2) second uplink signal transmission schemes identified based on a frequency base. In this case, the index i of the uplink transmission resource in which the uplink signal transmission according to the second uplink transmission scheme is set in the interval 2800 may be set based on a frequency-time resource value (or frequency first). For example, the index of the transmission resource can be determined in ascending order of the frequency resource value (the PRB or the PRB group index is small) in the order of decreasing value (slot or symbol number) of the time resource region. In the case of FIG. 3K, the transmission resource index may be determined as 0 (28760), 1 (2830), 2 (2870), 3 (2840). At this time, the transmission resource index can be set based on the time-frequency resource value as a time first. For example, the resource 2860 may be determined as a resource index 0, the resource 2870 may be determined as a resource index 1, the resource 2830 may be determined as a resource index 2, and the resource 2840 may be determined as a resource index 4. Since it is generally desirable to iteratively transmit data on the time base when considering the transmittable power of the terminal, FIG. 28 shows a case where the resource index is determined in order of frequency resources, that is, the transmission resource index is 0 (2860) (2830), 2 (2870), and 3 (2840). However, the method proposed by the disclosure is not limited thereto.

At this time, a method for determining an HARQ process ID (i) for uplink signal transmission transmitted through the uplink signal transmission resource (i) according to the configured second uplink signaling scheme will be described.

$$\text{HARQ ProcessID}(i)=(SFN*M+i)\text{modulo}(K),$$
$$i=0,1,\ldots,N+L-1, \quad \text{Equation 13}$$

In this case, M is the number of subframes or slots configuring one radio frame, and M may be different according to the frequency or the numerology (e.g., subcarrier spacing) of the cell performing the uplink transmission. At this time, K may be defined in advance for the second uplink transmission scheme or may be configured in the terminal through a higher signal or a group common control channel from the base station. Alternatively, K may be defined in advance for the first uplink transmission scheme or may be a value configured in the terminal through a higher signal or a group common control channel from the base station. In addition, the K may be different according to a multiplexing scheme (e.g., FDD or TDD) of a cell in which the uplink transmission is performed. In this case, N and L are values representing the total time and frequency resources of the uplink transmission resources transmitted according to the second uplink signal transmission scheme included in the reference time (e.g., 1 radio frame) for determining the HARQ process ID, and may represent the number N+L of the entire configured resources without identifying the number of time N and frequency N resources.

If the second uplink signal transmission is set to be iteratively transmitted in one or more slots, for example, if the transmission resource indexes 2 (2870) and 3 (2840) of FIG. 28 are set to perform the iterative transmission of the uplink transmission signal transmitted according to the second uplink transmission scheme in the transmission resource indexes 0 (2860) and 1 (2830), respectively, the HARQ process IDs for the resource indices 0 and 2, 3 and 1 should be the same, respectively. At this time, performing the iterative transmission on different time bases is only one example, and therefore, the iterative transmission may be performed based on the frequency base or the iterative transmission can be made using both of the time and frequency. When the second uplink signal transmission is set to be iteratively transmitted in one or more uplink transmission resource as described above, the HARQ process ID for the uplink transmission according to time or slot may be determined using a part of the information on the resource that is set to enable the initial transmission during the second uplink signal transmission as in Equation 14 or only the information on the resource that is set to enable the initial transmission during the transmission of the second uplink signal.

$$\text{HARQ ProcessID}(i)=(SFN*M+i')\text{modulo}(K) \quad \text{Equation 14}$$

Here, N' and L' represent the time and the number of frequency resources that are set to enable initial transmission during the transmission of the second uplink signal in the interval, and i' represents an index of a slot set to enable initial transmission during the transmission of the second uplink signal in the interval.

If the uplink transmission or resource in which the uplink transmission according to the second uplink transmission scheme is set is periodically set, the base station and the terminal may set the HARQ process by Equation having as a factor at least one of the system frame number (SFN), an uplink transmission period (T) in which the uplink signal transmission according to the second uplink transmission scheme is configured, an index n in an uplink transmission resource in which the uplink signal transmission according to the second uplink transmission scheme is configured in the period T, and a total number K of uplink HARQ process IDs.

At this time, the uplink transmission slot in which the uplink signal transmission according to the second uplink transmission scheme is configured is set in the terminal in a bit map type in which the uplink transmission slot in which the uplink signal transmission according to the second uplink transmission scheme is configured within the period T is expressed, or may be set in the terminal using the period T, a slot position or an offset value at which the uplink transmission slot in which the uplink transmission according to the second uplink transmission scheme is configured is started in the period T, and the length or the number of the uplink transmission slot in which the uplink signal transmission according to the second uplink transmission scheme is configured, or the like.

In this case, if the uplink transmission slot in which the uplink signal transmission according to the second uplink transmission scheme is periodically set according to a specific period, the HARQ process ID for the uplink transmission according to time or slot may be determined based on the following Equation 15.

$$\text{HARQ ProcessID}(i) = (\text{floor}(\text{CURRENT\_TTI}/T) * (N'*L') + i) \text{modulo}(K) \quad \text{Equation 15}$$

Here, CURRENT_TTI refers to a time or slot for performing the initial transmission according to the second uplink transmission scheme, and it can be calculated as CURRENT_TTI=(SFN*M+value of slot or slot number for performing the initial transmission according to the second uplink transmission scheme). In this case, M is the total number of slots configuring the radio frame. Here, N' and L' represent the time and the number of frequency resources that are set to enable initial transmission during the transmission of the second uplink signal in the interval, and i' represents an index of a slot set to enable initial transmission during the transmission of the second uplink signal in the interval.

If the uplink transmission slot in which the uplink transmission according to the second uplink transmission scheme is configured is set in a bitmap form for a predetermined interval (for example, M2 slots) according to a specific period, the interval M2 is identified in a specific unit (for example, 1 radio frame), and the second uplink transmission scheme, and a maximum value among the number of uplink transmission resources in which the uplink initial signal transmission according to the second uplink transmission scheme is configured. The maximum value of the set uplink transmission resources may be determined as the Equation N' and L'.

If the uplink transmission slot in which the uplink transmission according to the second uplink transmission scheme is configured is not defined in advance, the base station has not received the setting for the transmission slot from the base station, or the uplink transmission slot or time or the downlink transmission slot or time may be changed every slot as in the case of the dynamic TDD or the unlicensed band communication, the HARQ process ID may be defined in advance like a system frame number (SFN), a total number of slots or the number M of subframes included in the 1 radio frame, the number of uplink transmission resources according to the second uplink transmission scheme included in the slot or the like or may be set as a specific value based on the higher signal, determined using the following Equation 16 having as a factor at least one of the resource index i included in the 1 radio frame and the total number K of uplink HARQ process IDs.

$$\text{HARQ ProcessID}(i) = (\text{SFN}*M*N*L+i) \text{modulo}(K),$$
and $$\text{HARQ ProcessID}(i) = (\text{SFN}*M*N'*L'+i') \text{modulo}(K) \quad \text{Equation 16}$$

Here, N' and L' represent the time and the number of frequency resources that are set to enable initial transmission during the transmission of the second uplink signal in the interval, and i' represents an index of a slot set to enable initial transmission during the transmission of the second uplink signal in the interval. If the uplink transmission slot or the downlink transmission slot can be changed every slot as described above, the HARQ process ID for the uplink transmission resource according to the second uplink transmission scheme for each slot or within the slot is determined using the above Equation or the like, and the predetermined HARQ process ID for the resource in which the uplink initial signal transmission according to the second uplink transmission scheme is performed can be determined as the HARQ process ID for the uplink initial signal transmission according to the second uplink transmission scheme.

In this embodiment, it is assumed that the HARQ process ID for the uplink signal transmission according to the second uplink transmission scheme is determined. However, this embodiment can be applied to the case in which the HARQ process ID for the uplink transmission may be determined without identifying the first uplink transmission scheme or the second uplink transmission scheme. In this case, the HARQ process ID for the uplink transmission is determined without identifying the first uplink transmission scheme or the second uplink transmission scheme as described above, and the HARQ process ID for the uplink initial signal transmission according to the second uplink transmission scheme may be determined based on the predetermined HARQ process ID.

In this embodiment, the terminal determines the HARQ process ID for the uplink signal transmitted according to the second uplink transmission scheme. If the uplink transmission configuration information or the uplink transmission configuration DCI format for the uplink transmission configuration is received from the base station, the uplink transmission configuration determined based on the received uplink transmission configuration information is for the uplink signal transmission transmitted according to the second uplink transmission scheme, for example, when the HARQ process ID included in the received uplink transmission configuration information or the DCI format for the uplink transmission configuration information is the same as the HARQ process ID for the uplink signal transmitted according to the second uplink transmission scheme determined by the terminal according to the present embodiment, and it is determined whether the initial transmission or retransmission identifier, e.g., new data indicator (NDI) information set (for example, setting the NDI value to be 1) the retransmission for the HARQ process ID. In this case, the terminal may determine that the received uplink transmission configuration information is determined as the retransmission for the uplink signal transmitted according to the second uplink transmission scheme, and the terminal may retransmit the uplink signal according to the received uplink transmission configuration.

If the HARQ process ID included in the received uplink transmission configuration information or the DCI format for uplink transmission configuration is the same as the HARQ process ID for the uplink signal transmitted according to the second uplink transmission scheme determined by the terminal according to the present embodiment and the initial transmission or retransmission identifier, for example, it is determined that the new data indicator (NDI) information configures the initial transmission for the HARQ process ID (e.g., when the NDI value is set to be 0), the terminal determines that the base station correctly receives the uplink signal transmitted according to the second uplink transmission scheme through the received uplink transmission configuration information and delete the uplink signal transmitted according to the second uplink transmission scheme from a buffer, an HARQ soft buffer or the like. If the terminal has a signal to be transmitted to the base station through the uplink, the terminal can transmit the uplink signal according to the received uplink transmission configuration information. If the terminal does not have a signal to be transmitted to the base station through the uplink, the terminal cannot transmit the uplink signal according to the received uplink transmission configuration information.

At this time, the terminal configured to perform the uplink transmission through the second uplink transmission scheme includes an identifier (for example, 1 bit identifier or identifying the uplink transmission scheme based on a flag) for identifying whether the initial signal transmission according to the first uplink transmission scheme is configured in the DCI format for the uplink transmission configuration information or the uplink transmission configuration, the retransmission or the iterative transmission is configured according to the first uplink transmission scheme for the uplink transmission previously transmitted according to the second uplink transmission scheme, or may identify whether the terminal configures the initial signal transmission according to the first uplink transmission scheme, including the HARQ process IDs for the first uplink transmission scheme and the second uplink transmission scheme or whether the retransmission or the iterative transmission is configured according to the first uplink transmission scheme for the uplink transmission scheme previously transmitted according to the second uplink transmission scheme or the like. For example, when the HARQ process IDs (K) of the first uplink transmission scheme and the second uplink transmission scheme each are set 8, it is possible to identify the first uplink transmission scheme and the second uplink transmission scheme through a 4-bit HARE process ID. In the case of the UE not configured to perform the uplink transmission through the second uplink transmission scheme, only HARQ process ID information on the first uplink transmission scheme through the 3-bit HARQ process ID may be included in the uplink transmission configuration information or the DCI format for the uplink transmission configuration.

In addition, all or some of the parameters considered in determining the HARQ process ID in the time or slot proposed in the disclosure can be set from the base station through the higher signal. For example, the terminal may set the parameters to be considered in determining the HARQ process ID among the values of K, N, N', n', and n" and the like from the base station through the higher signal, and the SFN, M or the line may determine the HARQ process ID by applying the predefined or predetermined value.

3-2-th Embodiment

The present embodiment suggests a method for identifying, by one or more configuration information of uplink transmission configuration information received by a terminal from a base station on a downlink control channel and transmission configuration information included in a DCI format for uplink transmission configuration, whether the received uplink transmission configuration or the DCI format for the uplink transmission configuration is configuration for initial uplink signal transmission according to a first uplink transmission scheme, or retransmission or iterative transmission configuration according to the first uplink transmission scheme for uplink transmission previously performed according to a second uplink transmission scheme.

Method 1: By setting one or more of uplink HARQ process IDs for the second uplink transmission scheme, whether it is configuration for initial uplink signal transmission according to the first uplink transmission scheme, or retransmission or iterative transmission configuration according to the first uplink transmission scheme for uplink transmission previously performed according to the second uplink transmission scheme may be identified by the configured HARQ process ID.

Method 2: By setting one or more of DMRS-related variables set for the second uplink transmission for the second uplink transmission scheme, whether it is configuration for initial uplink signal transmission according to the first uplink transmission scheme, or retransmission or iterative transmission configuration according to the first uplink transmission scheme for uplink transmission previously performed according to the second uplink transmission scheme may be identified by the set DMRS-related variable.

Method 3: By defining a time at which uplink transmission configuration information for configuring retransmission according to the first uplink transmission scheme for second uplink transmission is transferred, whether it is configuration for initial uplink signal transmission according to the first uplink transmission scheme, or retransmission or iterative transmission configuration according to the first uplink transmission scheme for uplink transmission previously performed according to the second uplink transmission scheme may be identified by the time.

Method 4: By distinguishing a time-frequency resource region or a PDCCH search space in which uplink transmission configuration information for configuring retransmission according to the first uplink transmission scheme for second uplink transmission is transferred, whether it is configuration for initial uplink signal transmission according to the first uplink transmission scheme, or retransmission or iterative transmission configuration according to the first uplink transmission scheme for uplink transmission previously performed according to the second uplink transmission scheme may be identified by the region.

The Method 1 will be described in more detail as follows. In the case of a terminal configured to perform uplink transmission according to the second uplink transmission scheme, one or more of the uplink HARQ process IDs are defined for the second uplink transmission scheme in advance, or a configuration of one (e.g., HARQ process ID 0) or more of the uplink HARQ process IDs as a HARQ process ID used in the second uplink transmission scheme may be received from the base station through a higher layer signal. At this time, when the terminal receives the uplink transmission configuration information or the DCI format for uplink transmission configuration from the base station on the downlink control channel, and the uplink transmission configuration determined by the received uplink transmission configuration information is for the uplink signal transmission performed according to the second uplink transmission scheme (for example, when a HARQ process ID included in the received uplink transmission configuration information or DCI format for uplink transmission configuration is the same as a HARQ process ID for an uplink signal transmitted according to the second uplink transmission scheme determined by the terminal according to the Method 1, and an initial transmission or retransmission identifier, for example, new data indicator (NDI) information is identified as configuring retransmission for the HARQ process ID (for example, an NDI value is set to be 1), the terminal may determine that the received uplink transmission configuration information is for retransmission for the uplink signal transmitted according to the second uplink transmission scheme, and retransmit the uplink signal according to the received uplink transmission configuration.

When a HARQ process ID included in the received uplink transmission configuration information or DCI format for uplink transmission configuration is the same as a HARQ process ID for an uplink signal transmitted according to the second uplink transmission scheme determined by the terminal according to the Method 1, and an initial transmission or retransmission identifier, for example, NDI information is identified as configuring initial transmission for the HARQ process ID (for example, an NDI value is set to be 0), the terminal may determine that the base station properly received the uplink signal transmitted according to the second uplink transmission scheme through the received uplink transmission configuration information, and remove the uplink signal transmitted according to the second uplink transmission scheme from a buffer, a HARQ soft buffer, or the like. When there is a signal to be transmitted to the base station through uplink in the terminal, the terminal may also transmit an uplink signal according to the received uplink transmission configuration information. When there is no signal to be transmitted to the base station through uplink in the terminal, the terminal may not transmit an uplink signal according to the received uplink transmission configuration information.

The Method 2 will be described in more detail as follows. In the case of a terminal configured to perform uplink transmission according to the second uplink transmission scheme, information that the base station may use for detecting or identifying the terminal in uplink signal transmission according to the second uplink transmission scheme, for example, an uplink DMRS sequence, a cyclic shift value of an uplink DMRS, a preamble index, or the like may be defined in advance for the second uplink transmission scheme, or the terminal may be distinguished using at least one value of an identifier (e.g., C-RNTI) of the terminal or a slot index according to a method defined in advance for the second uplink transmission scheme. Alternatively, the base station may configure one of the uplink DMRS sequence and the cyclic shift value of the uplink DMRS or one or more variables or candidate values to be used in the second uplink transmission scheme through a higher layer signal. At this time, the DMRS sequence and the cyclic shift value of the uplink DMRS are merely an example, and other variables that the base station may use to detect or identify signal transmission of the terminal, for example, other variables that may be included in the uplink transmission configuration information such as a preamble index, and the like may be used for determination.

At this time, when the terminal receives the uplink transmission configuration information or the DCI format for uplink transmission configuration from the base station on the downlink control channel, and determines whether the uplink transmission configuration determined by the received uplink transmission configuration information is for the uplink signal transmission performed according to the second uplink transmission scheme, for example, determines whether one or more values of a DMRS sequence and a cyclic shift value of an uplink DMRS configured to be used in the second uplink transmission scheme determined by the terminal according to the Method 2 are included in the received uplink transmission configuration information and DCI format for uplink transmission configuration, and whether an initial transmission or retransmission identifier, for example, NDI information configures retransmission for the uplink signal transmitted according to the second uplink transmission scheme (for example, an NDI value is set to be 1). In this case, the terminal may determine that the received uplink transmission configuration information is retransmission for the uplink signal transmitted according to the second uplink transmission scheme, and the terminal may retransmit the uplink signal according to the received uplink transmission configuration.

When one or more values of the DMRS sequence and the cyclic shift value of the uplink DMRS included in the received uplink transmission configuration information or DCI format for uplink transmission configuration are the same as a setting value for an uplink signal transmitted according to the second uplink transmission scheme determined by the terminal according to the Method 2, and an initial transmission or retransmission identifier, for example, NDI information is identified as configuring initial transmission (for example, an NDI value is set to be 0), the terminal may determine that the base station properly received the uplink signal transmitted according to the second uplink transmission scheme through the received uplink transmission configuration information, and remove the uplink signal transmitted according to the second uplink transmission scheme from a buffer, a HARQ soft buffer, or the like.

At this time, when one or more values of the DMRS sequence and the cyclic shift value of the uplink DMRS included in the received uplink transmission configuration information or DCI format for uplink transmission configuration are different from the setting value for an uplink signal transmitted according to the second uplink transmission scheme determined by the terminal according to the Method 2, it may be determined that initial signal transmission using the first uplink transmission scheme for an HARQ process ID included in the uplink transmission configuration information or retransmission for the initial signal transmission using the first uplink transmission scheme for an HARQ process ID is performed, by the NDI value. When there is a signal to be transmitted to the base station through uplink in the terminal, the terminal may also transmit an uplink signal according to the received uplink transmission configuration information. When there is no signal to be transmitted to the base station through uplink in the terminal, the terminal may not transmit an uplink signal according to the received uplink transmission configuration information.

The Method 3 will be described in more detail as follows. In the case of a terminal configured to perform uplink transmission according to the second uplink transmission scheme, the terminal may receive, from the base station through a higher layer signal, a setting of one or more times X at which uplink transmission configuration information for configuring retransmission according to the first uplink transmission scheme for second uplink transmission defined in advance is transferred, or one or more times X at which uplink transmission configuration information for configuring retransmission according to the first uplink transmission scheme for second uplink transmission is transferred. For example, when the terminal performing uplink transmission according to the second uplink transmission scheme in a slot i receives uplink transmission configuration information or a DCI format for uplink transmission configuration on a downlink control channel from the base station in a slot i+X, the terminal may determine that the received uplink transmission configuration is configuration for uplink transmission performed according to the second uplink transmission scheme in the slot i.

When an initial transmission or retransmission identifier, for example, an NDI value is set to be 1 in the uplink transmission configuration information received in the slot i+X, the terminal determines that the base station did not properly receive the uplink signal transmitted according to the second uplink transmission scheme in the slot i and configured retransmission for the transmission, and may perform retransmission for the uplink signal according to the first uplink transmission scheme according to the received uplink transmission configuration. When the NDI information is set to be 0, the terminal determines that the base station properly received the uplink signal transmitted according to the second uplink transmission scheme through the received uplink transmission configuration information, and the terminal may remove the uplink signal transmitted according to the second uplink transmission scheme from a buffer, a HARQ soft buffer, or the like.

At this time, when the terminal receives the received uplink transmission configuration information or DCI format for uplink transmission configuration in a slot other than the slot i+X, the terminal may determine that initial signal transmission using the first uplink transmission scheme for a HARQ process ID included in the uplink transmission configuration information or retransmission for initial signal transmission using the first uplink transmission scheme for a HARQ process ID is configured, by the NDI value included in the received uplink configuration information. When there is a signal to be transmitted to the base station through uplink in the terminal, the terminal may also transmit an uplink signal according to the received uplink transmission configuration information. When there is no signal to be transmitted to the base station through uplink in the terminal, the terminal may not transmit an uplink signal according to the received uplink transmission configuration information.

The Method 4 will be described in more detail as follows. In the case of a terminal configured to perform uplink transmission according to the second uplink transmission scheme, the terminal may receive, from the base station through a higher layer signal, a setting of one or more time-frequency resource regions or PDCCH search spaces in which uplink transmission configuration information for configuring retransmission according to the first uplink transmission scheme for second uplink transmission is transferred, and/or a time-frequency resource region in which first uplink transmission is performed and a time-frequency resource region in which second uplink transmission is performed that are distinguished from each other. In other words, when the terminal receives the uplink transmission configuration information in a region set so that first uplink transmission configuration information is received therein in a control information detection space, the terminal may determine the uplink transmission configuration information as uplink transmission configuration for configuring retransmission for previously performed first uplink transmission or uplink transmission configuration for configuring initial transmission for the first uplink transmission. When the terminal receives the uplink transmission configuration information in a region set so that second uplink transmission configuration information is received therein in the control information detection space, the terminal may determine the uplink transmission configuration information as uplink transmission configuration for configuring retransmission for previously performed sc uplink transmission.

3-3-th Embodiment

The present embodiment suggests a method for determining, by a terminal, a waveform of an uplink transmission signal from the base station. Specifically, the present embodiment suggests a method for determining, by a terminal supporting a plurality of uplink transmission signal waveforms, a waveform of an uplink transmission signal in the case in which a waveform of an uplink transmission signal is set to be different according to an uplink transmission scheme.

In a next generation mobile communication system such as 5G or NR system, the terminal may use one or a plurality of uplink transmission signal waveforms in uplink transmission. For example, a terminal using a plurality of uplink transmission signal waveforms may use a cyclic prefix orthogonal frequency division multiplexing (CP-OFDM) scheme for a first uplink signal waveform and use a discrete Fourier transform-spread-OFDM (DFT-s-OFDM) scheme for a second uplink signal waveform. At this time, a waveform used in the uplink signal transmission of the terminal may vary according to an uplink transmission channel or signal, and the terminal may determine a waveform of an uplink transmission signal according to the following method.

The waveform of the uplink transmission may be defined between the base station and the terminal in advance or may be set by the base station through a higher layer signal (e.g., RRC). At this time, the terminal may receive an indication for a waveform for uplink signal transmission on a broadcast channel like a PBCH, a PDCCH scrambled with an RNTI used to transmit system information like SI-RNTI and a PDSCH therefor (that is, remaining system information (RMSI)) or receive an indication for or a setting of a waveform for uplink signal transmission through a waveform indicator (e.g., 1 bit) for the uplink signal transmission included in uplink transmission configuration information (or uplink grant) or uplink scheduling information received from the base station on a downlink control channel.

According to another method, the terminal may determine a waveform for uplink signal transmission performed according to uplink configuration information by a region (CORESET or search space) in which uplink transmission configuration information (or uplink grant) or uplink scheduling information received from the base station on a downlink control channel is transmitted. For example, a terminal receiving uplink transmission configuration information (or uplink grant) or uplink scheduling information in a first CORESET or first search space (e.g., common search space) may transmit an uplink signal according to the configuration information using an uplink transmission waveform X (e.g., second uplink transmission waveform), and a terminal receiving uplink transmission configuration information (or uplink grant) or uplink scheduling information in a second CORESET or second search space (e.g., UE-specific search space) may transmit an uplink signal according to the configuration information using an uplink transmission waveform Y (e.g., first uplink transmission waveform).

According to another method, the terminal may determine a waveform for uplink signal transmission performed according to uplink transmission configuration information by a DCI format in which the uplink transmission configuration information (or uplink grant) or uplink scheduling information received from the base station on a downlink control channel is transmitted. For example, a terminal receiving uplink transmission configuration information (or uplink grant) or uplink scheduling information through a DCI format meaning fallback transmission may transmit an uplink signal according to the configuration information using an uplink transmission waveform X (e.g., second uplink transmission waveform), and a terminal receiving uplink transmission configuration information (or uplink grant) or uplink scheduling information through a DCI format different from the DCI format meaning fallback transmission may transmit an uplink signal according to the configuration information using an uplink transmission waveform Y (e.g., first uplink transmission waveform).

Meanwhile, an uplink transmission signal waveform of the terminal performing an initial access procedure and an uplink transmission signal waveform of the terminal after RRC connection may be different from each other. Further, even in the case of the terminal supporting a plurality of uplink transmission signal waveforms, the uplink transmission waveform X and the uplink transmission waveform Y may be the same according to the configuration by the base station. Further, each of uplink transmission waveforms corresponding to the uplink transmission waveforms X and Y may be defined between the base station and the terminal in advance or may be set through a higher layer signal or RMSI.

According to another embodiment, the terminal may receive an indication for an uplink transmission waveform through common terminal control information (or a DCI transmitted on a downlink control channel scrambled with a first RNTI (e.g., group RNTI), an RNTI determined on a PBCH, or an RNTI defined in advance) transmitted by the base station to all or a specific group of terminals. At this time, the terminal determines that the uplink transmission waveform indicated through the common terminal control information is applied within a period in which the common terminal control information is received and may use the uplink transmission waveform indicated through the common terminal control information for uplink signal transmission within the determined time or slot. At this time, the common terminal control information may include information on a time or slot in which the uplink transmission waveform information indicated through the common terminal control information is applied, and in this case, the terminal may use the uplink transmission waveform indicated through the common terminal control information for the uplink signal transmission in the time or slot indicated or determined through the common terminal control information.

In the case of a terminal supporting a plurality of uplink transmission signal waveforms (e.g., first uplink transmission waveform and second uplink transmission waveform) and a plurality of uplink transmission schemes (e.g., first uplink transmission scheme and second uplink transmission scheme), when the terminal receives a configuration for both of the first and second uplink transmission schemes from the base station through a higher layer signal, and when the base station activates the second uplink transmission scheme for the terminal, the terminal determines a waveform of an uplink transmission signal according to the uplink transmission scheme configured through the method for setting or determining the uplink transmission signal waveform described above.

When a terminal is configured as or receives an indication that an uplink transmission signal waveform is different according to the uplink transmission scheme or determines that the uplink transmission signal waveform is different according to the uplink transmission scheme. That is, when the terminal receives a configuration or an indication that the first uplink transmission scheme uses the first uplink transmission waveform and the second uplink transmission scheme uses the second uplink transmission waveform or determines that the first uplink transmission scheme uses the first uplink transmission waveform and the second uplink transmission scheme uses the second uplink transmission waveform, the terminal may perform, according to the first uplink transmission scheme, retransmission for an uplink signal transmitted according to the second uplink transmission scheme. In this case, a method for correctly determining, by the terminal, a waveform of the uplink transmission signal is required, and the terminal may determine a waveform of the retransmission signal by the following suggested method.

Method 1: The terminal may transmit a retransmission signal using an uplink transmission waveform set, or indicated by the uplink transmission scheme, or determined by the terminal according to the uplink transmission scheme.

Method 2: The terminal may transmit a retransmission signal using an uplink transmission waveform used for initial transmission or previous transmission.

The Method 1 will be described in more detail as follows.

As described above, when a terminal supporting a plurality of uplink transmission signal waveforms and a plurality of uplink transmission schemes receives a configuration for both of the first and second uplink transmission schemes from the base station through a higher layer signal, or the second uplink transmission scheme is activated, the terminal determine that the uplink transmission signal waveform is different according to the uplink transmission scheme or the uplink transmission signal waveform is differently configured or indicated according to the uplink transmission scheme. That is, the terminal may receive a configuration or an indication that the first uplink transmission scheme uses the first uplink transmission waveform and the second uplink transmission scheme uses the second uplink transmission waveform or determine that the first uplink transmission scheme uses the first uplink transmission waveform and the second uplink transmission scheme uses the second uplink transmission waveform.

At this time, when the terminal performs, according to the first uplink transmission scheme, retransmission for an uplink signal transmitted according to the second uplink transmission scheme, the terminal performs the retransmission using a waveform of the uplink transmission signal configuration for the uplink transmission scheme according to which the retransmission for the signal is performed. In other words, in the case of a terminal receiving a configuration or an indication so that retransmission for an uplink signal transmitted according to the second uplink transmission scheme is performed by using the second uplink transmission waveform according to the first uplink transmission scheme, the terminal may perform the set or indicated retransmission using an uplink transmission waveform configured for the first uplink transmission scheme or an uplink transmission waveform determined or indicated in uplink scheduling information (or uplink grant) for configuring retransmission.

The Method 1 is more suitable for a case in which the base station may dynamically change the uplink transmission waveform of the terminal, for example, as in the above-described methods, a case in which the uplink transmission waveform may be determined through an uplink transmission waveform indicator included in uplink grant, or other fields (e.g., MCS) included in uplink grant, or a case in which the uplink transmission waveform is indicated or determined according to CORESET or a search space in which the uplink grant is transmitted, or a DCI format (whether it is fallback transmission), or a case in which the uplink transmission waveform is indicated through the common terminal control information. Further, the Method 1 is also applicable to a case in which the base station sets the uplink transmission waveform of the terminal through a higher layer signal. In addition, the Method 1 is also applicable even when performing retransmission according to the same uplink transmission scheme.

The Method 2 will be described in more detail as follows.

Similar to the Method 1, a terminal receiving a configuration or an indication so that retransmission for an uplink signal transmitted according to the second uplink transmission scheme is performed by using the second uplink transmission waveform according to the first uplink transmission scheme, may perform the retransmission using an uplink transmission waveform used for initial transmission (or previous transmission) for the configured or indicated retransmission. In other words, in the case of a terminal receiving a configuration or an indication that the first uplink transmission scheme uses the first uplink transmission waveform and the second uplink transmission scheme uses the second uplink transmission waveform or determining that the first uplink transmission scheme uses the first uplink transmission waveform and the second uplink transmission scheme uses the second uplink transmission waveform, when receiving a configuration or an indication so that retransmission for an uplink signal transmitted according to the second uplink transmission scheme is performed by using the second uplink transmission waveform according to the first uplink transmission scheme, the terminal performs the configured or indicated retransmission according to the first uplink transmission scheme using the second uplink transmission waveform, since the second uplink transmission waveform is used for initial transmission (or previous transmission) of the configured or indicated retransmission.

The Method 2 is more suitable for a case in which the base station sets the uplink transmission waveform of the terminal through a higher layer signal. According to the Method 2, the terminal may use the same uplink transmission waveform between initial transmission (or previous transmission) and retransmission. At this time, the Method 2 is also applicable to a case in which the base station may dynamically change the uplink transmission waveform of the terminal, for example, as in the above-described methods, a case in which the uplink transmission waveform may be determined through an uplink transmission waveform indicator included in uplink grant, or other fields (e.g., MCS) included in uplink grant, or a case in which the uplink transmission waveform is indicated or determined according to CORESET or a search space in which the uplink grant is transmitted, or a DCI format (fallback), or a case in which the uplink transmission waveform is indicated through the common terminal control information. In addition, the Method 2 is also applicable even when performing retransmission according to the same uplink transmission scheme.

At this time, the terminal may also determine a waveform of the retransmission signal by using both of the Methods 1 and 2. For example, when the uplink transmission waveform of the terminal is set by the base station through a higher layer signal, the terminal uses an uplink transmission waveform used for initial transmission or previous transmission as in the Method 2, and when the uplink transmission waveform of the terminal is determined or indicated through uplink transmission configuration (uplink grant) or common terminal control information, the terminal may transmit the retransmission signal using the uplink transmission waveform indicated in the DCI or determined through the DCI.

Figure 29:
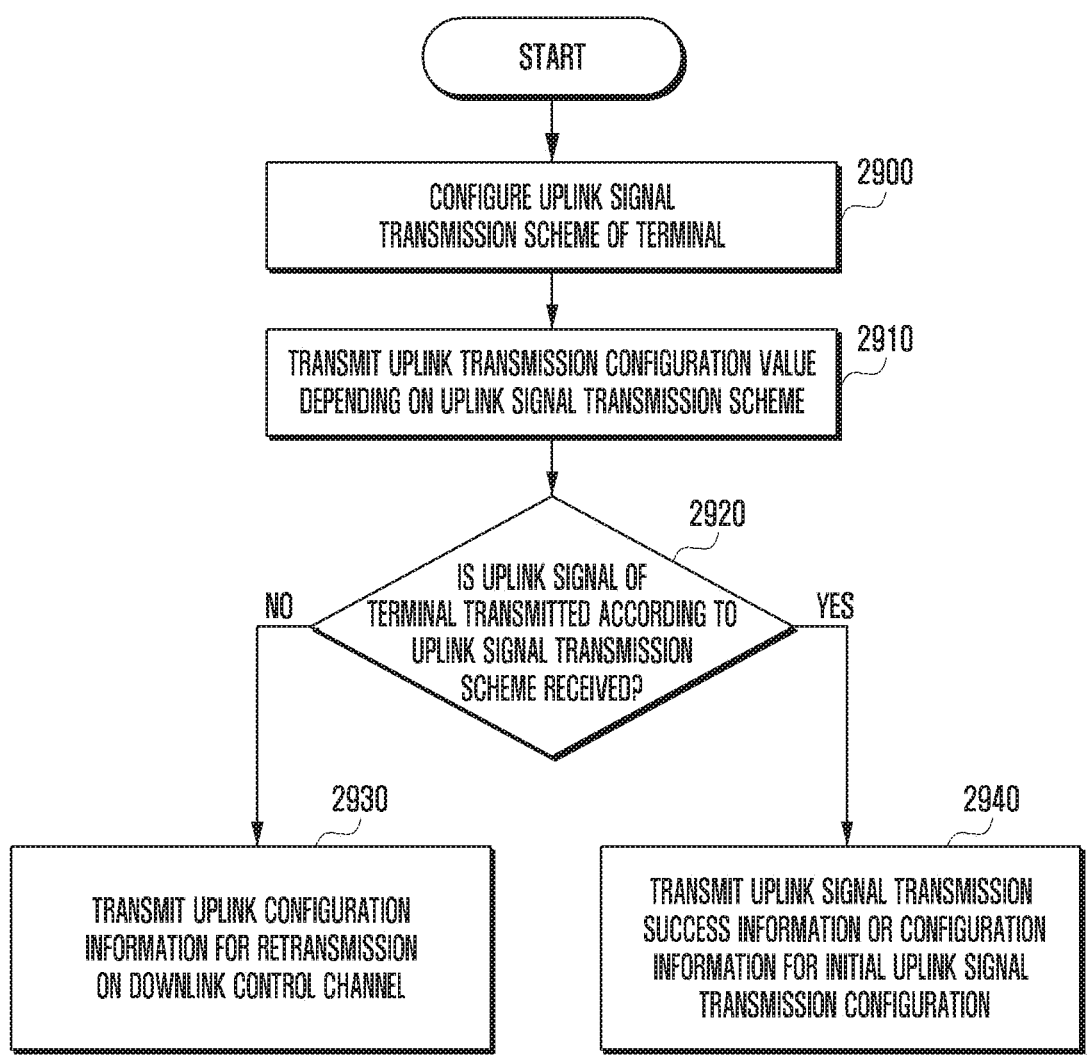
FIG. 29 is a diagram illustrating a retransmission configuring method for uplink signal transmission transmitted through a second uplink transmission scheme of the base station proposed according to an embodiment of the disclosure.

FIG. 29 is a diagram illustrating a method for configuring, by a base station, retransmission for uplink signal transmission performed according to the second uplink transmission scheme suggested in the disclosure.

In operation 2900, the base station may perform a setting to make the terminal to perform uplink signal transmission using one or more of uplink transmission schemes (for example, the first uplink transmission scheme, the second uplink transmission scheme, or the first and second uplink transmission schemes) used for uplink transmission to the base station or cell, through at least one method of a higher layer signal, a broadcast channel, and a downlink control channel.

In operation 2910, a variable required for uplink transmission may be additionally set according to the uplink transmission scheme set in operation 2900. For example, the base station may transfer or transfer a setting of a time resource region and a frequency resource region in which the configured second uplink transmission may be performed, DMRS-related information such as a DMRS sequence and a cyclic shift of a DMRS used for the uplink transmission, a HARQ process ID and/or HARQ process ID configuration method, an uplink control information detection resource for configuring retransmission for the second uplink transmission, or configuration information for at least one resource region of PDCCH search space information to the terminal in which the second uplink transmission scheme is configured, through at least one method of a higher layer signal, a broadcast channel, and a downlink control channel. At this time, operation 2910 may be included in operation 2900 and set for or transmitted to the terminal. That is, the information set in operation 2910 may be set or transmitted in operation 2900.

In operation 2910, in addition to the time and frequency resource regions, the terminal may receive a setting of some or all of variables required for uplink transmission configuration including MCS information that may be used for the second uplink transmission, a TTI length, a second uplink transmission start symbol in a slot, channel access procedure-related configuration information for the second uplink transmission in the case of transmission in an unlicensed band, the variable values, a candidate value that the terminal may select for the values, or the like. At this time, when the uplink transmission configuration is uplink transmission configuration for an unlicensed band, in operation 2910, the base station may differently set a variable for the uplink channel access procedure according to the uplink transmission scheme set in operation 2910.

In operation 2920, the base station may determine whether an uplink transmission signal of the terminal transmitted according to the uplink transmission scheme configured in operations 2900 and 2910 is received. When the base station determines in operation 2920 that the terminal performs uplink transmission according to the configured scheme, that is, the base station determines whether the uplink transmission of the terminal is received, the base station determines whether the received uplink transmission is properly received by decoding the received uplink transmission. When it is determined that the uplink transmission is properly received, the base station may not notify the terminal of the reception result, may transmit, to the terminal through a downlink control channel, information on whether the uplink signal transmission succeeded determined in operation 2920 or uplink configuration information for configuring initial uplink signal transmission according to the first uplink transmission scheme as in operation 2940.

When it is determined in operation 2920 that the uplink transmission of the terminal is not properly received, the base station may configure to make the terminal to perform retransmission for the uplink signal received in operation 2920 in operation 2930. That is, the base station determines that the transmission of the terminal is uplink transmission performed according to the second uplink transmission scheme in operation 2920 according to the method determined according to the embodiments suggested in the disclosure, and may configure to make the terminal to perform retransmission according to the first uplink transmission scheme for the second uplink transmission scheme by transmitting uplink control information through a downlink control channel in operation 2930.

Figure 30:
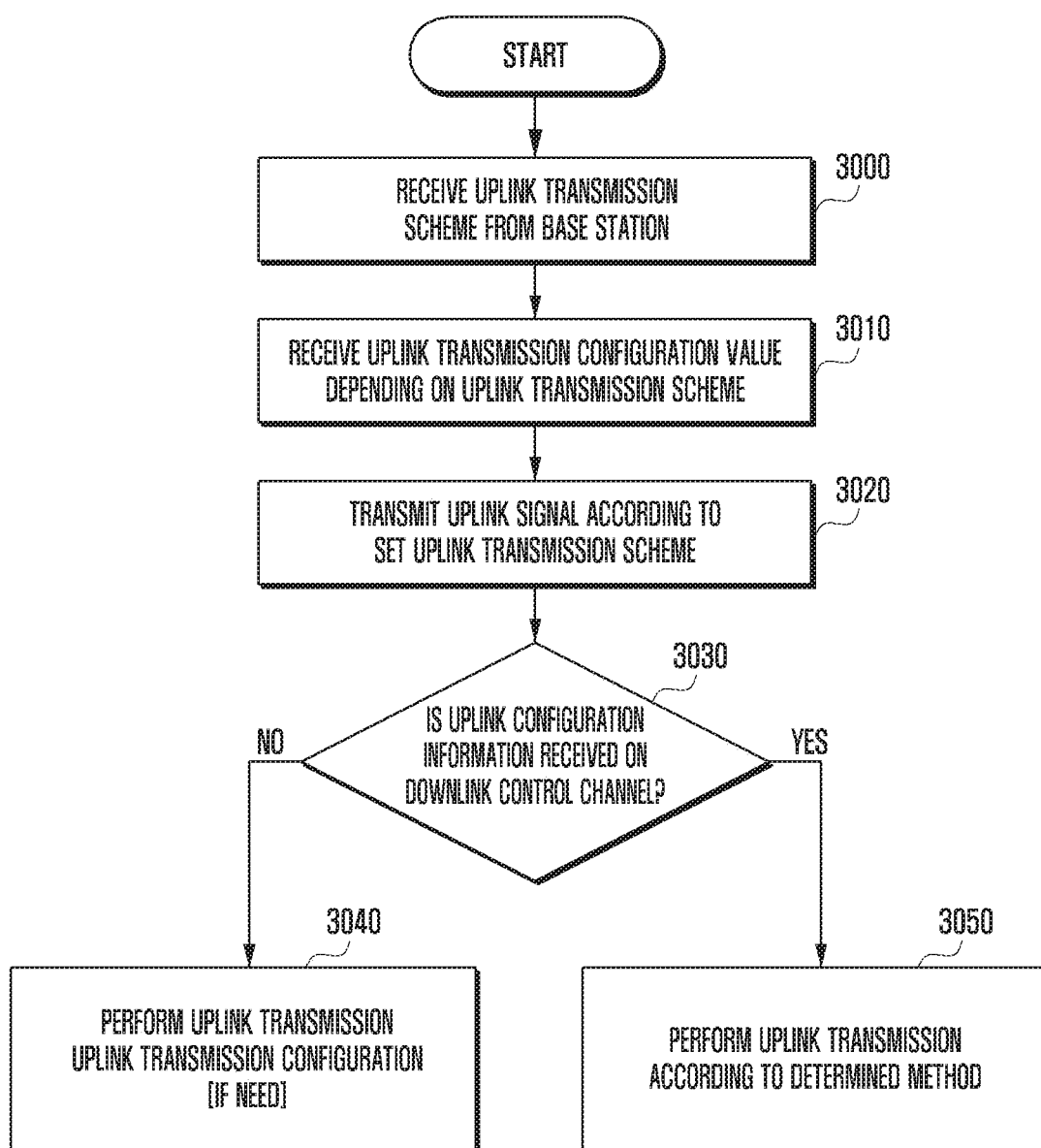
FIG. 30 is a diagram illustrating an uplink signal transmitting method according to received uplink transmission configuration information of the terminal according to an embodiment of the disclosure.

FIG. 30 is a diagram illustrating a method for transmitting, by a terminal, an uplink signal according to the received uplink transmission configuration information suggested in the disclosure.

In operation 3000, the terminal may receive a configuring of one or more of uplink transmission schemes (for example, the first uplink transmission scheme, the second uplink transmission scheme, or the first and second uplink transmission schemes) used for uplink transmission to the base station or cell, through at least one method of a higher layer signal, a broadcast channel, and a downlink control channel.

In operation 3010, the terminal may receive, from the base station, an additional setting of a variable value required for uplink transmission according to the uplink transmission scheme configured in operation 3000. For example, the terminal in which the second uplink transmission scheme is configured may receive or receive a setting of a time resource region and a frequency resource region in which the configured second uplink transmission may be performed, DMRS-related information such as a DMRS sequence and a cyclic shift of a DMRS used for the uplink transmission, a HARQ process ID value and/or HARQ process ID configuring method, an uplink control information detection resource for configuring retransmission for the second uplink transmission, or configuration information for at least one resource region of PDCCH search space information from the base station through at least one method of a higher layer signal, a broadcast channel, and a downlink control channel. At this time, operation 3010 may be included in operation 3000 and set by the base station. That is, the information set in operation 3010 may be set or transmitted in operation 3000.

At this time, in operation 3010, in addition to the time and frequency resource regions, the terminal may receive a setting of some or all of variables required for uplink transmission configuration including MCS information (cyclic shift) that may be used for the second uplink transmission, a TTI length, a second uplink transmission start symbol in a slot, channel access procedure-related configuration information for the second uplink transmission, a candidate value that the terminal may select for the variable values, or the like. At this time, at least one of the variables related to the uplink channel access procedure set in operation 3010 may be differently set according to at least one of the uplink transmission scheme set in step 3000, an uplink transmission band, and frame structure types of a band in which uplink transmission is performed.

The terminal requiring uplink signal transmission transmits an uplink signal in operation 3020 according to the uplink transmission scheme set in operations 3000 and 3010. Then, the terminal receiving uplink transmission configuration information or a DCI format for transferring uplink transmission configuration information from the base station on a downlink control channel in operation 3030 may determine whether the uplink transmission configuration information is for a reception result of the base station for the uplink transmission performed by the terminal in operation 3020 and/or is for configuring retransmission for the uplink transmission, based on at least one information of the received uplink transmission configuration information using at least one of methods suggested in the disclosure in operation 3050.

When the uplink transmission configuration information received in operation 3030 is for configuring retransmission for the uplink transmission, the terminal performs the retransmission. When the uplink configuration information received in operation 3030 is scheduling information for configuring new uplink signal transmission other than the uplink transmission performed by the terminal in operation 3020, the terminal may subsequently transmit uplink signal information according to the determined uplink transmission information in operation 3050.

When an uplink signal intended to be additionally transmitted exists in the terminal that does not receive the uplink transmission configuration information or the DCI format for transferring the uplink transmission configuration information from the base station on the downlink control channel, the terminal may transmit in operation 3040 an uplink signal according to the uplink signal transmission scheme set in operations 3000 and 3010.

In order to perform the embodiments, the terminal and the base station may each include a transmitter, a receiver, and a processor. The embodiment describes transmission and reception methods of the base station and the terminal to determine transmission and reception timings of a second signal and perform operations according to the timings, and the transmitter, the receiver, and the processor may perform the operations. In the embodiments, the transmitter and the receiver may also be referred to as a transceiver that may perform functions of both of the transmitter and the receiver and the processor may be referred to as a controller.

Figure 31:
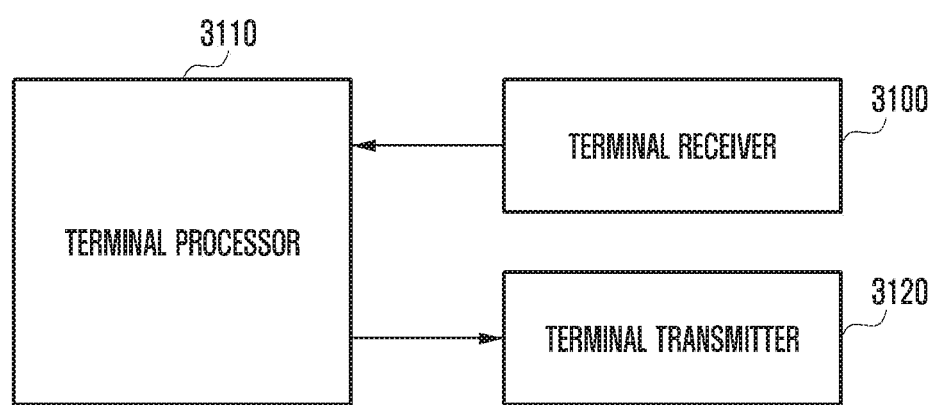
FIG. 31 is a block diagram illustrating a structure of a terminal according to an embodiment of the disclosure.

FIG. 31 is a block diagram illustrating a structure of a terminal according to an embodiment of the disclosure.

Referring to FIG. 31, the terminal according to the disclosure may include a terminal receiver 3100, a terminal transmitter 3120, and a terminal processor 3110. In the embodiment, the terminal receiver 3100 and the terminal transmitter 3120 may be collectively referred to as a transceiver. The transceiver may transmit and receive a signal to and from a base station. The signal may include control information and data. To this end, the transceiver may include a radio frequency (RF) transmitter up-converting and amplifying a frequency of a transmitted signal, and an RF receiver low-noise amplifying a received signal and down-converting a frequency of the signal. In addition, an intensity of a signal received on a wireless channel of the transceiver may be measured and output to the terminal processor 3110, the terminal processor 3110 may perform a channel access operation by comparing the intensity of the received signal with a preset threshold value, and a signal output from the terminal processor 3110 may be transmitted on the wireless channel according to a result of the channel access operation. Further, the transceiver may receive a signal on the wireless channel to output the signal to the terminal processor 3110, and transmit the signal output from the terminal processor 3110 on the wireless channel. The terminal processor 3110 may control a series of processes so that the terminal may be operated according to the above-described embodiment. For example, the terminal processor 3110 may control the terminal receiver 3100 to receive a signal including second signal transmission timing information from the base station and may control to interpret the second signal transmission timing. Then, the terminal transmitter 3210 may transmit the second signal at the timing.

Figure 32:
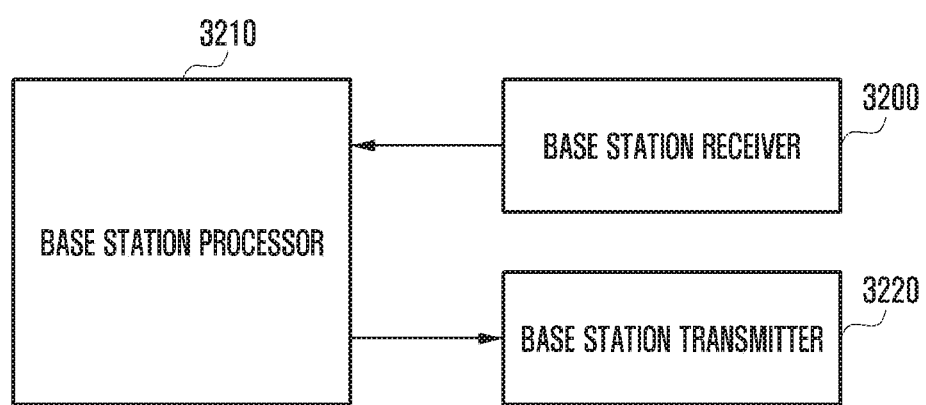
FIG. 32 is a block diagram illustrating a structure of a base station according to an embodiment of the disclosure.

FIG. 32 is a block diagram illustrating a structure of a base station according to an embodiment of the disclosure.

Referring to FIG. 32, the base station according to the embodiment may include at least one of a base station receiver 3200, a base station transmitter 3220, and a base station processor 3210. In the embodiment of the disclosure, the base station receiver 3200 and the base station transmitter 3220 may be collectively referred to as a transceiver. The transceiver may transmit and receive a signal to and from a terminal. The signal may include control information and data. To this end, the transceiver may include a radio frequency (RF) transmitter up-converting and amplifying a frequency of a transmitted signal, and an RF receiver low-noise amplifying a received signal and down-converting a frequency of the signal. Further, the transceiver may receive a signal on a wireless channel to output the signal to the base station processor 3210, and transmit the signal output from the base station processor 3210 on the wireless channel. The base station processor 3210 may control a series of processes so that the base station may be operated according to the above-described embodiment of the disclosure. For example, the base station processor 3210 may control to determine a second signal transmission timing, and generate the second signal transmission timing to be transmitted to the terminal. Thereafter, the base station transmitter 3220 transmits the timing information to the terminal, and the base station receiver 3210 may receive the second signal at the timing. In another example, the base station processor 3210 may perform a setting so that at least one of the second uplink transmission scheme and the first uplink transmission scheme may be used as the uplink transmission scheme of the terminal, and the base station transmitter 3220 may transfer configuration information for uplink transmission to the terminal by including an uplink channel access procedure defined according to the set uplink transmission scheme. Further, according to an embodiment of the disclosure, the base station processor 3210 may control to generate DCI including the second signal transmission timing information. In this case, it may be indicated that the DCI is the second signal transmission timing information.

Meanwhile, the embodiments of the disclosure disclosed in the present specification and the drawings have been provided only as specific examples in order to easily describe the technical contents of the disclosure and assist in understanding the disclosure and do not limit the scope of the disclosure. That is, it is obvious to those skilled in the art to which the disclosure pertains that various modifications may be made without departing from the scope of the disclosure. Further, the respective embodiments may be combined and operated as needed. For example, portions of the embodiments of the disclosure may be combined with each other to operate the base station and the terminal. Further, the embodiments are suggested based on the LR system, but other modified examples based on the technical spirit of the embodiments may be implemented in other systems like FDD or TDD LTE system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal for transmitting uplink data in a communication system, the method comprising:
receiving, from a base station, configuration information on an uplink transmission without grant;
identifying an uplink waveform for the uplink transmission without grant based on the configuration information;
performing the uplink transmission without grant based on the uplink waveform for the uplink transmission without grant;
receiving, from the base station, downlink control information (DCI) which is associated with a retransmission of the uplink transmission without grant;
identifying an uplink waveform for the retransmission based on whether a format of the DCI is for fallback transmission or not; and
performing the retransmission based on the uplink waveform for the retransmission,
wherein the uplink waveform for the retransmission is identified based on waveform information on an uplink transmission with grant in case that the format of the DCI is not for the fallback transmission.

2. The method of claim 1,
wherein the uplink waveform for the uplink transmission without grant is one of cyclic prefix-orthogonal frequency division multiplexing (CP-OFDM) or discrete fourier transform-spread-OFDM (DFT-OFDM), and
wherein the uplink waveform for the retransmission is one of the CP-OFDM or the DFT-OFDM.

3. The method of claim 1,
wherein the configuration information includes waveform information on the uplink transmission without grant, and
wherein the uplink waveform for the uplink transmission without grant is identified based on the waveform information on the uplink transmission without grant.

4. The method of claim 1, wherein the waveform information is received via radio resource control (RRC) signaling or a system information block (SIB).

5. A method performed by a base station for receiving uplink data in a communication system, the method comprising:
transmitting, to a terminal, configuration information on an uplink transmission without grant;
receiving, from the terminal, uplink data corresponding to the uplink transmission without grant based on an uplink waveform for the uplink transmission without grant;
transmitting, to the terminal, downlink control information (DCI) which is associated with a retransmission of the uplink transmission without grant; and
receiving, from the terminal, uplink data corresponding to the retransmission based on an uplink waveform for the retransmission,
wherein the uplink waveform is identified based on whether a format of the DCI is for fallback transmission or not, and
wherein the uplink waveform for the retransmission is identified based on waveform information on an uplink transmission with grant in case that the format of the DCI is not for the fallback transmission.

6. The method of claim 5,
wherein the uplink waveform for the uplink transmission without grant is one of cyclic prefix-orthogonal frequency division multiplexing (CP-OFDM) or discrete fourier transform-spread-OFDM (DFT-OFDM), and
wherein the uplink waveform for the retransmission is one of the CP-OFDM or the DFT-OFDM.

7. The method of claim 5, further comprising:
wherein the configuration information includes waveform information on the uplink transmission without grant, and
wherein the uplink waveform for the uplink transmission without grant is identified based on the waveform information on the uplink transmission without grant.

8. The method of claim 5, wherein the waveform information is received via radio resource control (RRC) signaling or a system information block (SIB).

9. A terminal for transmitting uplink data in a communication system, the terminal comprising:
a transceiver; and
a controller coupled with the transceiver and configured to:
receive, from a base station, configuration information on an uplink transmission without grant,
identify an uplink waveform for the uplink transmission without grant based on the configuration information,
perform the uplink transmission without grant based on the uplink waveform for the uplink transmission without grant,
receive, from the base station, downlink control information (DCI) which is associated with a retransmission of the uplink transmission without grant,
identify an uplink waveform for the retransmission based on whether a format of the DCI is for fallback transmission or not, and
perform the retransmission based on the uplink waveform for the retransmission,
wherein the uplink waveform for the retransmission is identified based on waveform information on an uplink transmission with grant in case that the format of the DCI is not for the fallback transmission.

10. The terminal of claim 9,
wherein the uplink waveform for the uplink transmission without grant is one of cyclic prefix-orthogonal frequency division multiplexing (CP-OFDM) or discrete fourier transform-spread-OFDM (DFT-OFDM), and
wherein the uplink waveform for the retransmission is one of the CP-OFDM or the DFT-OFDM.

11. The terminal of claim 9,
wherein the configuration information includes waveform information on the uplink transmission without grant, and
wherein the uplink waveform for the uplink transmission without grant is identified based on the waveform information on the uplink transmission without grant.

12. The terminal of claim 9, wherein the waveform information is received via radio resource control (RRC) signaling or a system information block (SIB).

13. A base station for receiving uplink data in a communication system, the base station comprising:
a transceiver; and
a controller coupled with the transceiver and configured to:
transmit, to a terminal, configuration information on an uplink transmission without grant,
receive, from the terminal, uplink data corresponding to the uplink transmission without grant based on an uplink waveform for the uplink transmission without grant,
transmit, to the terminal, downlink control information (DCI) which is associated with a retransmission of the uplink transmission without grant, and
receive, from the terminal, uplink data corresponding to the retransmission based on an uplink waveform for the retransmission,
wherein the uplink waveform is identified based on whether a format of the DCI is for fallback transmission or not, and
wherein the uplink waveform for the retransmission is identified based on waveform information on an uplink transmission with grant in case that the format of the DCI is not for the fallback transmission.

14. The base station of claim 13,
wherein the uplink waveform for the uplink transmission without grant is one of cyclic prefix-orthogonal frequency division multiplexing (CP-OFDM) or discrete fourier transform-spread-OFDM (DFT-OFDM), and
wherein the uplink waveform for the retransmission is one of the CP-OFDM or the DFT-OFDM.

15. The base station of claim 13,
wherein the configuration information includes waveform information on the uplink transmission without grant, and
wherein the uplink waveform for the uplink transmission without grant is identified based on the waveform information on the uplink transmission without grant.

16. The base station of claim 13, wherein the waveform information is received via radio resource control (RRC) signaling or a system information block (SIB).

* * * * *